US012362483B2

(12) United States Patent
Yu et al.

(10) Patent No.: US 12,362,483 B2
(45) Date of Patent: Jul. 15, 2025

(54) ANTENNA UNIT AND ELECTRONIC DEVICE

(71) Applicant: Huawei Technologies Co., Ltd., Shenzhen (CN)

(72) Inventors: Dong Yu, Shanghai (CN); Kexin Liu, Shanghai (CN); Yuan Zhou, Shanghai (CN); Hanyang Wang, Reading (GB); Lijun Ying, Shanghai (CN); Pengfei Wu, Shanghai (CN); Chien-Ming Lee, Shenzhen (CN); Meng Hou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 354 days.

(21) Appl. No.: 17/920,570

(22) PCT Filed: Mar. 25, 2021

(86) PCT No.: PCT/CN2021/082974
§ 371 (c)(1),
(2) Date: Oct. 21, 2022

(87) PCT Pub. No.: WO2021/213125
PCT Pub. Date: Oct. 28, 2021

(65) Prior Publication Data
US 2023/0163466 A1 May 25, 2023

(30) Foreign Application Priority Data
Apr. 22, 2020 (CN) ......................... 202010323918.5

(51) Int. Cl.
*H01Q 7/00* (2006.01)
*H01Q 1/52* (2006.01)
*H01Q 5/35* (2015.01)

(52) U.S. Cl.
CPC ............... *H01Q 7/00* (2013.01); *H01Q 1/521* (2013.01); *H01Q 5/35* (2015.01)

(58) Field of Classification Search
CPC ............. H01Q 1/521; H01Q 5/35; H01Q 7/00
See application file for complete search history.

(56) References Cited

U.S. PATENT DOCUMENTS 4,395,714 A * 7/1983 Takeda ..................... H01Q 9/30 343/701
2009/0160717 A1 * 6/2009 Tsutsumi ............... H01Q 19/30 343/726

(Continued)

FOREIGN PATENT DOCUMENTS

CN 102299406 A 12/2011
CN 107425258 A 12/2017

(Continued)

OTHER PUBLICATIONS

Mahadik Shamala Rajaram, Compact multiband antenna with folded meandered loop: LTE/WLAN/WiMAX advanced mobile operations, https://ieeexplore.ieee.org/document/8300028, Mar. 22-24, 2017, total 5 pages.

*Primary Examiner* — Dameon E Levi
*Assistant Examiner* — Leah Rosenberg
(74) *Attorney, Agent, or Firm* — Slater Matsil, LLP

(57) ABSTRACT

This application provides an antenna unit and an electronic device. A signal at a C-mode port and a signal at a D-mode port of a same loop antenna in any antenna unit are respectively excited by using two feeds, and the antenna unit is electrically symmetrically disposed, so that the signal at the C-mode port is self-cancelled at the D-mode port, and the signal at the D-mode port is self-cancelled at the C-mode port, to implement signal isolation between the two ports and interference self-cancel, and the signal at the C-mode port and the signal at the D-mode port can be complemen- (Continued)

Antenna unit tary to each other in different radiation directions, to implement two antennas with high isolation and a low envelope correlation coefficient ECC based on the same loop antenna.

20 Claims, 61 Drawing Sheets

(56) References Cited

U.S. PATENT DOCUMENTS

| | | | | |
|---|---|---|---|---|
| 2009/0237319 | A1 | 9/2009 | Fukushima et al. | |
| 2016/0294042 | A1* | 10/2016 | Wang | H01Q 1/48 |
| 2018/0254556 | A1 | 9/2018 | Li et al. | |
| 2019/0214741 | A1* | 7/2019 | Chiang | H01Q 7/00 |
| 2023/0146114 | A1* | 5/2023 | Wu | H01Q 13/106<br>343/702 |
| 2023/0402752 | A1* | 12/2023 | Hamabe | H01Q 5/35 |

FOREIGN PATENT DOCUMENTS

| | | | |
|---|---|---|---|
| EP | 4099504 | A1 | 12/2022 |
| JP | 2012528531 | A | 11/2012 |

* cited by examiner

Antenna unit

Antenna unit

Antenna unit

Antenna unit

Antenna unit

Electronic device

Antenna unit

Antenna unit

Antenna unit

Antenna unit

Antenna unit

Antenna unit

Antenna unit

Antenna unit

Antenna unit

Antenna unit

Antenna unit

Antenna unit

ANTENNA UNIT AND ELECTRONIC DEVICE

CROSS-REFERENCE TO RELATED APPLICATIONS

This application is a national stage of International Application No. PCT/CN2021/082974, filed on Mar. 25, 2021, which claims priority to Chinese Patent Application No. 202010323918.5, filed on Apr. 22, 2020. Both of the aforementioned applications are hereby incorporated by reference in their entireties.

TECHNICAL FIELD

This application relates to the field of electronic technologies, and in particular, to an antenna unit and an electronic device.

BACKGROUND

With development of a full screen of an electronic device, a strain is increasingly put on space of an antenna. In addition, to meet various user requirements, there are an increasingly large quantity of antennas. Therefore, how to place a larger quantity of antennas in limited space and ensure that each antenna has good isolation and a low envelope correlation coefficient ECC is an urgent problem that needs to be resolved currently.

SUMMARY

This application provides an antenna unit and an electronic device, to implement two antennas with high isolation and a low envelope correlation coefficient ECC based on a same loop antenna. In this way, good antenna performance is ensured, and utilization of antenna space is improved.

According to a first aspect, this application provides an antenna unit, including a first loop branch, a first feed, and a second feed. The first loop branch includes a first radiation section, a second radiation section, and a third radiation section. The first radiation section is in a ring shape, and the first radiation section is not closed. One end of the first radiation section is connected to the second radiation section, and the other end of the first radiation section is connected to the third radiation section. The second radiation section and the third radiation section are symmetrically disposed in a first direction. There is an opening between the second radiation section and the third radiation section, and both the second radiation section and the third radiation section are grounded. The first feed is symmetrically connected to the first radiation section in the first direction. A second contact point and a third contact point are symmetrical in the first direction, and a distance between the second contact point and the third contact point falls within a first preset range. The second contact point is a contact point between the second feed and the second radiation section. The third contact point is a contact point between the second feed and the third radiation section.

According to the antenna unit provided in the first aspect, based on a symmetrical arrangement of a same loop antenna (namely, the first loop branch), the antenna unit respectively excites a signal at a C-mode port and a signal at a D-mode port of the loop antenna by using two feeds, so that the signal at the C-mode port is self-canceled at the D-mode port, and the signal at the D-mode port is self-canceled at the C-mode port, to implement signal isolation between the two ports, and the signal at the C-mode port and the signal at the D-mode port are complementary to each other in different radiation directions, to implement two antennas with high isolation and a low ECC. In this way, good antenna performance can be ensured, so that an electronic device can fully use the antenna unit in limited space to implement various scenarios. In addition, the electronic device can include a larger quantity of antennas in the limited space, to improve utilization of antenna space.

In a possible design, the second radiation section and the third radiation section are disposed inside the first radiation section in the first direction, to help arrange the antenna unit in relatively small space, so as to improve space utilization of the antenna unit; the second radiation section and the third radiation section are disposed outside the first radiation section in the first direction, to provide a possibility for implementing the antenna unit, so that the antenna unit can meet a space requirement in an actual situation; the second radiation section and the third radiation section are disposed to extend from an inside of the first radiation section to an outside of the first radiation section in the first direction, to provide a possibility for implementing the antenna unit, so that the antenna unit can meet a space requirement in an actual situation; or the second radiation section and the third radiation section are disposed to extend from an inside of the first radiation section to an outside of the first radiation section in a direction opposite to the first direction, to provide a possibility for implementing the antenna unit, so that the antenna unit can meet a space requirement in an actual situation.

In a possible design, the second radiation section is connected to N first ground points of the electronic device, and the third radiation section is connected to N second ground points of the electronic device, where N is a positive integer.

In a possible design, when the second radiation section and the third radiation section are disposed on a bracket, the first ground point and the second ground point are disposed on the bracket. In this case, each of the first ground point and the second ground point needs to be connected to a ground of a printed circuit board by using a spring on the bracket, and no trace needs to be arranged on the bracket. Alternatively, the first ground point and the second ground point are disposed on a printed circuit board in the electronic device. In this way, a spring is saved, and this solution is simple and easy to implement.

In a possible design, both the second radiation section and the third radiation section are connected to a ground region of the electronic device, and the ground region is symmetrically disposed in the first direction.

In a possible design, there is one first contact point between the first feed and the first radiation section, and the first contact point is a symmetry point of the first radiation section, and is located on the first radiation section.

In a possible design, there are P (an even number) first contact points between the first feed and the first radiation section, the P (an even number) first contact points are symmetrically disposed in the first direction, and the P (an even number) first contact points are located on a radiation section, in the first radiation section, on which a symmetry point of the first radiation section is located.

In a possible design, there are Q (an odd number) first contact points between the first feed and the first radiation section, where the odd number Q is greater than or equal to 3, the Q (an odd number) first contact points include one first contact point and P (an even number) first contact points, the one first contact point is a symmetry point of the first radiation section, and is located on the first radiation section, the P (an even number) first contact points are symmetrically disposed in the first direction, and the P (an even number) first contact points are located on a radiation section, in the first radiation section, on which the symmetry point of the first radiation section is located.

In a possible design, a first matching component is disposed between the first feed and the first contact point, to adjust a frequency band of the antenna unit, so that the first feed can obtain a better pattern and better cross polarization performance, to improve performance of the antenna unit.

In a possible design, a second matching component is disposed between the second feed and the second contact point, and/or a second matching component is disposed between the second feed and the third contact point, to adjust the frequency band of the antenna unit, so that the second feed can obtain a better pattern and better cross polarization performance, to improve the performance of the antenna unit.

In a possible design, the antenna unit further includes a first non-conductive support member, a first conductive member, and a second conductive member; and the first conductive member and the second conductive member are suspended by using the first non-conductive support member, the first conductive member and the second conductive member are symmetrically disposed in the first direction, a length of the first conductive member is a ½ wavelength, a length of the second conductive member is a ½ wavelength, and the wavelength is a wavelength corresponding to any frequency in an operating frequency band of the antenna unit. Therefore, the first conductive member and the second conductive member can extend a bandwidth of the antenna unit, to improve the performance of the antenna unit. Usually, larger widths of the first conductive member and the second conductive member indicate better performance of the antenna unit.

In a possible design, the first conductive member and the second conductive member are disposed outside or inside the first radiation section.

In a possible design, the first non-conductive support member includes at least one of a glass battery cover, a plastic battery cover, or an explosion-proof film in the electronic device.

According to a second aspect, this application provides an antenna unit, including a second loop branch, a feeding branch, a third feed, and a fourth feed. The second loop branch includes a fourth radiation section, a fifth radiation section, and a sixth radiation section. The fourth radiation section is in a ring shape, and the fourth radiation section is not closed. One end of the fourth radiation section is connected to the fifth radiation section, and the other end of the fourth radiation section is connected to the sixth radiation section. The fifth radiation section and the sixth radiation section are symmetrically disposed in a second direction. There is an opening between the fifth radiation section and the sixth radiation section, and both the fifth radiation section and the sixth radiation section are grounded. The feeding branch is symmetrically disposed in the second direction, and an area of a part that is of the feeding branch and that faces the fifth radiation section is equal to an area of a part that is of the feeding branch and that faces the sixth radiation section. The third feed is symmetrically connected to the feeding branch in the second direction. A fifth contact point and a sixth contact point are symmetrical in the second direction, and a distance between the fifth contact point and the sixth contact point falls within a second preset range. The fifth contact point is a contact point between the fourth feed and the fifth radiation section. The sixth contact point is a contact point between the fourth feed and the sixth radiation section.

According to the antenna unit provided in the second aspect, based on a symmetrical arrangement of a same loop antenna (namely, the second loop branch and the feeding branch), the antenna unit respectively excites a signal at a C-mode port and a signal at a D-mode port of the loop antenna by using two feeds, so that the signal at the C-mode port is self-canceled at the D-mode port, and the signal at the D-mode port is self-canceled at the C-mode port, to implement signal isolation between the two ports, and the signal at the C-mode port and the signal at the D-mode port are complementary to each other in different radiation directions, to implement two antennas with high isolation and a low ECC. In this way, good antenna performance can be ensured, so that an electronic device can fully use the antenna unit in limited space to implement various scenarios. In addition, the electronic device can include a larger quantity of antennas in the limited space, to improve utilization of antenna space.

In a possible design, the fifth radiation section and the sixth radiation section are disposed inside the fourth radiation section in the second direction, to help arrange the antenna unit in relatively small space, so as to improve space utilization of the antenna unit; the fifth radiation section and the sixth radiation section are disposed outside the fourth radiation section in the second direction, to provide a possibility for implementing the antenna unit, so that the antenna unit can meet a space requirement in an actual situation; the fifth radiation section and the sixth radiation section are disposed to extend from an inside of the fourth radiation section to an outside of the fourth radiation section in the second direction, to provide a possibility for implementing the antenna unit, so that the antenna unit can meet a space requirement in an actual situation; or the fifth radiation section and the sixth radiation section are disposed to extend from an inside of the fourth radiation section to an outside of the fourth radiation section in a direction opposite to the second direction, to provide a possibility for implementing the antenna unit, so that the antenna unit can meet a space requirement in an actual situation.

In a possible design, the fifth radiation section is connected to M third ground points of the electronic device, and the sixth radiation section is connected to M fourth ground points of the electronic device, where M is a positive integer.

In a possible design, when the fifth radiation section and the sixth radiation section are disposed on a bracket, the third ground point and the fourth ground point are disposed on the bracket. In this case, each of the third ground point and the fourth ground point needs to be connected to a ground of a printed circuit board by using a spring on the bracket, and no trace needs to be arranged on the bracket. Alternatively, the third ground point and the fourth ground point are disposed on a printed circuit board in the electronic device. In this way, a spring is saved, and this solution is simple and easy to implement.

In a possible design, both the fifth radiation section and the sixth radiation section are connected to a ground region of the electronic device, and the ground region is symmetrically disposed in the second direction.

In a possible design, the feeding branch is disposed inside the fourth radiation section in the second direction, so that inner space of the fourth radiation section can be fully used to dispose the feeding branch, the fifth radiation section, and the sixth radiation section, to help arrange the antenna unit in relatively small space, so as to improve space utilization of the antenna unit; the feeding branch is disposed outside the fourth radiation section in the second direction, to provide a possibility for implementing the antenna unit, so that the antenna unit can meet a space requirement in an actual situation; or the feeding branch is disposed to extend from an inside of the fourth radiation section to an outside of the fourth radiation section in the second direction, to provide a possibility for implementing the antenna unit, so that the antenna unit can meet a space requirement in an actual situation.

In a possible design, an area of a part that is of the feeding branch and that faces the fifth radiation section in the second direction is equal to an area of a part that is of the feeding branch and that faces the sixth radiation section in the second direction; or an area of a part that is of the feeding branch and that faces the fifth radiation section in a direction perpendicular to the second direction is equal to an area of a part that is of the feeding branch and that faces the sixth radiation section in the direction perpendicular to the second direction, to ensure symmetry of the feeding branch.

In a possible design, there is at least one fourth contact point between the third feed and the feeding branch.

In a possible design, a third matching component is disposed between the third feed and the fourth contact point, to adjust a frequency band of the antenna unit, so that the third feed can obtain a better pattern and better cross polarization performance, to improve performance of the antenna unit.

In a possible design, a fourth matching component is disposed between the fourth feed and the fifth contact point, and/or a fourth matching component is disposed between the fourth feed and the sixth contact point, to adjust the frequency band of the antenna unit, so that the fourth feed can obtain a better pattern and better cross polarization performance, to improve the performance of the antenna unit.

In a possible design, the antenna unit further includes a second non-conductive support member, a third conductive member, and a fourth conductive member; and the third conductive member and the fourth conductive member are suspended by using the second non-conductive support member, the third conductive member and the fourth conductive member are symmetrically disposed in the second direction, a length of the third conductive member is a ½ wavelength, a length of the fourth conductive member is a ½ wavelength, and the wavelength is a wavelength corresponding to any frequency in an operating frequency band of the antenna unit. Therefore, the third conductive member and the fourth conductive member can extend a bandwidth of the antenna unit, to improve the performance of the antenna unit. Usually, larger widths of the third conductive member and the fourth conductive member indicate better performance of the antenna unit.

In a possible design, the third conductive member and the fourth conductive member are disposed outside or inside the fourth radiation section.

In a possible design, the second non-conductive support member includes at least one of a glass battery cover, a plastic battery cover, or an explosion-proof film in the electronic device.

According to a third aspect, this application provides an electronic device, including a printed circuit board and the antenna unit in any one of the first aspect and the possible designs of the first aspect, and/or a printed circuit board and the antenna unit in any one of the second aspect and the possible designs of the second aspect. A feed point, a tuned circuit, and a matching circuit in the antenna unit are disposed on the printed circuit board, and a ground point in the antenna unit and the printed circuit board share a ground.

For beneficial effects of the electronic device provided in the third aspect and the possible designs of the third aspect, refer to the first aspect and the possible implementations of the first aspect, and/or for beneficial effects of the electronic device provided in the third aspect and the possible designs of the third aspect, refer to the beneficial effects brought by the second aspect and the possible implementations of the second aspect. Details are not described herein.

DESCRIPTION OF REFERENCE NUMERALS

10: First loop branch; 11: First radiation section; 12: Second radiation section; 13: Third radiation section; 14: First non-conductive support member; 15: First conductive member; 16: Second conductive member; F1: First feed; F2: Second feed; and X1: First direction; and 20: Second loop branch; 21: Fourth radiation section; 22: Fifth radiation section; 23: Sixth radiation section; 24: Second non-conductive support member; 25: Third conductive member; 26: Fourth conductive member; 27: Feeding branch; F3: Third feed; F4: Fourth feed; and X2: Second direction.

DETAILED DESCRIPTION OF ILLUSTRATIVE EMBODIMENTS

Some terms in this application are first described, to help persons skilled in the art have a better understanding.

1. A loop antenna (loop antenna) is a structure in which a metal wire is wound into a specific shape such as a circular shape, a square shape, a triangular shape, or a diamond shape, and two ends of a conductor are used as output ends.

Figure 1:
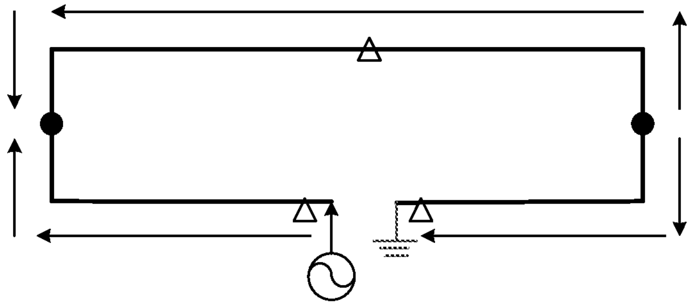
FIG. 1 is a diagram of current distribution of a loop antenna whose circumference is one wavelength λ.

FIG. 1 is a diagram of current distribution of a loop antenna whose circumference is one wavelength λ. For ease of description, in FIG. 1, an example in which the loop antenna is in a square shape is used for illustration. As shown in FIG. 1, a thick black line represents the loop antenna. One end of the loop antenna is connected to a feed (feed), and the other end of the loop antenna is connected to a ground point. Each arrow represents current distribution of the loop antenna at a frequency corresponding to one wavelength λ. The loop antenna has a lowest current at a position of a triangle, and the loop antenna has a highest current at a position of a solid circle.

Figure 2:
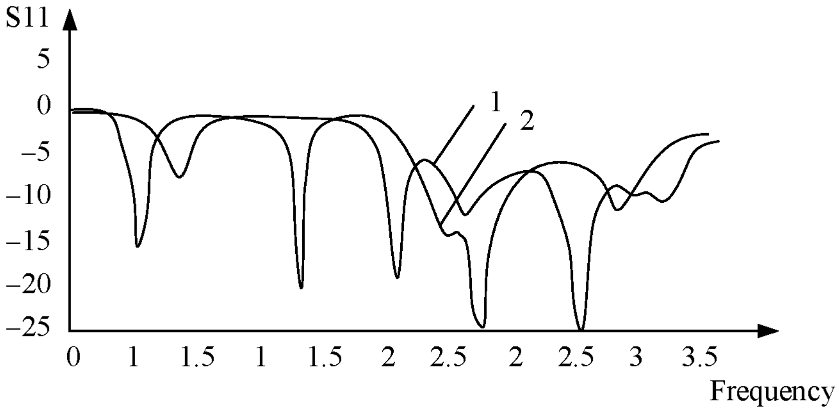
FIG. 2 is a schematic diagram of waveforms of input reflection coefficients S11 of the loop antenna in FIG. 1 on different operating frequency bands.

FIG. 2 is a schematic diagram of waveforms of input reflection coefficients S11 of the loop antenna in FIG. 1 on different operating frequency bands. As shown in FIG. 2, a curve 1 and a curve 2 respectively represent S11 of the loop antenna in FIG. 1 on different operating frequency bands. The loop antenna has rich higher order modes in the curve 1 and the curve 2, and therefore the loop antenna has advantages such as easy to tune and capable of covering a very wide medium and high frequency bandwidth.

In FIG. 2, a horizontal coordinate is a frequency in a unit of GHz, and a vertical coordinate is an input reflection coefficient S11 in a unit of dB. The input reflection coefficient S11 is one of S parameters (namely, scattering parameters), and represents a return loss characteristic. A loss value in dB and an impedance characteristic are usually obtained by using a network analyzer. This parameter represents a matching degree between an antenna and a front-end circuit. A larger value of the reflection coefficient S11 indicates a larger amount of energy reflected by the antenna, which indicates a lower matching degree of the antenna. For example, if a value of S11 of an antenna A at a specific frequency is −1, and a value of S11 of an antenna B at the same frequency is −3, the antenna B has a higher matching degree than the antenna A.

2. Antenna isolation refers to a ratio of power of a signal transmitted by an antenna to power of a signal received by another antenna. A reverse transmission coefficient S12 is usually used to represent the antenna isolation. The reverse transmission coefficient S12 is one of S parameters.

3. An envelope correlation coefficient ECC is used to represent coupling between different antennas. The coupling herein may include current coupling, free space coupling, and surface wave coupling. A person skilled in the art may understand that isolation is an important indicator for measuring coupling between antennas. Usually, the three coupling effects are alleviated, to improve the isolation between the antennas, ensure a low enough ECC, and maintain relatively good antenna performance.

A person skilled in the art may understand that an antenna may be fed separately to generate currents with an equal amplitude and a same phase, namely, a signal at a common mode (common mode, C mode) port. An antenna may be fed separately to generate currents with an equal amplitude and opposite phases, namely, a signal at a differential mode (differential mode, D mode) port. However, when there is a relatively short distance between two antennas, as the distance continuously decreases, a coupling effect between the two antennas continuously increases because there is coupling capacitance between the two antennas. Therefore, when there is a relatively short distance between the two antennas, there is a relatively strong coupling effect between the two antennas. Consequently, isolation between the two antennas is reduced, and there is a relatively high ECC between the two antennas.

To resolve the foregoing problem, this application provides an antenna unit and an electronic device. A signal at a C-mode port and a signal at a D-mode port of a same loop antenna in any antenna unit are respectively excited by using two feeds, and the antenna unit is electrically symmetrically disposed, so that the signal at the C-mode port is self-cancelled at the D-mode port, and the signal at the D-mode port is self-cancelled at the C-mode port, to implement signal isolation between the two ports, and the signal at the C-mode port and the signal at the D-mode port can be complementary to each other in different radiation directions, to implement two antennas with high isolation and a low envelope correlation coefficient ECC based on the same loop antenna. In this way, good antenna performance is ensured, so that the electronic device can fully use the antenna unit in limited space to implement various scenarios, for example, implement application to a multi-antenna scenario such as a diversity antenna or a multiple-input multiple-output (multiple-input multiple-output, MIMO) antenna, a scenario of obtaining a pattern through combination, and a pattern switching scenario such as switching between a horizontal direction and a vertical direction. In addition, the electronic device can include a larger quantity of antennas in the limited space, to improve utilization of antenna space.

The electronic device in this application may include but is not limited to a device such as a mobile phone, a headset, a tablet computer, a portable computer, a wearable device, or a data card.

The antenna unit is electrically symmetrically disposed. That the antenna unit is electrically symmetrically disposed may be understood as that the antenna unit has an electrical symmetry center that usually corresponds to a physical symmetry center, and electrical sizes on two sides of the antenna unit relative to the electrical symmetry center are approximately equal. If a surrounding environment of the antenna unit is ideally symmetrical, electrical symmetry of the antenna unit is physical symmetry. If an asymmetrical device is introduced in the surrounding environment of the antenna unit, the antenna unit needs to be disposed as an asymmetrical structure to cancel asymmetry introduced by the device, so as to implement electrical symmetry of the antenna unit. For ease of description, in this application, an example in which the antenna unit is structurally symmetrical and the surrounding environment of the antenna unit is also structurally symmetrically disposed is used for illustration.

A feeding manner of exciting the loop antenna by the feed is not limited in this application. Therefore, in this application, a scenario in which the feed excites the loop antenna in a direct feeding manner may be set as Embodiment 1, and a scenario in which the feed excites the loop antenna in a feeding manner similar to a manner of using a coplanar waveguide (coplanar waveguide, CPW) may be set as Embodiment 2.

For ease of description, a specific implementation process of implementing two antennas by using a same loop antenna in this application is described by using an example in which the electronic device is a mobile phone, with reference to the embodiments of this application and the accompanying drawings of this application, and by using Embodiment 1 and Embodiment 2.

Embodiment 1

In Embodiment 1, the antenna unit in this application may include a first loop branch 10, a first feed F1, and a second feed F2.

A process of manufacturing the first loop branch 10 is not limited in this application. For example, the first loop branch 10 may be manufactured by using a flexible printed circuit board (flexible printed circuit board, FPC), may be manufactured through laser direct structuring, or may be manufactured by using a spraying process. In addition, a position at which the first loop branch 10 is disposed is also not limited in this application. For example, the first loop branch 10 may be disposed on a metal frame of an electronic device such as a mobile phone, may be disposed on a printed circuit board in an electronic device, or may be disposed on a printed circuit board in an electronic device by using a bracket.

In this application, the first loop branch 10 may include a first radiation section 11, a second radiation section 12, and a third radiation section 13.

Figure 3A:
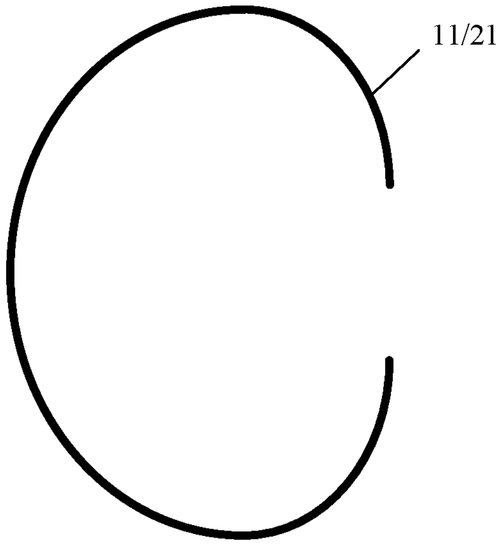
FIG. 3*a* is a schematic diagram of a shape of a first radiation section/a fourth radiation section in an antenna unit according to an embodiment of this application.

The first radiation section 11 is in a ring shape. Optionally, the first radiation section 11 may be in a circular shape shown in FIG. 3*a*, may be in a square shape shown in FIG. 3*b*, may be in an irregular shape shown in FIG. 3*c* to FIG. 3*e*, or may be in a triangular shape. A specific shape of the first radiation section 11 is not limited in this application provided that it is met that the first radiation section 11 is symmetrically disposed in a first direction X1. The first direction X1 is a direction in which a symmetry axis of the first loop branch 10 is located, and may be any direction that varies with a direction in which the first loop branch 10 is placed. For ease of description, in this application, an example in which the first direction X1 is a positive direction of an X axis is used for illustration. It should be noted that the first loop branch 10 may be completely structurally symmetrically disposed, that is, the first direction X1 is the direction in which the symmetry axis of the first loop branch 10 is located. Alternatively, the first loop branch 10 may be allowed to be structurally asymmetrically disposed within an error range. Asymmetry herein is intended to eliminate electrical asymmetry introduced by a component other than the first loop branch 10, that is, the first direction X1 is a direction in which a symmetry axis of the first loop branch 10 that exists after correction is located.

In addition, the first radiation section 11 is not closed, and includes two ends. One end of the first radiation section 11 is connected to the second radiation section 12, and the other end of the first radiation section 11 is connected to the third radiation section 13. The second radiation section 12 and the third radiation section 13 are symmetrically disposed in the first direction X1, and there is an opening between the second radiation section 12 and the third radiation section 13.

Parameters such as shapes, widths, or lengths of the second radiation section 12 and the third radiation section 13 are also not limited in this application. A size of the opening between the second radiation section 12 and the third radiation section 13 is not limited. In addition, a relative position relationship between the first radiation section 11 and each of the second radiation section 12 and the third radiation section 13 is not limited in this application.

Figure 3B:
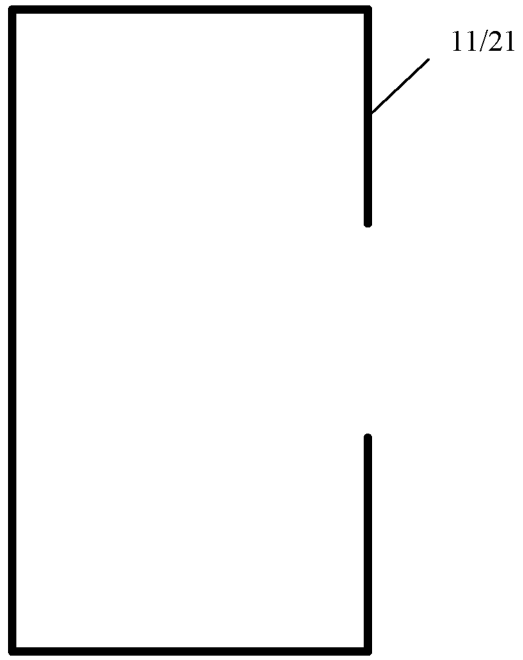
FIG. 3*b* is a schematic diagram of a shape of a first radiation section/a fourth radiation section in an antenna unit according to an embodiment of this application.
Figure 3C:
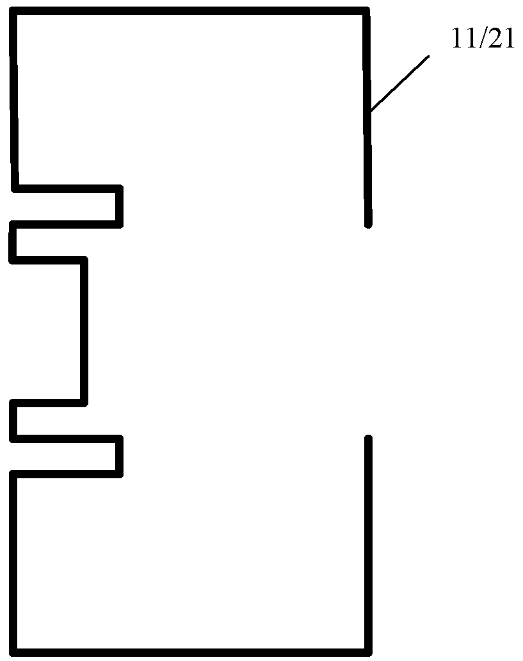
FIG. 3*c* is a schematic diagram of a shape of a first radiation section/a fourth radiation section in an antenna unit according to an embodiment of this application.
Figure 3D:
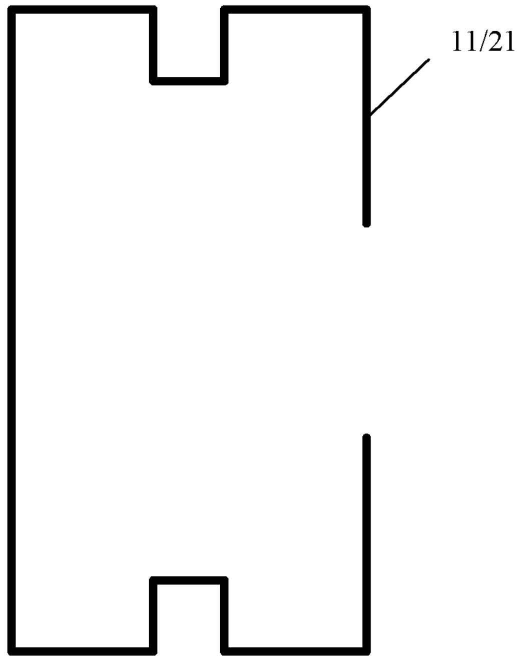
FIG. 3*d* is a schematic diagram of a shape of a first radiation section/a fourth radiation section in an antenna unit according to an embodiment of this application.
Figure 3E:
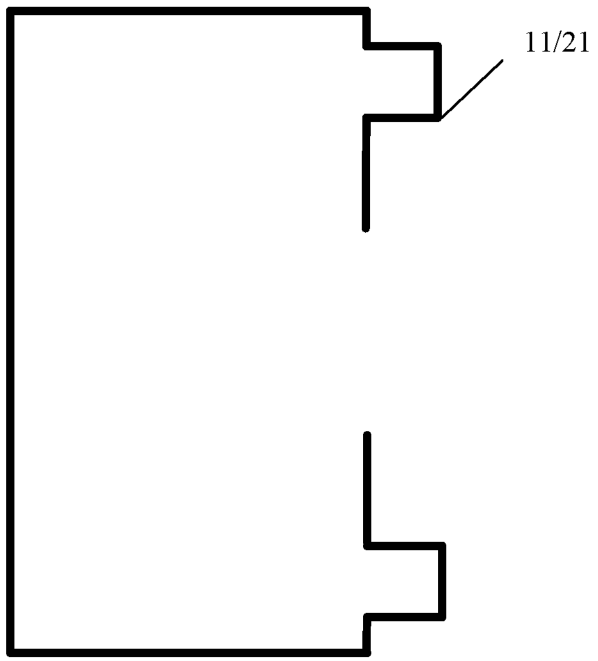
FIG. 3*e* is a schematic diagram of a shape of a first radiation section/a fourth radiation section in an antenna unit according to an embodiment of this application.

Based on the first radiation section 11 in the square shape shown in FIG. 3*b*, disposing of the second radiation section 12 and the third radiation section 13 is described below with reference to FIG. 4*a* to FIG. 4*f*.

Figure 4A:
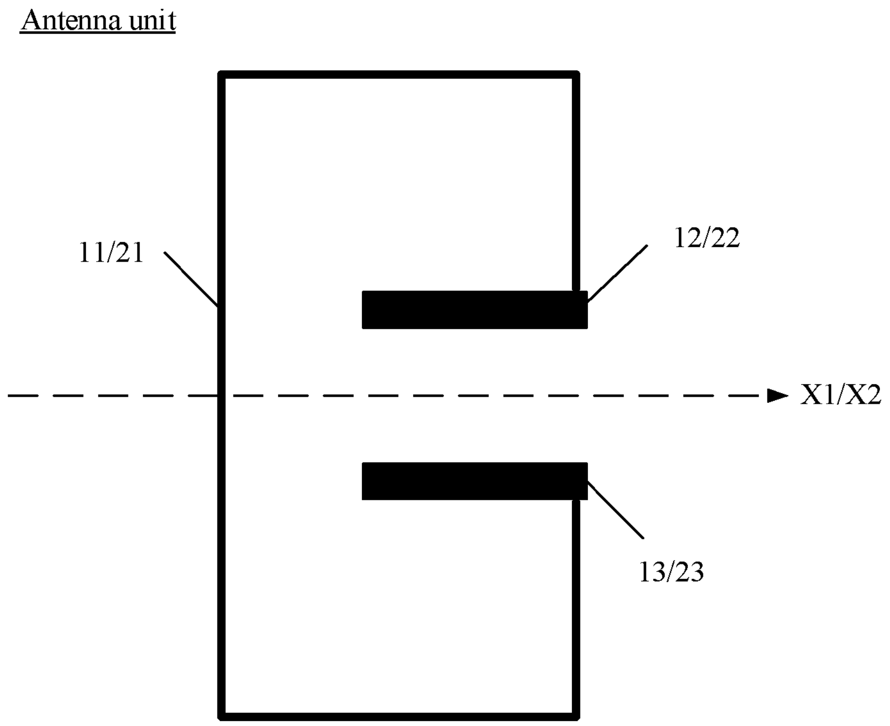
FIG. 4*a* is a schematic diagram of a second radiation section and a third radiation section or a fifth radiation section and a sixth radiation section in an antenna unit according to an embodiment of this application.
Figure 4B:
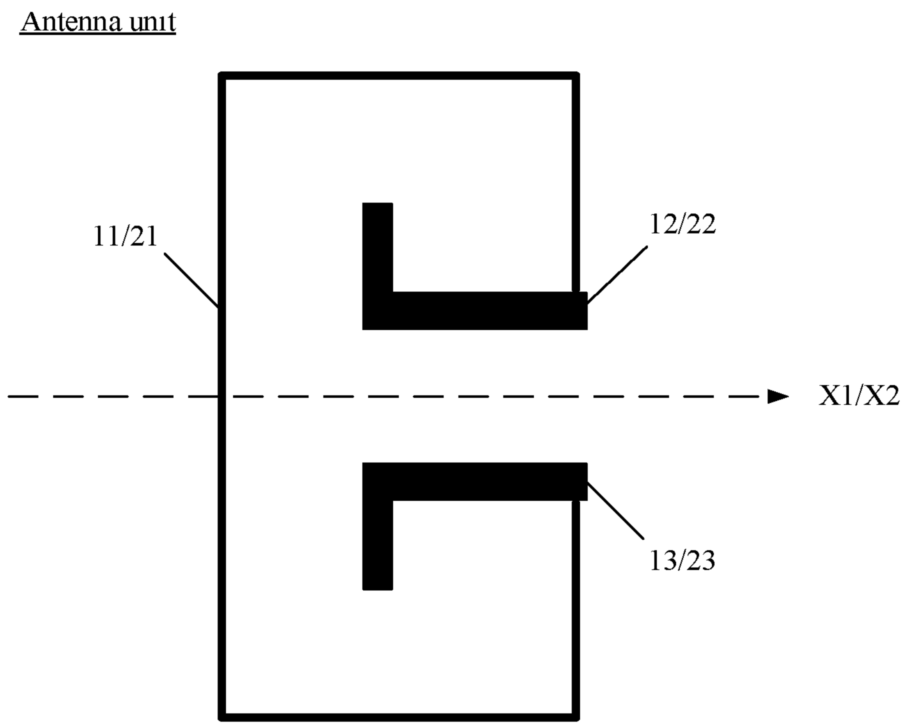
FIG. 4*b* is a schematic diagram of a second radiation section and a third radiation section or a fifth radiation section and a sixth radiation section in an antenna unit according to an embodiment of this application.
Figure 4C:
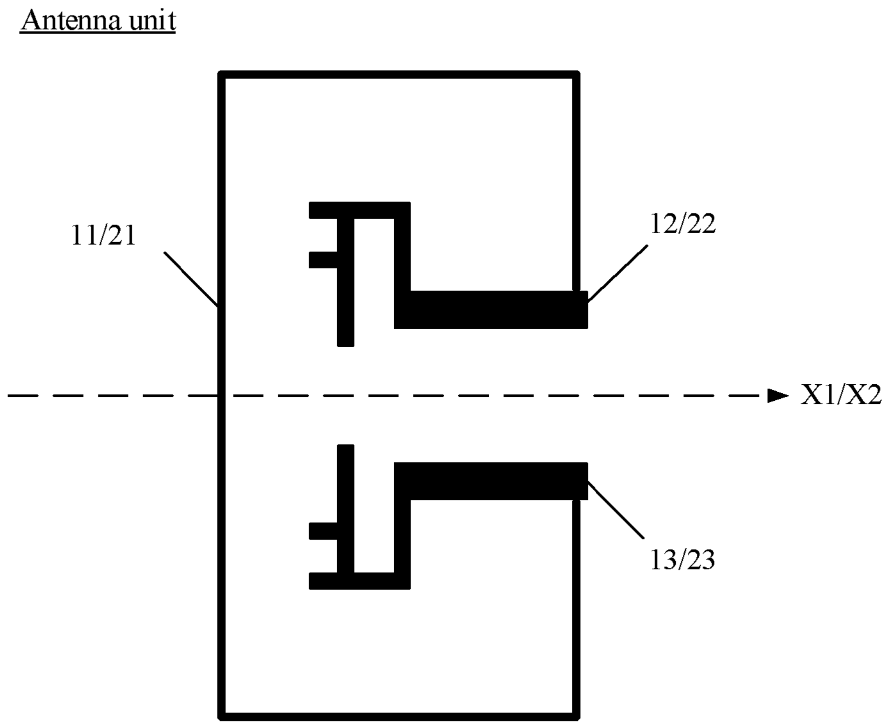
FIG. 4*c* is a schematic diagram of a second radiation section and a third radiation section or a fifth radiation section and a sixth radiation section in an antenna unit according to an embodiment of this application.
Figure 6A:
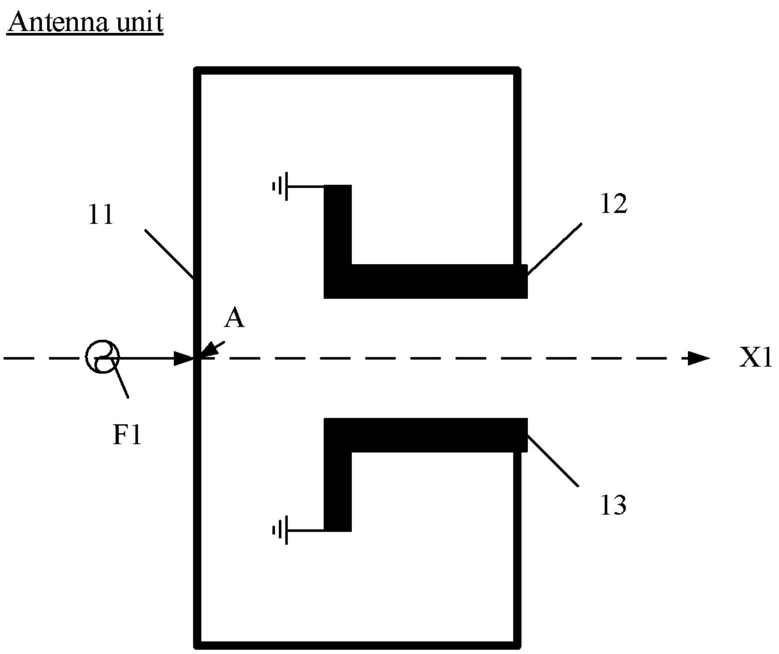
FIG. 6*a* is a schematic diagram in which a first feed is connected to a first radiation section in a first direction in an antenna unit according to an embodiment of this application.
Figure 6B:
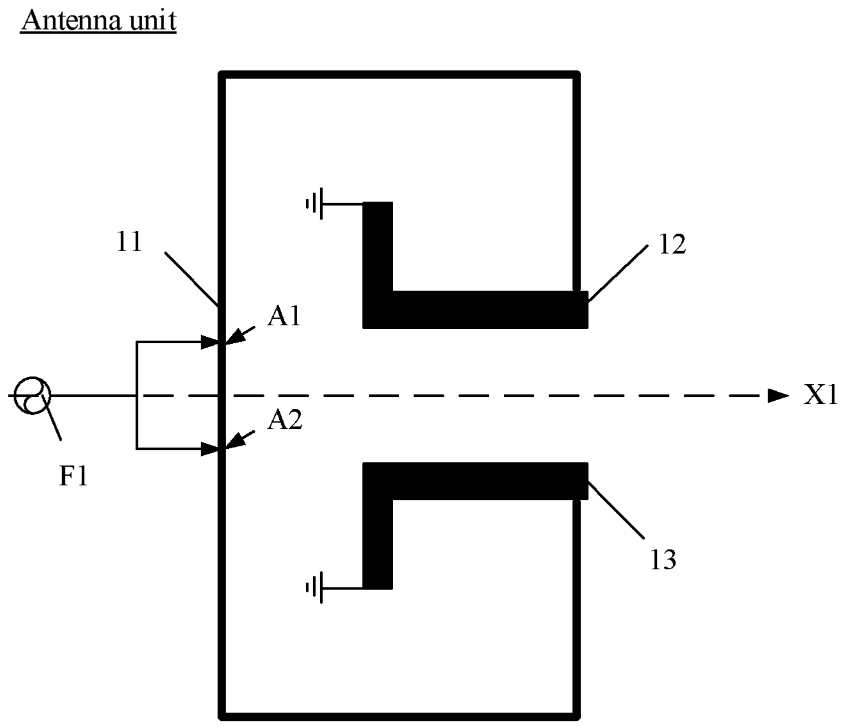
FIG. 6*b* is a schematic diagram in which a first feed is connected to a first radiation section in a first direction in an antenna unit according to an embodiment of this application.
Figure 6C:
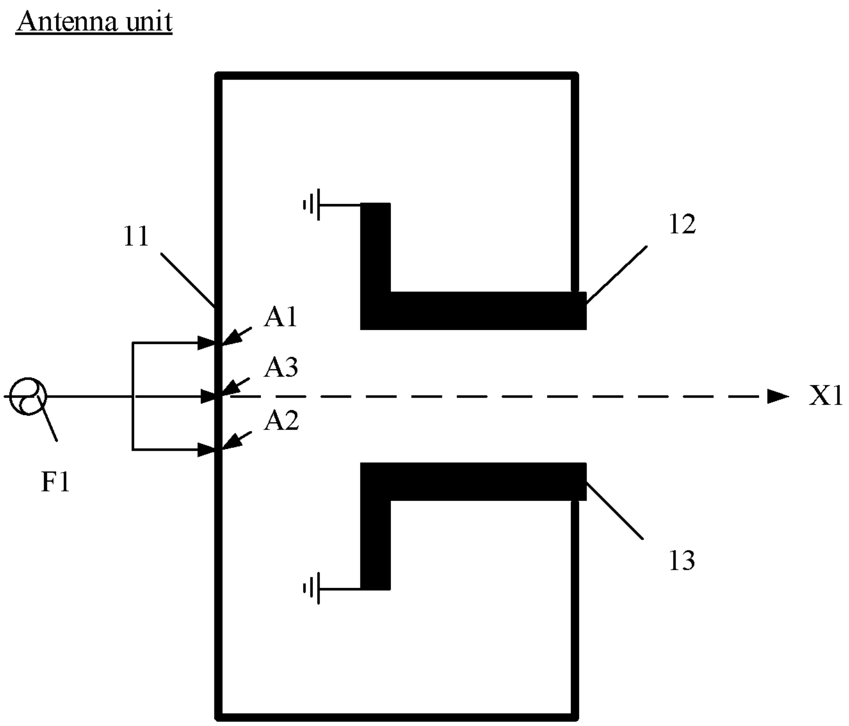
FIG. 6*c* is a schematic diagram in which a first feed is connected to a first radiation section in a first direction in an antenna unit according to an embodiment of this application.

Optionally, the second radiation section 12 and the third radiation section 13 may be disposed inside the first radiation section 11 in the first direction X1, so that inner space of the first radiation section 11 can be fully used to dispose the second radiation section 12 and the third radiation section 13, to help arrange the antenna unit in relatively small space, so as to improve space utilization of the antenna unit. Based on the foregoing description, the second radiation section 12 and the third radiation section 13 may be in a plurality of shapes. FIG. 4*a*, FIG. 6*b*, and FIG. 6*c* are used as examples for description. For ease of description, the second radiation section 12 and the third radiation section 13 shown in FIG. 4*a* are in long strip shapes, and the second radiation section 12 and the third radiation section 13 shown in FIG. 4*b* and FIG. 4*c* are in different irregular shapes.

Figure 4D:
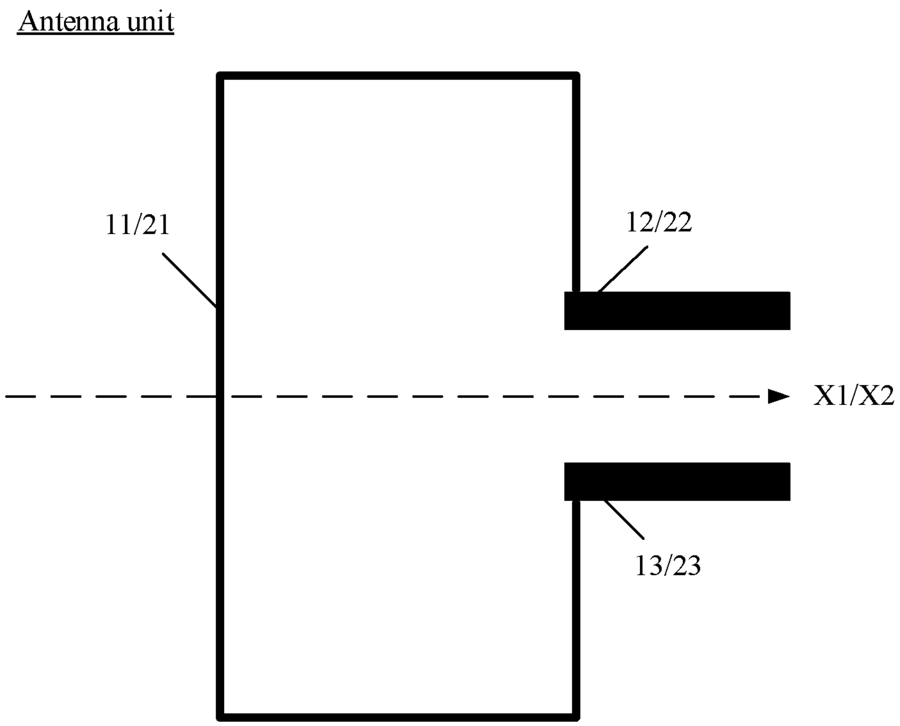
FIG. 4*d* is a schematic diagram of a second radiation section and a third radiation section or a fifth radiation section and a sixth radiation section in an antenna unit according to an embodiment of this application.

Optionally, the second radiation section 12 and the third radiation section 13 may be disposed outside the first radiation section 11 in the first direction X1, to provide a possibility for implementing the antenna unit, so that the antenna unit can meet a space requirement in an actual situation. Based on the foregoing description, the second radiation section 12 and the third radiation section 13 may be in a plurality of shapes. FIG. 4*d* is used as an example for description. For ease of description, the second radiation section 12 and the third radiation section 13 shown in FIG. 4*d* are in long strip shapes.

Figure 4E:
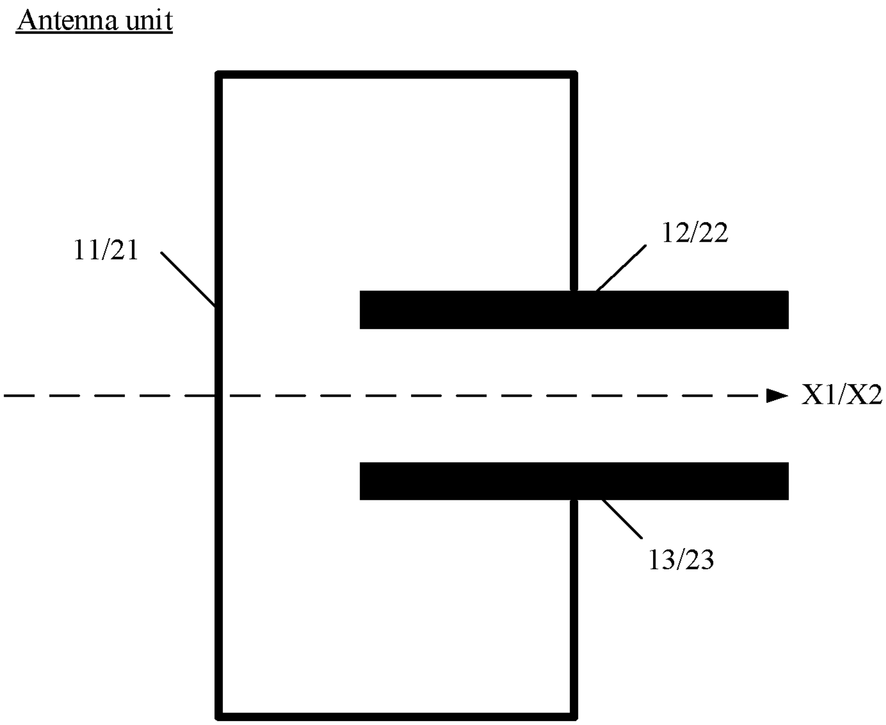
FIG. 4*e* is a schematic diagram of a second radiation section and a third radiation section or a fifth radiation section and a sixth radiation section in an antenna unit according to an embodiment of this application.

Optionally, the second radiation section 12 and the third radiation section 13 may be disposed to extend from an inside of the first radiation section 11 to an outside of the first radiation section 11 in the first direction X1, to provide another possibility for implementing the antenna unit, so that the antenna unit can meet a space requirement in an actual situation. Based on the foregoing description, the second radiation section 12 and the third radiation section 13 may be in a plurality of shapes. FIG. 4*e* is used as an example for description. The second radiation section 12 and the third radiation section 13 shown in FIG. 4*e* are in long strip shapes.

Figure 4F:
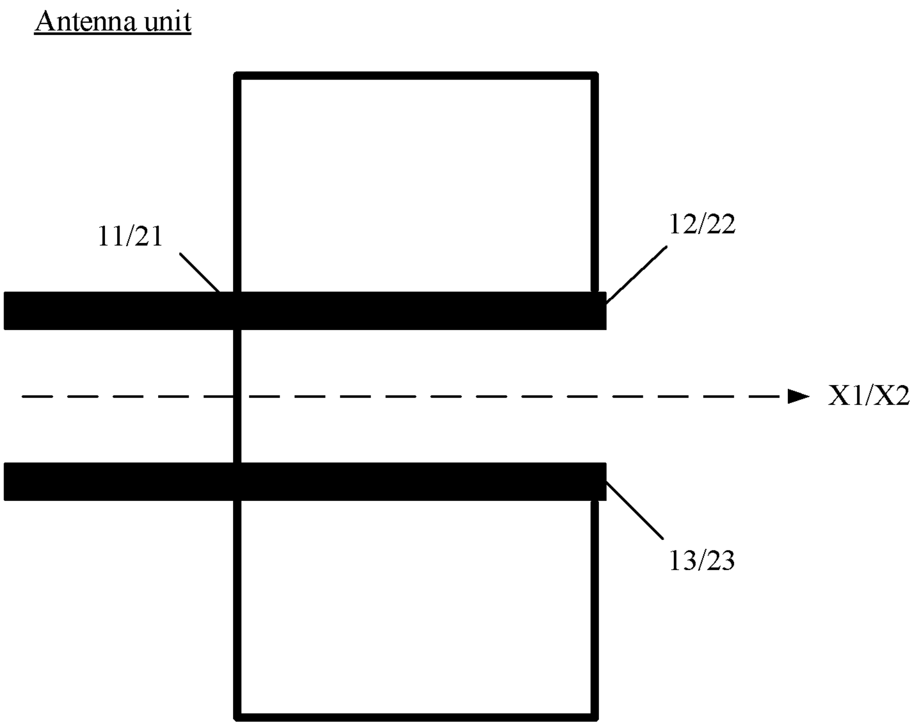
FIG. 4*f* is a schematic diagram of a second radiation section and a third radiation section or a fifth radiation section and a sixth radiation section in an antenna unit according to an embodiment of this application.

Optionally, the second radiation section 12 and the third radiation section 13 may be disposed to extend from an inside of the first radiation section 11 to an outside of the first radiation section 11 in a direction opposite to the first direction X1, to provide another possibility for implementing the antenna unit, so that the antenna unit can meet a space requirement in an actual situation. Based on the foregoing description, the second radiation section 12 and the third radiation section 13 may be in a plurality of shapes. FIG. 4*f* is used as an example for description. The second radiation section 12 and the third radiation section 13 shown in FIG. 4*f* are in long strip shapes.

In addition, both the second radiation section 12 and the third radiation section 13 are grounded. Grounding manners of the second radiation section 12 and the third radiation section 13 are not limited in this application. The grounding manners of the second radiation section 12 and the third radiation section 13 are described below with reference to FIG. 5*a* to FIG. 5*c*.

Optionally, the second radiation section 12 is connected to N first ground points of an electronic device, and the third radiation section 13 is connected to N second ground points of the electronic device, where N is a positive integer. A specific value of N is not limited in this application. For ease of description, in FIG. 5*a* to FIG. 5*c*, the first ground point and the second ground point are illustrated by using a ground symbol.

Figure 5A:
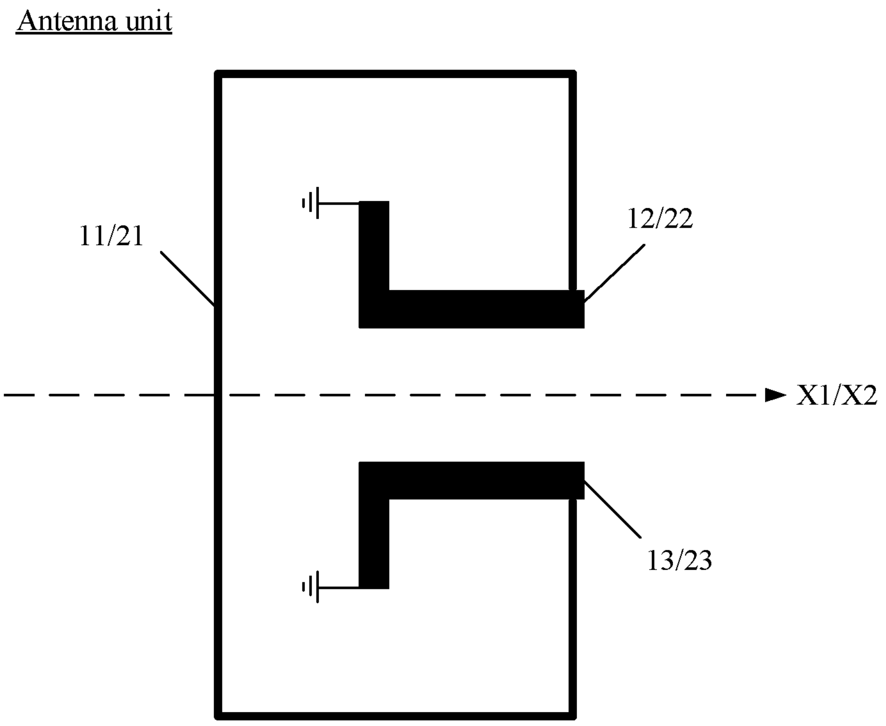
FIG. 5*a* is a schematic diagram of grounding manners of a second radiation section and a third radiation section or a fifth radiation section and a sixth radiation section in an antenna unit according to an embodiment of this application.

For example, N=1. In this case, based on the first loop branch 10 shown in FIG. 4*b*, it is shown in FIG. 5*a* that the second radiation section 12 is connected to one first ground point, and the third radiation section 13 is connected to one second ground point.

Figure 5B:
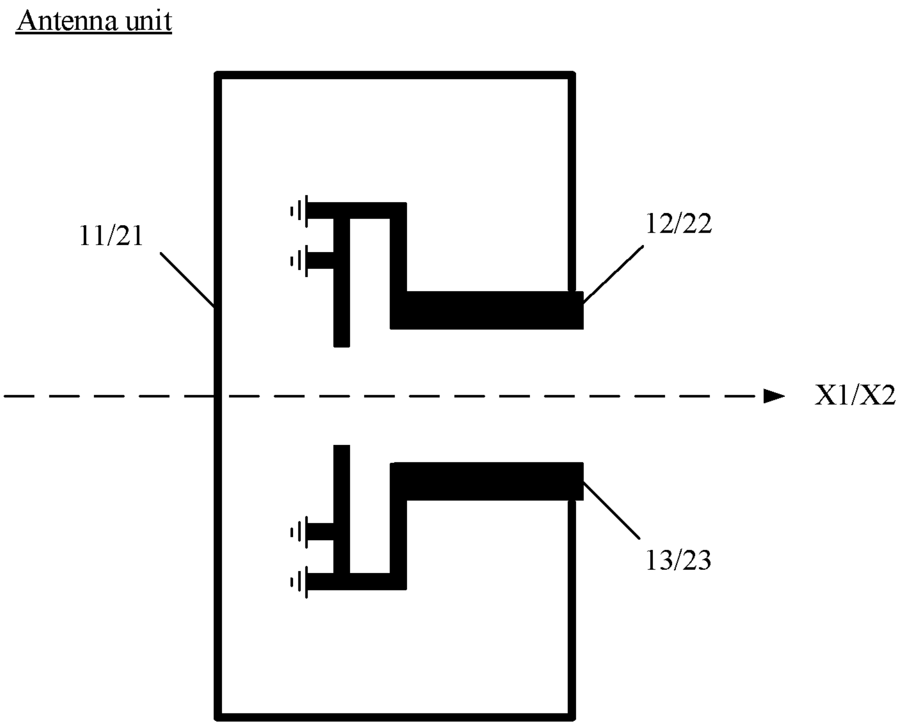
FIG. 5*b* is a schematic diagram of grounding manners of a second radiation section and a third radiation section or a fifth radiation section and a sixth radiation section in an antenna unit according to an embodiment of this application.

For example, N=2. In this case, based on the first loop branch 10 shown in FIG. 4*c*, it is shown in FIG. 5*b* that the second radiation section 12 is connected to two first ground points, and the third radiation section 13 is connected to two second ground points. It should be noted that based on the first loop branch 10 shown in FIG. 4*c*, the second radiation section 12 may alternatively be connected to one first ground point, and the third radiation section 13 may be connected to one second ground point.

Specific implementations of the first ground point and the second ground point of the electronic device are not limited in this application. A person skilled in the art may understand that components in the electronic device need to share a ground. Therefore, the first ground point and the second ground point need to be connected to a ground of a printed circuit board in the electronic device.

When the antenna unit in this application is manufactured by using a bracket, the second radiation section 12 and the third radiation section 13 are disposed on the bracket, and the first ground point and the second ground point may be disposed in a plurality of manners. Two feasible implementations are used as examples below for illustration.

In a feasible implementation, the first ground point and the second ground point may be disposed on the printed circuit board. The first ground point and the second ground point may be the ground of the printed circuit board, and do not need to be separately disposed. Alternatively, the first ground point and the second ground point may be separately disposed, and connected to the ground of the printed circuit board by using traces on the printed circuit board. Therefore, the second radiation section 12 and the third radiation section 13 are respectively connected to the first ground point and the second ground point on the printed circuit board by using different traces on the bracket. The different traces on the bracket are usually symmetrically disposed in the first direction X1. In this way, a spring is saved, and this solution is simple and easy to implement.

In another feasible implementation, the first ground point and the second ground point may be disposed on the bracket, so that the second radiation section 12 is connected to the first ground point, and the third radiation section 13 is connected to the second ground point. In addition, each of the first ground point and the second ground point needs to be connected to the ground of the printed circuit board by using a spring on the bracket, and no trace needs to be arranged on the bracket.

Figure 5C:
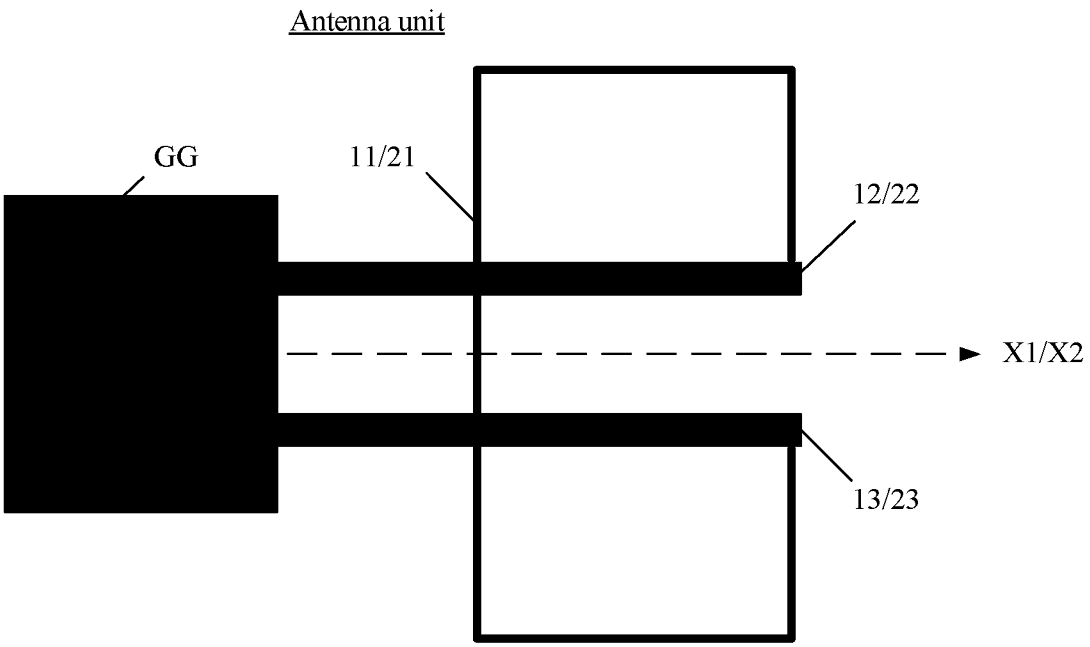
FIG. 5*c* is a schematic diagram of grounding manners of a second radiation section and a third radiation section or a fifth radiation section and a sixth radiation section in an antenna unit according to an embodiment of this application.

Optionally, both the second radiation section 12 and the third radiation section 13 may be connected to a ground region of the electronic device, and the ground region is symmetrically disposed in the first direction X1. For ease of description, based on the first loop branch 10 shown in FIG. 4*f*, it is shown in FIG. 5*c* that both the second radiation section 12 and the third radiation section 13 are connected to the ground region (the ground region is illustrated by using GG in FIG. 5*c*).

A specific size and position of the ground region are not limited in this application. The ground region may be disposed on the printed circuit board in the electronic device, may be disposed as a conductive fabric connected to a ground of the electronic device, or may be disposed as a conductive plate that is connected to a ground of the electronic device and that is below a screen of the electronic device. This is not limited in this application.

In this application, the first feed F1 is symmetrically connected to the first radiation section 11 in the first direction X1, so that there are one or more first contact points between the first feed F1 and the first radiation section 11. A quantity and a position of first contact points are not limited in this application provided that it is met that all the first contact points are symmetrical in the first direction X1.

Based on the first loop branch 10 shown in FIG. 5*b* and with reference to FIG. 6*a* to FIG. 6*c*, three feasible implementations are used as examples below to illustrate a case in which the first feed F1 is connected to the first radiation section 11 in the first direction X1. In FIG. 6*a* to FIG. 6*c*, the first radiation section 11 is symmetrical in the first direction X1, and therefore a symmetry axis of the first radiation section 11 overlaps the first direction X1.

In a feasible implementation, there is one first contact point between the first feed F1 and the first radiation section 11, and the first contact point is a symmetry point of the first radiation section 11, and is located on the first radiation section 11, in other words, a point A in FIG. 6*a* is the first contact point.

In another feasible implementation, there are P (an even number) first contact points between the first feed F1 and the first radiation section 11, the P (an even number) first contact points are symmetrically disposed in the first direction X1, and the P (an even number) first contact points are located on a radiation section, in the first radiation section 11, on which a symmetry point of the first radiation section 11 is located.

A specific value of the even number P is not limited in this application, and a distance between any two first contact points is not limited in this application. For ease of description, when the even number P is equal to 2, as shown in FIG. 6*b*, a point A1 and a point A2 are two first contact points, and the point A1 and the point A2 are symmetrical in the first direction X1.

In another feasible implementation, with reference to the foregoing two implementations, there are Q (an odd number) first contact points between the first feed F1 and the first radiation section 11. The odd number Q is greater than or equal to 3. The Q (an odd number) first contact points include one first contact point and P (an even number) first contact points. The one first contact point is a symmetry point of the first radiation section 11, and is located on the first radiation section 11. The P (an even number) first contact points are symmetrically disposed in the first direction X1, and the P (an even number) first contact points are located on a radiation section, in the first radiation section 11, on which the symmetry point of the first radiation section 11 is located. Therefore, the Q (an odd number) first contact points are symmetrically disposed in the first direction X1.

A specific value of the odd number Q is not limited in this application, and a distance between any two first contact points is not limited in this application. For ease of description, when the odd number Q is equal to 3, as shown in FIG. 6*c*, a point A1, a point A2, and a point A3 are three first contact points, and the point A1, the point A2, and the point A3 are symmetrical in the first direction X1.

In addition, a first matching component may be disposed between the first feed F1 and the first contact point, to adjust a frequency band of the antenna unit, so that the first feed F1 can obtain a better pattern and better cross polarization performance, to improve performance of the antenna unit. A specific implementation form of the first matching component is not limited in this application. For example, the first matching component may be a capacitor, an inductor, a capacitor and an inductor, a capacitor and a switch, an inductor and a switch, or a capacitor, an inductor, and a switch. In this application, no limitation is imposed on a capacitance value and a quantity of capacitors, an inductance value and a quantity of inductors, a type and a quantity of switches, or a connection relationship between any two of the capacitor, the inductor, and the switch.

In this application, the second feed F2 is separately connected to the second radiation section 12 and the third radiation section 13. In this application, a contact point between the second feed F2 and the second radiation section 12 is referred to as a second contact point, and a contact point between the second feed F2 and the second radiation section 12 is referred to as a third contact point. The second contact point and the third contact point are symmetrical in the first direction X1.

In addition, the second contact point is disposed at any position on a side that is of the second radiation section 12 and that is opposite to the third radiation section 13, the third contact point is disposed at any position on a side that is of the third radiation section 13 and that is opposite to the second radiation section 12, and a distance between the second contact point and the third contact point falls within a first preset range, to ensure the performance of the antenna unit.

A specific magnitude of the first preset range is not limited in this application provided that the distance between the second contact point and the third contact point can ensure that the antenna unit has good performance.

Figure 7A:
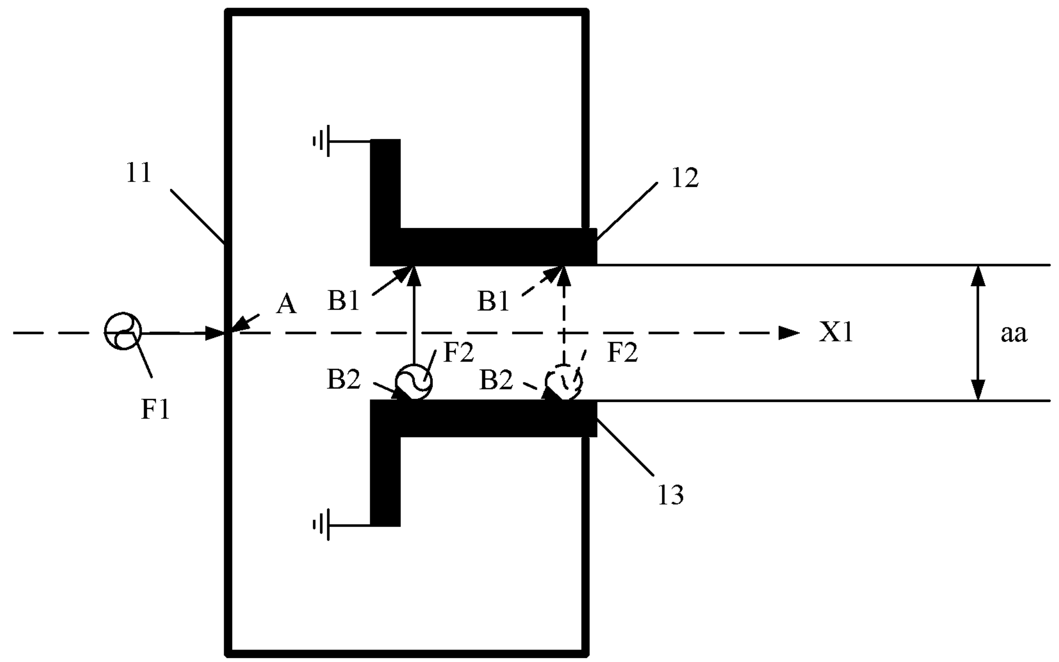
FIG. 7*a* is a schematic diagram in which a second feed is separately connected to a second radiation section and a third radiation section in an antenna unit according to an embodiment of this application.
Figure 7B:
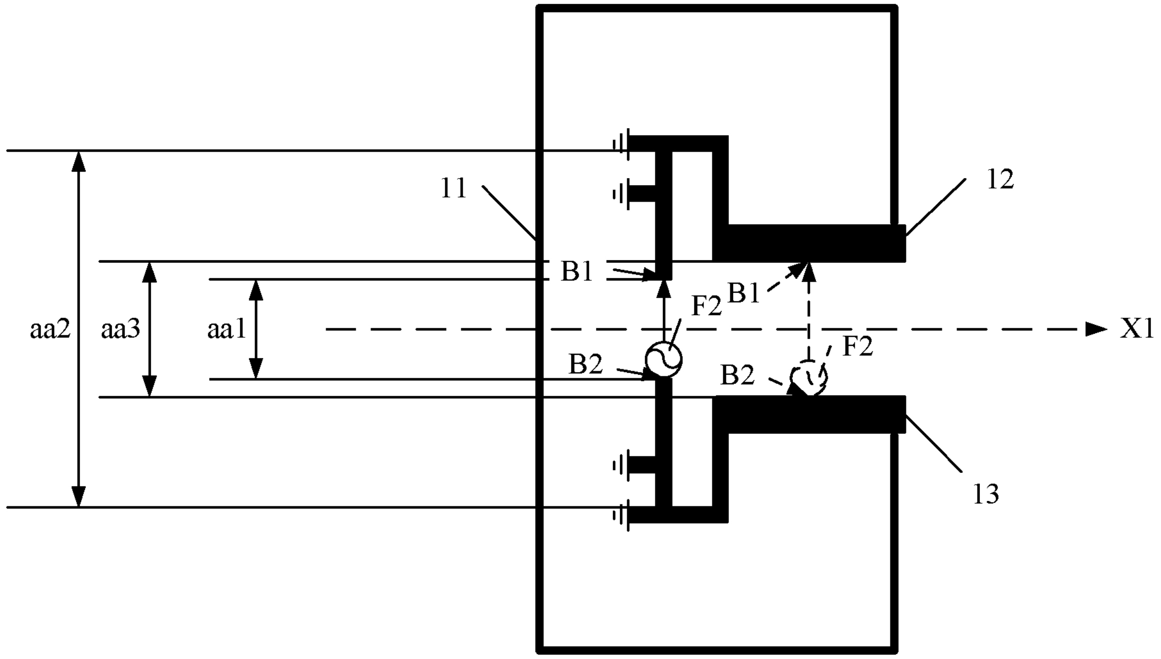
FIG. 7*b* is a schematic diagram in which a second feed is separately connected to a second radiation section and a third radiation section in an antenna unit according to an embodiment of this application.

With reference to FIG. 7*a* and FIG. 7*b*, a specific implementation in which the second feed F2 is separately connected to the second radiation section 12 and the third radiation section 13 is illustrated below.

Based on the first loop branch 10 shown in FIG. 6*a*, as shown in FIG. 7*a*, there is a same distance between the second radiation section 12 and the third radiation section 13, the distance is aa, and the distance aa falls within the first preset range. Therefore, the second feed F2 may be disposed at any position between the second radiation section 12 and the third radiation section 13. For ease of description, in FIG. 7*a*, an example in which the second feed F2 is disposed at each of a position corresponding to a solid line and a position corresponding to a dashed line is used for illustration.

Based on the first loop branch 10 shown in FIG. 5*b* and the fact that there is one first contact point between the first feed F1 and the first radiator, as shown in FIG. 7*b*, a minimum distance and a maximum distance between the second radiation section 12 and the third radiation section 13 are respectively a distance aa1 and a distance aa2. The first preset range is set to be less than or equal to a distance aa3, and the distance aa3 is less than the distance aa2 and greater than the distance aa1. Therefore, the second feed F2 may be disposed at any position corresponding to a distance that is greater than or equal to the distance aa1 and less than or equal to the distance aa3. For ease of description, in FIG. 7*b*, an example in which the second feed F2 is disposed at each of a position corresponding to the distance aa1 and a position corresponding to the distance aa3 is used for illustration.

In addition, a second matching component may be disposed between the second feed F2 and the second contact point and/or between the second feed F2 and the third contact point, to adjust the frequency band of the antenna unit, so that the second feed F2 can obtain a better pattern and better cross polarization performance, to improve the performance of the antenna unit. A specific implementation form of the second matching component is not limited in this application. For example, the second matching component may be a capacitor, an inductor, a capacitor and an inductor, a capacitor and a switch, an inductor and a switch, or a capacitor, an inductor, and a switch. In this application, no limitation is imposed on a capacitance value and a quantity of capacitors, an inductance value and a quantity of inductors, a type and a quantity of switches, or a connection relationship between any two of the capacitor, the inductor, and the switch.

Based on the foregoing embodiment, the antenna unit may further include a first non-conductive support member 14, a first conductive member 15, and a second conductive member 16. The first conductive member 15 and the second conductive member 16 are suspended by using the first non-conductive support member 14, and the first conductive member 15 and the second conductive member 16 are symmetrically disposed in the first direction X1. A length of the first conductive member 15 is a ½ wavelength, and a length of the second conductive member 16 is a ½ wavelength. The wavelength is a wavelength corresponding to any frequency in an operating frequency band of the antenna unit.

In this application, the first conductive member 15 and the second conductive member 16 are made of conductive materials, and may be suspended by using the first non-conductive support member 14 in a manner such as a manner of using a surface-mount technology or etching. Therefore, the first conductive member 15 and the second conductive member 16 can extend a bandwidth of the antenna unit, to improve the performance of the antenna unit. Usually, larger widths of the first conductive member 15 and the second conductive member 16 indicate better performance of the antenna unit.

Figure 8A:
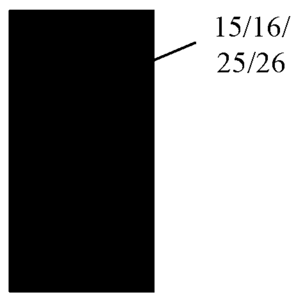
FIG. 8*a* is a schematic diagram of a shape of a first conductive member, a second conductive member, a third conductive member, or a fourth conductive member in an antenna unit according to an embodiment of this application.
Figure 8B:
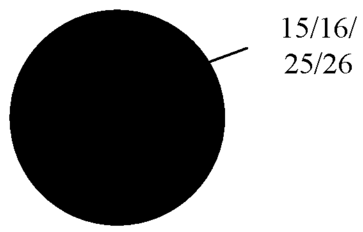
FIG. 8*b* is a schematic diagram of a shape of a first conductive member, a second conductive member, a third conductive member, or a fourth conductive member in an antenna unit according to an embodiment of this application.
Figure 8C:
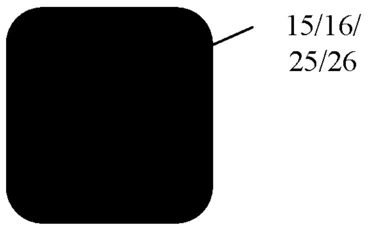
FIG. 8*c* is a schematic diagram of a shape of a first conductive member, a second conductive member, a third conductive member, or a fourth conductive member in an antenna unit according to an embodiment of this application.
Figure 9A:
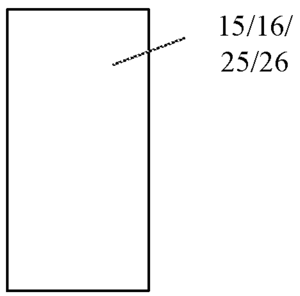
FIG. 9*a* is a schematic diagram of a shape of a first conductive member, a second conductive member, a third conductive member, or a fourth conductive member in an antenna unit according to an embodiment of this application.
Figure 9B:
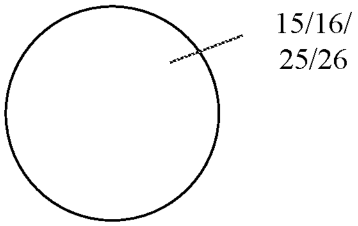
FIG. 9*b* is a schematic diagram of a shape of a first conductive member, a second conductive member, a third conductive member, or a fourth conductive member in an antenna unit according to an embodiment of this application.
Figure 9C:
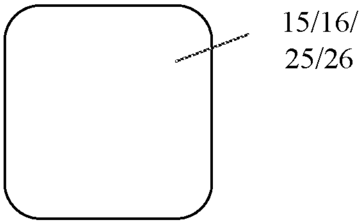
FIG. 9*c* is a schematic diagram of a shape of a first conductive member, a second conductive member, a third conductive member, or a fourth conductive member in an antenna unit according to an embodiment of this application.

The first conductive member 15 or the second conductive member 16 may be in a plurality of shapes. Optionally, the first conductive member 15 or the second conductive member 16 may be in a regular patch shape (patch) shown in FIG. 8*a* to FIG. 8*c*, may be in an irregular patch shape, may be in a regular closed ring shape shown in FIG. 9*a* to FIG. 9*c*, or may be in an irregular closed ring shape. A specific shape of the first conductive member 15 or the second conductive member 16 is not limited in this application provided that it is met that the first conductive member 15 and the second conductive member 16 are symmetrically disposed in the first direction X1.

In addition, parameters such as widths, quantities, and positions of first conductive members 15 and second conductive members 16 are also not limited in this application. Based on the antenna unit shown in FIG. 7*a* and with reference to FIG. 10*a* to FIG. 10*f*, the positions of the first conductive member 15 and the second conductive member 16 are described below by using examples. For ease of description, in FIG. 10*a* to FIG. 10*c*, an example in which the first conductive member 15 and the second conductive member 16 are in rectangular cross-sectional shapes is used for illustration, and in FIG. 10*d* to FIG. 10*f*, an example in which the first conductive member 15 and the second conductive member 16 are rectangular closed rings is used for illustration.

Figure 10A:
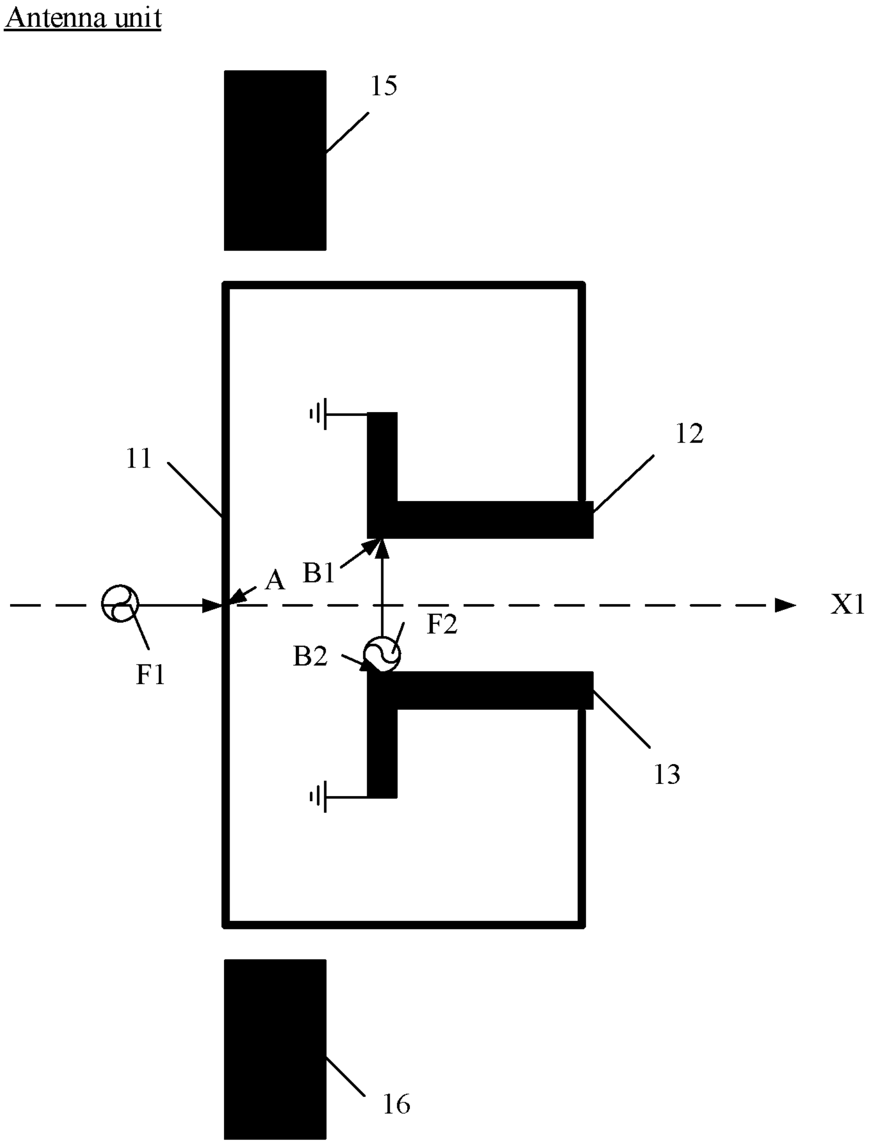
FIG. 10*a* is a schematic diagram of positions of a first conductive member and a second conductive member in an antenna unit according to an embodiment of this application.
Figure 10B:
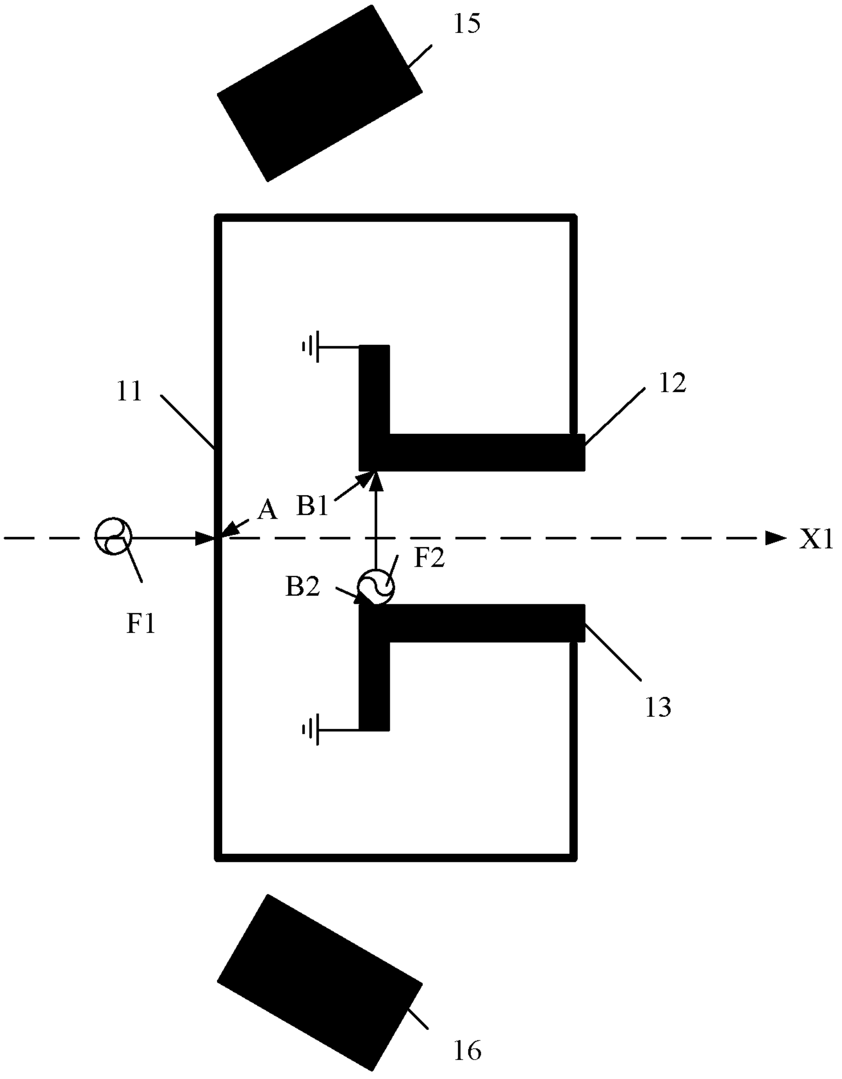
FIG. 10*b* is a schematic diagram of positions of a first conductive member and a second conductive member in an antenna unit according to an embodiment of this application.
Figure 10C:
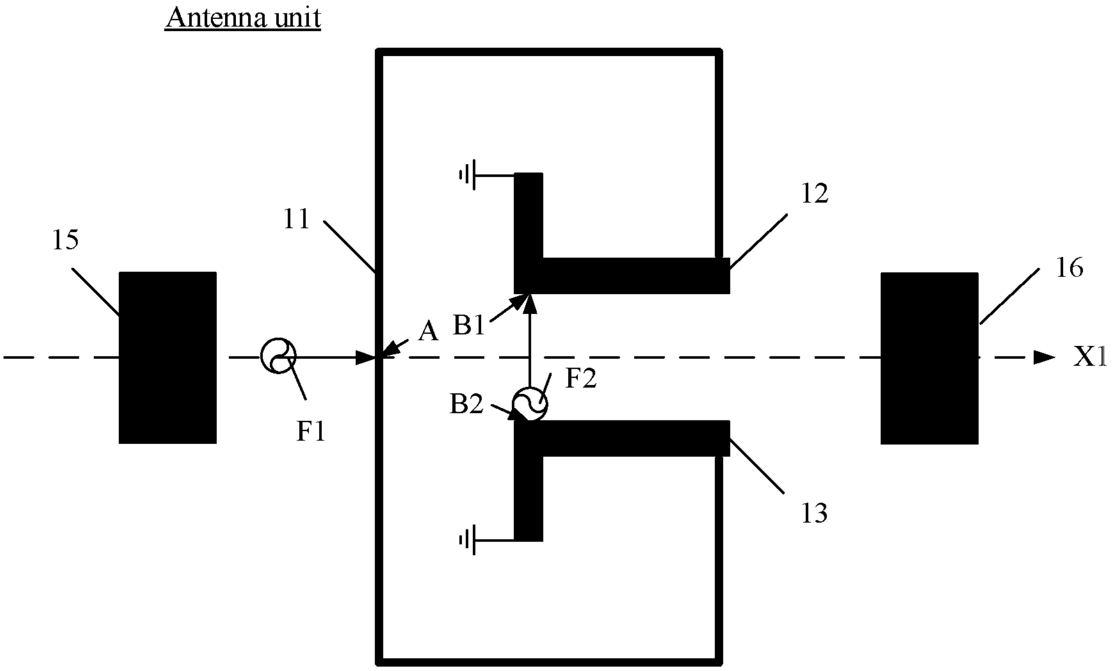
FIG. 10*c* is a schematic diagram of positions of a first conductive member and a second conductive member in an antenna unit according to an embodiment of this application.

Optionally, the first conductive member 15 and the second conductive member 16 may be disposed outside the first radiation section 11. For example, the first conductive member 15 and the second conductive member 16 may be horizontally symmetrically disposed outside the first radiation section 11 in the first direction X1, as shown in FIG. 10*a* and FIG. 10*b*. In FIG. 10*a*, a direction of placing the first conductive member 15 and the second conductive member 16 is perpendicular to the first direction X1, and in FIG. 10*b*, a direction of placing the first conductive member 15 and the second conductive member 16 is not perpendicular to the first direction X1. For another example, the first conductive member 15 and the second conductive member 16 may be vertically symmetrically disposed outside the first radiation section 11 in the first direction X1, as shown in FIG. 10*c*.

Figure 10D:
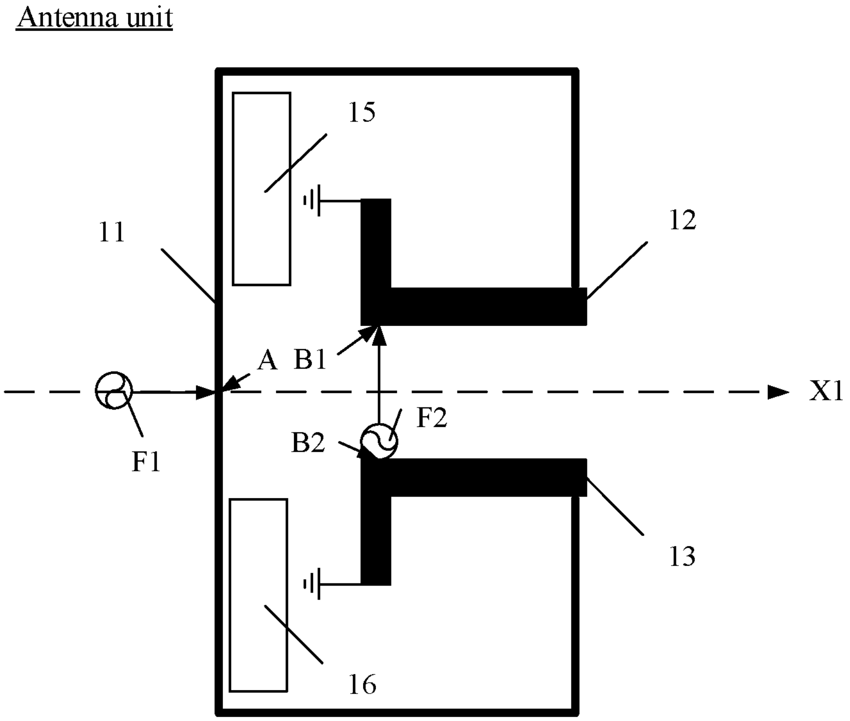
FIG. 10*d* is a schematic diagram of positions of a first conductive member and a second conductive member in an antenna unit according to an embodiment of this application.
Figure 10E:
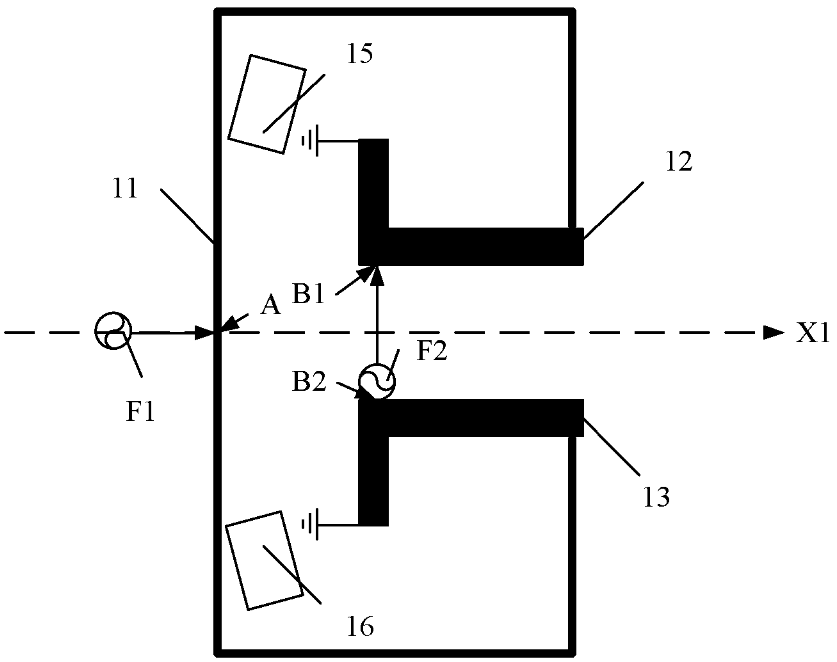
FIG. 10*e* is a schematic diagram of positions of a first conductive member and a second conductive member in an antenna unit according to an embodiment of this application.
Figure 10F:
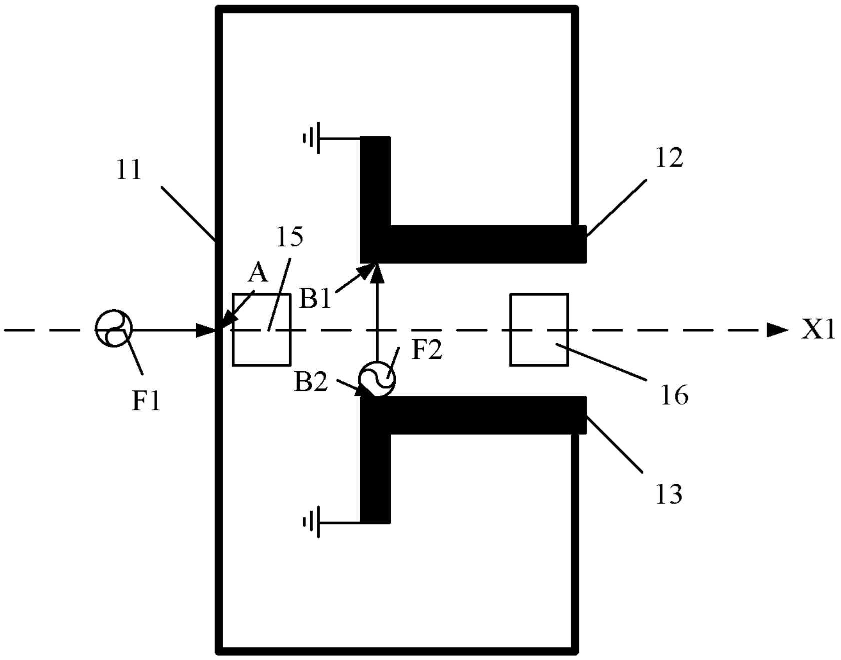
FIG. 10*f* is a schematic diagram of positions of a first conductive member and a second conductive member in an antenna unit according to an embodiment of this application.

Optionally, the first conductive member 15 and the second conductive member 16 may be disposed inside the first radiation section 11. For example, the first conductive member 15 and the second conductive member 16 may be horizontally symmetrically disposed inside the first radiation section 11 in the first direction X1, as shown in FIG. 10*d* and FIG. 10*e*. In FIG. 10*d*, a direction of placing the first conductive member 15 and the second conductive member 16 is perpendicular to the first direction X1, and in FIG. 10*e*, a direction of placing the first conductive member 15 and the second conductive member 16 is not perpendicular to the first direction X1. For another example, the first conductive member 15 and the second conductive member 16 may be vertically symmetrically disposed inside the first radiation section 11 in the first direction X1, as shown in FIG. 10*f*.

It should be noted that the positions of the first conductive member 15 and the second conductive member 16 are not limited to the foregoing implementations.

In addition, the first non-conductive support member 14 is made of a non-conductive material. Parameters such as a quantity, a material, and a position of first non-conductive support members 14 are not limited in this application. Optionally, the first non-conductive support member 14 may be a glass battery cover, a plastic battery cover, or an explosion-proof film. This is not limited in this application.

In a specific embodiment, based on the antenna unit shown in FIG. 5*c* and with reference to FIG. 11*a* to FIG. 11*d*, a structure and the performance of the antenna unit in this application are described in detail.

Figure 11A:
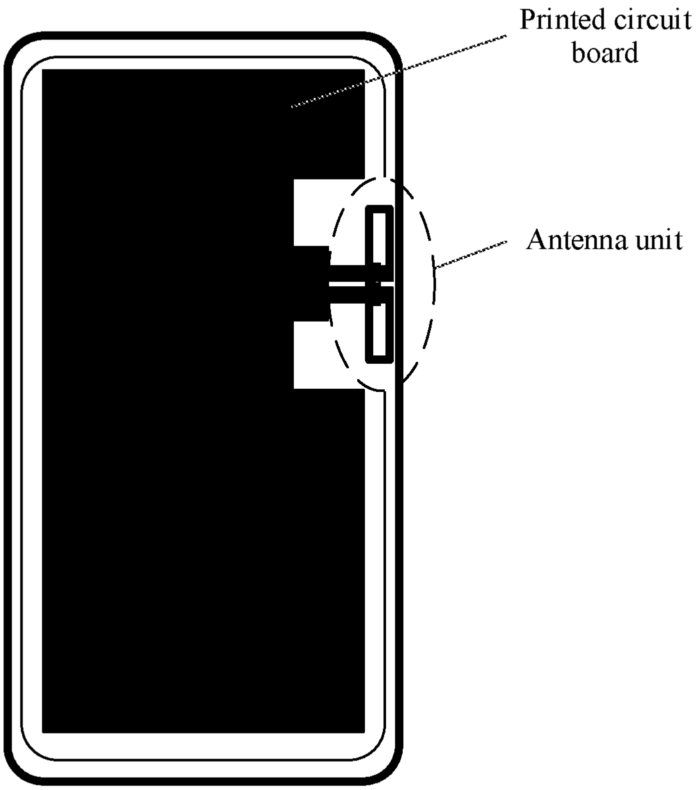
FIG. 11*a* is a schematic diagram of an overall structure of an electronic device.

FIG. 11*a* is a schematic diagram of an overall structure of an electronic device. As shown in FIG. 11*a*, the electronic device may include the printed circuit board, a middle frame, and the antenna unit shown in FIG. 5*c*. As shown in FIG. 11*a* and FIG. 5*c*, the second radiation section 12 may be connected to the ground region GG of the electronic device, and the ground region GG of the electronic device is connected to the ground of the printed circuit board by using a spring foot 1 on the middle frame of the electronic device. The third radiation section 13 may be connected to the ground region GG of the electronic device, and the ground region GG of the electronic device is connected to the ground of the printed circuit board by using a spring foot 2 on the middle frame of the electronic device.

The middle frame may be used as a structural support of the printed circuit board, and may be further used to be connected to the spring, so that the ground region GG, the first ground point, and the second ground point of the electronic device may be connected to the ground of the printed circuit board. A quantity and a position of springs on the middle frame are not limited in this application. For ease of description, in FIG. 11*a*, an example in which the electronic device is a mobile phone is used for illustration, and the middle frame, the spring foot 1, and the spring foot 2 are not illustrated.

Figure 11B:
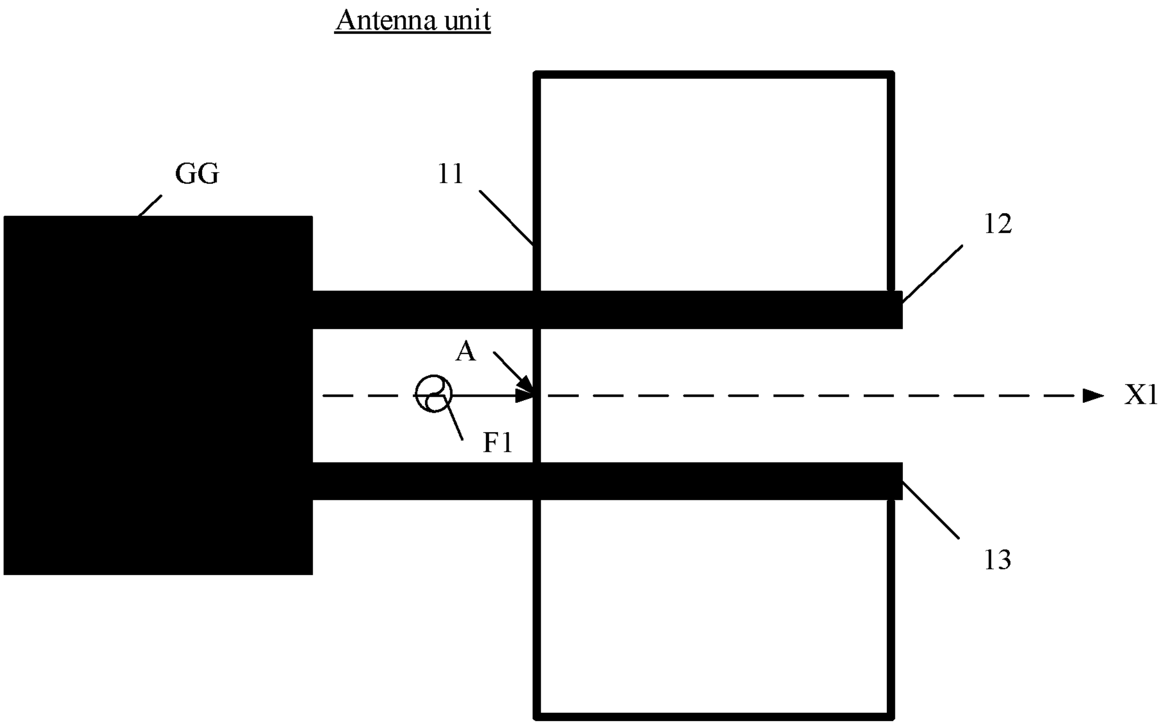
FIG. 11*b* is a schematic diagram of a topology of an antenna unit according to an embodiment of this application.
Figure 11C:
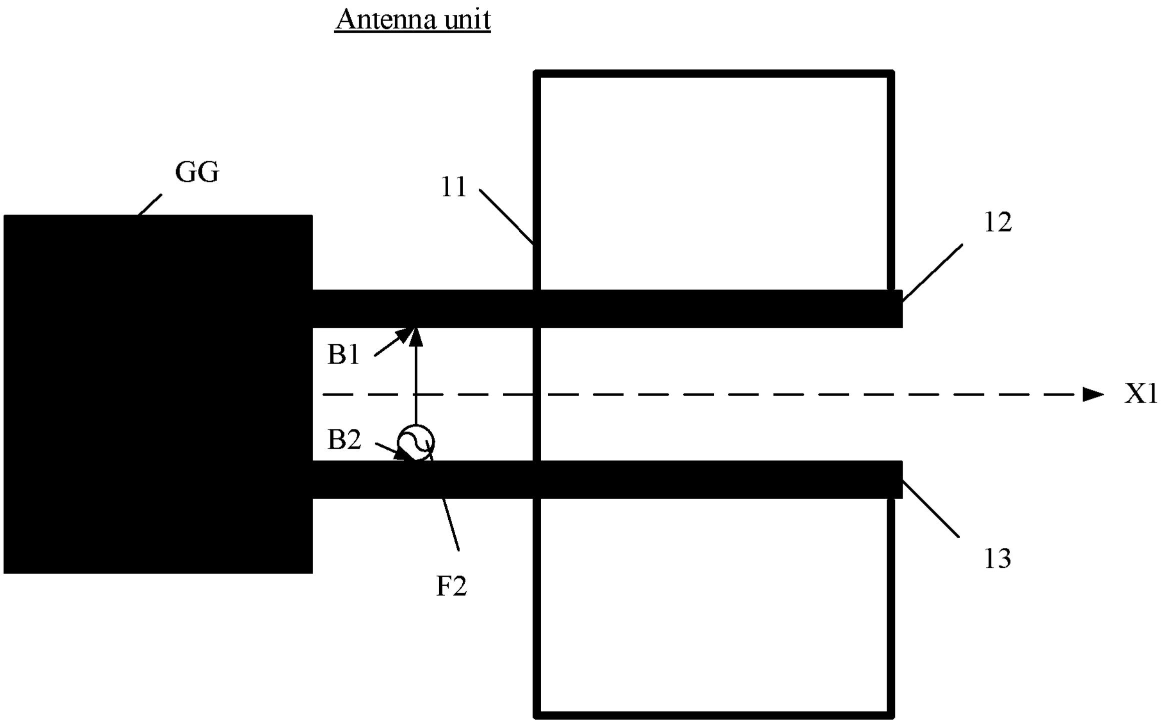
FIG. 11*c* is a schematic diagram of a topology of an antenna unit according to an embodiment of this application.

FIG. 11*b* and FIG. 11*c* respectively show schematic diagrams of topologies of the antenna units in FIG. 11*a* and FIG. 5*c*. As shown in FIG. 11*b*, the first feed F1 is connected to one first contact point in the first direction X1, and the first contact point is the symmetry point of the first radiation section 11, and is located on the first radiation section 11, to implement symmetrical feeding of the antenna unit, so as to excite a signal at a C-mode port of the first loop branch 10. As shown in FIG. 11*c*, the second feed F2 is separately connected to the second radiation section 12 and the third radiation section 13, to implement anti-symmetrical feeding of the antenna unit, so as to excite a signal at a D-mode port of the first loop branch 10.

Figure 11D:
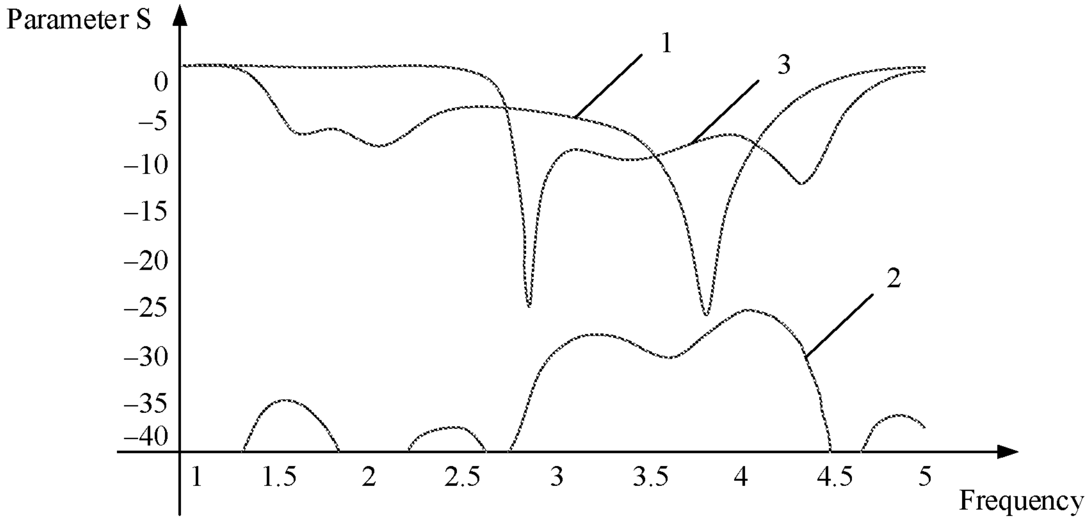
FIG. 11*d* is a schematic diagram of waveforms of S parameters of a first feed and a second feed in FIG. 11*b* and FIG. 11*c* on different operating frequency bands.

FIG. 11*d* is a schematic diagram of waveforms of S parameters of the first feed F1 and the second feed F2 in FIG. 1*b* and FIG. 11*c* on different operating frequency bands. In FIG. 11*d*, a horizontal coordinate is a frequency in a unit of GHz, and a vertical coordinate is an input reflection coefficient S11, a reverse transmission coefficient S12/a forward transmission coefficient S21, and an output reflection coefficient S22 in S parameters, and is in a unit of dB. As shown in FIG. 11*d*, a curve 1 represents an input reflection coefficient S11 of the first feed F1, a curve 2 represents reverse transmission coefficients S12/forward transmission coefficients S21 of the first feed F1 and the second feed F2, and a curve 3 represents an output reflection coefficient S22 of the second feed F2.

Figure 11E:
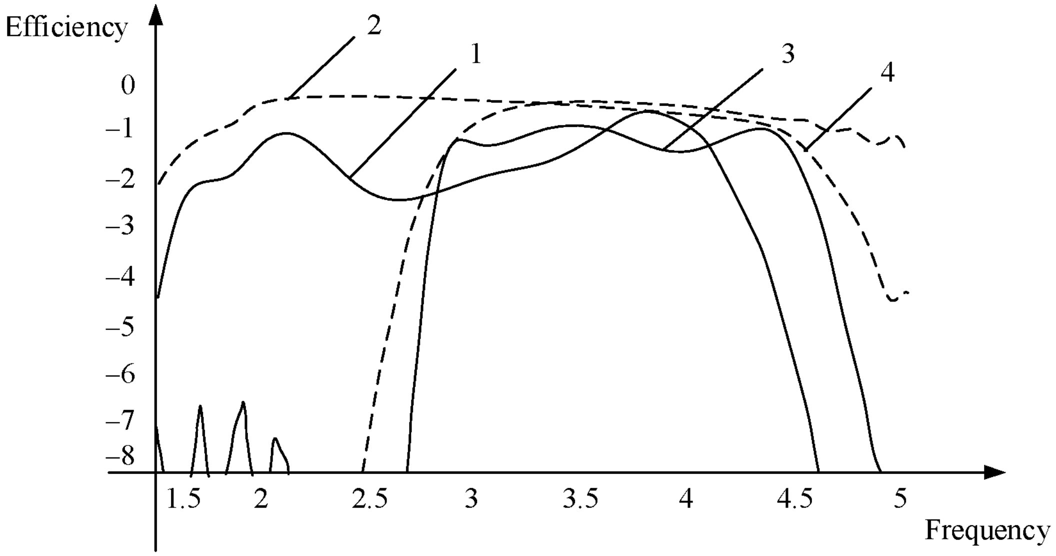
FIG. 11*e* is a schematic diagram of waveforms of system efficiency and radiation efficiency of each of a first feed and a second feed in FIG. 11*b* and FIG. 11*c;*

FIG. 11*e* is a schematic diagram of waveforms of system efficiency and radiation efficiency of each of the first feed F1 and the second feed F2 in FIG. 11*b* and FIG. 11*c*. In FIG. 11*e*, a horizontal coordinate is a frequency in a unit of GHz, and a vertical coordinate is system efficiency in a unit of dB. As shown in FIG. 11*e*, a curve 1 represents system efficiency of the first feed F1, a curve 2 represents radiation efficiency of the first feed F1, a curve 3 represents system efficiency of the second feed F2, and a curve 4 represents radiation efficiency of the second feed F2.

In Embodiment 1, based on a symmetrical arrangement of a same loop antenna (namely, the first loop branch), the antenna unit respectively excites the signal at the C-mode port and the signal at the D-mode port of the loop antenna by using two feeds, so that the signal at the C-mode port is self-canceled at the D-mode port, and the signal at the D-mode port is self-canceled at the C-mode port, to implement signal isolation between the two ports, and the signal at the C-mode port and the signal at the D-mode port are complementary to each other in different radiation directions, to implement two antennas with high isolation and a low ECC. In this way, good antenna performance can be ensured, so that the electronic device can fully use the antenna unit in limited space to implement various scenarios. In addition, the electronic device can include a larger quantity of antennas in the limited space, to improve utilization of antenna space.

Embodiment 2

A similarity between Embodiment 1 and Embodiment 2 in structure is that the antenna unit includes a loop antenna and two feeds, and there is a same specific implementation of the loop antenna. A difference between Embodiment 1 and Embodiment 2 is that in comparison with the antenna unit in Embodiment 1, a branch is newly added to the antenna unit in Embodiment 2.

In terms of connection manner, a similarity between Embodiment 1 and Embodiment 2 is that there is a same connection manner of one of the two feeds, and the feed is connected to the loop antenna. A difference between Embodiment 1 and Embodiment 2 is that there is a different connection manner of the other feed in the two feeds. In Embodiment 1, the feed is connected to the loop branch, and in Embodiment 2, the feed is connected to the newly added branch.

In Embodiment 2, the antenna unit in this application may include a second loop branch 20, a feeding branch 27, a third feed F3, and a fourth feed F4.

For a specific implementation of the second loop branch 20, refer to the description content of the first loop branch in Embodiment 1. Details are not described herein.

In this application, the second loop branch 20 may include a fourth radiation section 21, a fifth radiation section 22, and a sixth radiation section 23.

The fourth radiation section 21 is in a ring shape. For a specific shape of the fourth radiation section 21, refer to the description content of the shape of the first radiation section in Embodiment 1. Details are not described herein. For example, for the shape of the fourth radiation section 21, refer to the shape of the first radiation section shown in FIG. 3*a* to FIG. 3*e*.

In addition, the fourth radiation section 21 is not closed, and includes two ends. One end of the fourth radiation section 21 is connected to the fifth radiation section 22, and the other end of the fourth radiation section 21 is connected to the sixth radiation section 23. The fifth radiation section 22 and the sixth radiation section 23 are symmetrically disposed in a second direction X2, and there is an opening between the fifth radiation section 22 and the sixth radiation section 23.

Parameters such as shapes, widths, or lengths of the fourth radiation section 21 and the fifth radiation section 22 are also not limited in this application. A size of the opening between the fourth radiation section 21 and the fifth radiation section 22 is not limited. In addition, a relative position relationship between the third radiation section and each of the fourth radiation section 21 and the fifth radiation section 22 is not limited in this application.

For a specific implementation of the fifth radiation section 22, refer to the description content of the second radiation section in Embodiment 1. For a specific implementation of the sixth radiation section 23, refer to the description content of the third radiation section in Embodiment 1. Details are not described herein. For example, for disposing of the fifth radiation section 22 and the sixth radiation section 23, refer to the description content of the disposing of the second radiation section and the third radiation section shown in FIG. 4*a* to FIG. 4*f* in Embodiment 1.

In addition, both the fifth radiation section 22 and the sixth radiation section 23 are grounded. For grounding manners of the fifth radiation section 22 and the sixth radiation section 23, refer to the description content of the grounding manners of the second radiation section and the third radiation section in Embodiment 1. Details are not described herein. For example, for the grounding manners of the fifth radiation section 22 and the sixth radiation section 23, refer to the description content of the grounding manners of the second radiation section and the third radiation section shown in FIG. 5*a* to FIG. 5*c* in Embodiment 1.

Optionally, the fifth radiation section 22 is connected to M third ground points of an electronic device, and the sixth radiation section 23 is connected to M fourth ground points of the electronic device, where M is a positive integer. A specific value of M is not limited in this application. For the third ground point, refer to the description content of the first ground point shown in FIG. 5*a* and FIG. 5*b* in Embodiment 1. For the fourth ground point, refer to the description content of the second ground point shown in FIG. 5*a* and FIG. 5*b* in Embodiment 1.

When the antenna unit in this application is manufactured by using a bracket, the fifth radiation section 22 and the sixth radiation section 23 are disposed on the bracket, and the third ground point and the fourth ground point may be disposed in a plurality of manners. Two feasible implementations are used as examples below for illustration.

In a feasible implementation, the third ground point and the fourth ground point may be disposed on a printed circuit board. The third ground point and the fourth ground point may be a ground of the printed circuit board, and do not need to be separately disposed. Alternatively, the third ground point and the fourth ground point may be separately disposed, and connected to a ground of the printed circuit board by using traces on the printed circuit board. Therefore, the fifth radiation section 22 and the sixth radiation section 23 are respectively connected to the third ground point and the fourth ground point on the printed circuit board by using different traces on the bracket. The different traces on the bracket are usually symmetrically disposed in the second direction X2. In this way, a spring is saved, and this solution is simple and easy to implement.

In another feasible implementation, the third ground point and the fourth ground point may be disposed on the bracket, so that the fifth radiation section 22 is connected to the third ground point, and the sixth radiation section 23 is connected to the fourth ground point. In addition, each of the third ground point and the fourth ground point needs to be connected to a ground of a printed circuit board by using a spring on the bracket, and no trace needs to be arranged on the bracket.

Optionally, both the fifth radiation section 22 and the sixth radiation section 23 may be connected to a ground region of the electronic device, and the ground region is symmetrically disposed in the second direction X2. For the foregoing implementation, refer to the description content in the embodiment shown in FIG. 5*c* in Embodiment 1.

The second direction X2 is a direction in which a symmetry axis of the second loop branch 20 is located, and may be any direction that varies with a direction of placing the second loop branch 20. It should be noted that the second loop branch 20 may be completely structurally symmetrically disposed, that is, the second direction is the direction in which the symmetry axis of the second loop branch 20 is located. Alternatively, the second loop branch 20 may be allowed to be structurally asymmetrically disposed within an error range. Asymmetry herein is intended to eliminate electrical asymmetry introduced by a component other than the second loop branch 20, that is, the second direction is a direction in which a symmetry axis of the second loop branch 20 that exists after correction is located. For specific content of the second direction X2, refer to the description content of the first direction X1 in Embodiment 1. Details are not described herein. For ease of description, in this application, an example in which the second direction X2 is a positive direction of an X axis is used for illustration.

In this application, the feeding branch 27 is symmetrically disposed in the second direction X2, and an area of a part that is of the feeding branch 27 and that faces the fifth radiation section 22 is equal to an area of a part that is of the feeding branch 27 and that faces the sixth radiation section 23, to ensure symmetry of the feeding branch 27.

A process of manufacturing the feeding branch 27 is not limited in this application. For example, the feeding branch 27 may be manufactured by using a flexible printed circuit board (flexible printed circuit board, FPC), may be manufactured through laser direct structuring, or may be manufactured by using a spraying process. In addition, a parameter such as a shape, a width, or a length and a position of the feeding branch 27 are not limited in this application.

Disposing of the feeding branch 27 is described below by using an example and with reference to FIG. 12*a* to FIG. 12*f*, FIG. 13*a* to FIG. 13*f*, and FIG. 14*a* to FIG. 14*f*. For ease of description, in FIG. 12*a* to FIG. 12*f*, FIG. 13*a* to FIG. 13*f*, and FIG. 14*a* to FIG. 14*f*, an example in which the fourth radiation section 21 is in a square shape is used for illustration.

Optionally, the feeding branch 27 may be disposed inside the fourth radiation section 21 in the second direction X2, so that inner space of the fourth radiation section 21 can be fully used to dispose the feeding branch 27, the fifth radiation section 22, and the sixth radiation section 23, to help arrange the antenna unit in relatively small space, so as to improve space utilization of the antenna unit.

The feeding branch 27 in the foregoing description manner is illustrated by using FIG. 12*a* to FIG. 12*f* as examples.

Figure 12A:
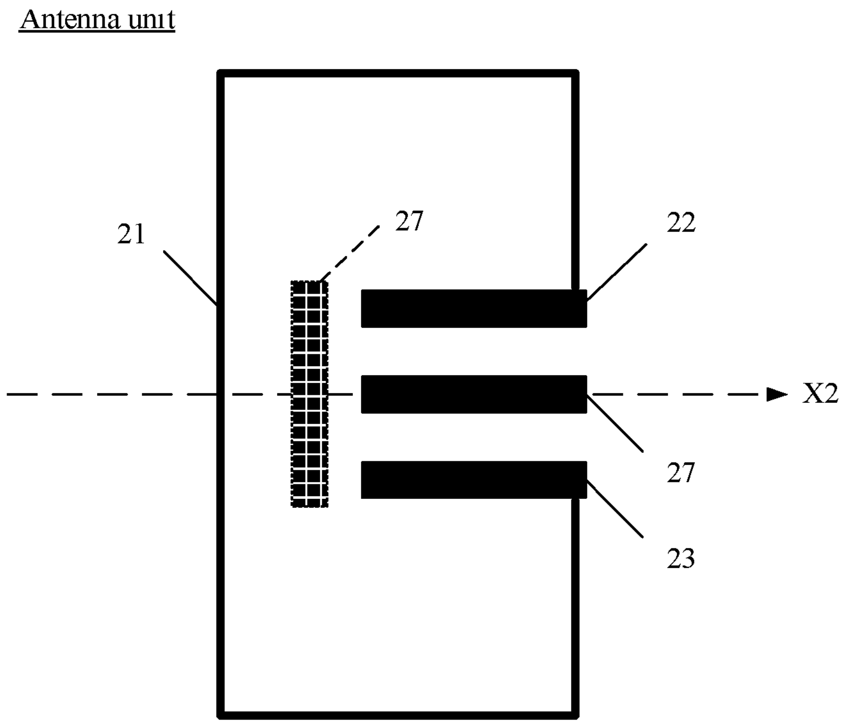
FIG. 12*a* is a schematic diagram of a feeding branch in an antenna unit according to an embodiment of this application.

As shown in FIG. 12*a*, the feeding branch 27 is in a long strip shape, is located between the fifth radiation section 22 and the sixth radiation section 23, and is located inside the fourth radiation section 21 (a solid line is used for illustration in FIG. 12*a*); or the feeding branch 27 is in a long strip shape, and is located on a side that is of the fifth radiation section 22 and the sixth radiation section 23 and that is close to an inside of the fourth radiation section 21 (a dashed line is used for illustration in FIG. 12*a*). For disposing of the fifth radiation section 22 in FIG. 12*a*, refer to the second radiation section shown in FIG. 4*a* in Embodiment 1. For disposing of the sixth radiation section 23 in FIG. 12*a*, refer to the third radiation section shown in FIG. 4*a* in Embodiment 1.

Figure 12B:
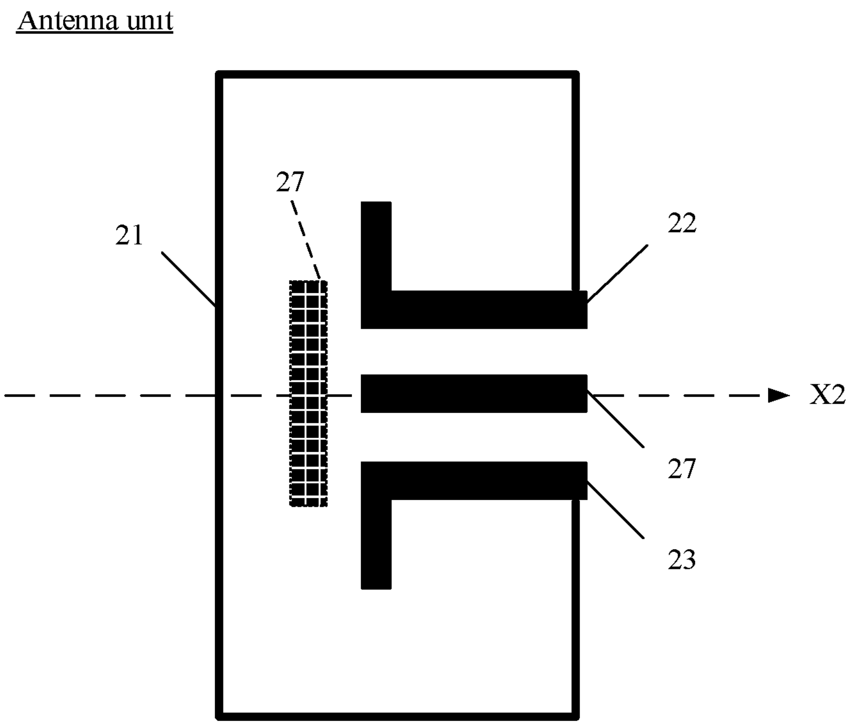
FIG. 12*b* is a schematic diagram of a feeding branch in an antenna unit according to an embodiment of this application.

As shown in FIG. 12*b*, the feeding branch 27 is in a long strip shape, is located between the fifth radiation section 22 and the sixth radiation section 23, and is located inside the fourth radiation section 21 (a solid line is used for illustration in FIG. 12*b*); or the feeding branch 27 is in a long strip shape, and is located on a side that is of the fifth radiation section 22 and the sixth radiation section 23 and that is close to an inside of the fourth radiation section 21 (a dashed line is used for illustration in FIG. 12*b*). For disposing of the fifth radiation section 22 in FIG. 12*b*, refer to the second radiation section shown in FIG. 4*b* in Embodiment 1. For disposing of the sixth radiation section 23 in FIG. 12*b*, refer to the third radiation section shown in FIG. 4*b* in Embodiment 1.

Figure 12C:
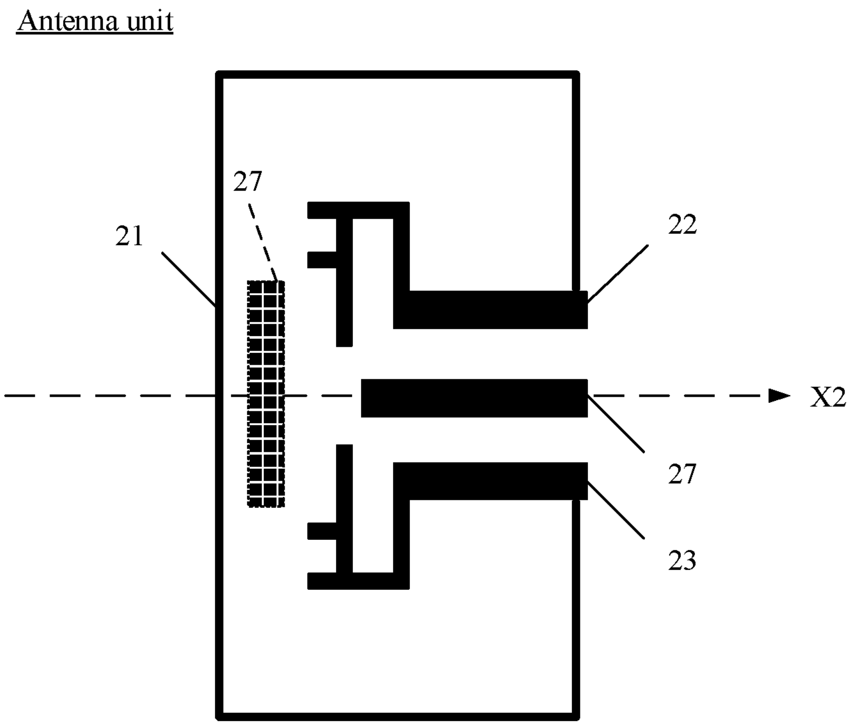
FIG. 12*c* is a schematic diagram of a feeding branch in an antenna unit according to an embodiment of this application.

As shown in FIG. 12*c*, the feeding branch 27 is in a long strip shape, is located between the fifth radiation section 22 and the sixth radiation section 23, and is located inside the fourth radiation section 21 (a solid line is used for illustration in FIG. 12*c*); or the feeding branch 27 is in a long strip shape, and is located on a side that is of the fifth radiation section 22 and the sixth radiation section 23 and that is close to an inside of the fourth radiation section 21 (a dashed line is used for illustration in FIG. 12*c*). For disposing of the fifth radiation section 22 in FIG. 12*c*, refer to the second radiation section shown in FIG. 4*c* in Embodiment 1. For disposing of the sixth radiation section 23 in FIG. 12*c*, refer to the third radiation section shown in FIG. 4*c* in Embodiment 1.

Figure 12D:
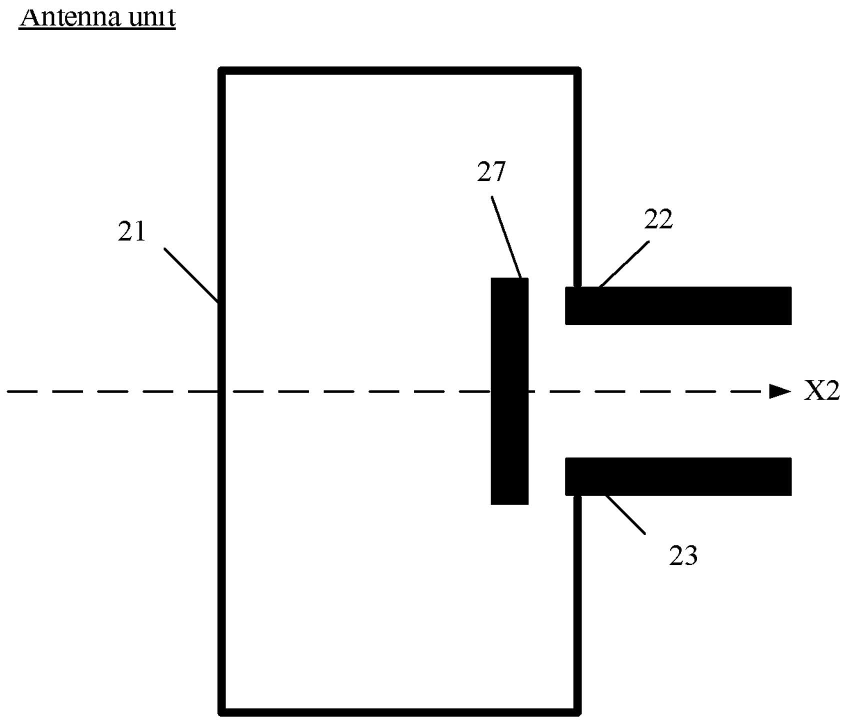
FIG. 12*d* is a schematic diagram of a feeding branch in an antenna unit according to an embodiment of this application.

As shown in FIG. 12*d*, the feeding branch 27 is in a long strip shape, and is located on a side that is of the fifth radiation section 22 and the sixth radiation section 23 and that is close to an inside of the fourth radiation section 21. For disposing of the fifth radiation section 22 in FIG. 12*d*, refer to the second radiation section shown in FIG. 4*d* in Embodiment 1. For disposing of the sixth radiation section 23 in FIG. 12*d*, refer to the third radiation section shown in FIG. 4*d* in Embodiment 1.

Figure 12E:
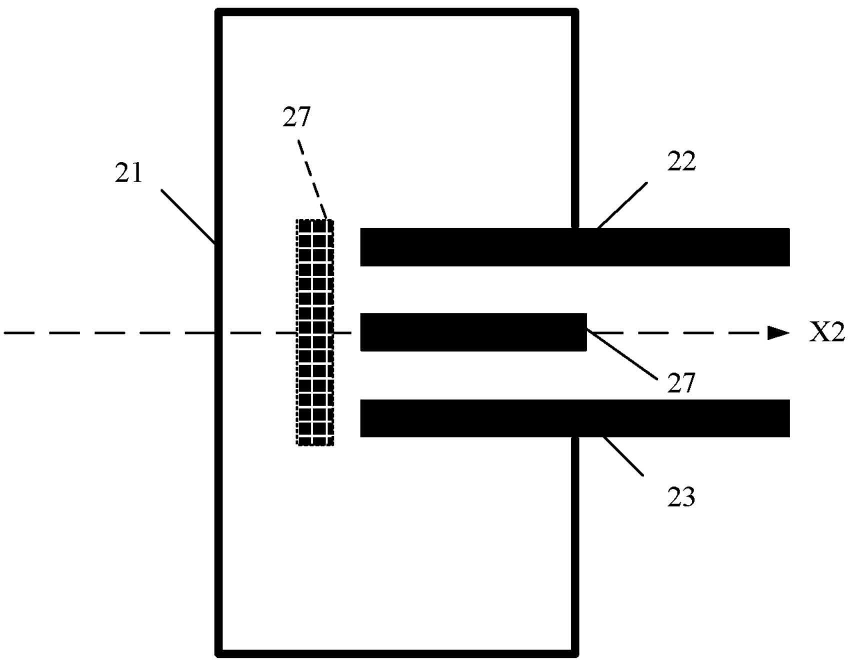
FIG. 12*e* is a schematic diagram of a feeding branch in an antenna unit according to an embodiment of this application.

As shown in FIG. 12*e*, the feeding branch 27 is in a long strip shape, is located between the fifth radiation section 22 and the sixth radiation section 23, and is located inside the fourth radiation section 21 (a solid line is used for illustration in FIG. 12*e*); or the feeding branch 27 is in a long strip shape, and is located on a side that is of the fifth radiation section 22 and the sixth radiation section 23 and that is close to an inside of the fourth radiation section 21 (a dashed line is used for illustration in FIG. 12*e*). For disposing of the fifth radiation section 22 in FIG. 12*e*, refer to the second radiation section shown in FIG. 4*e* in Embodiment 1. For disposing of the sixth radiation section 23 in FIG. 12*e*, refer to the third radiation section shown in FIG. 4*e* in Embodiment 1.

Figure 12F:
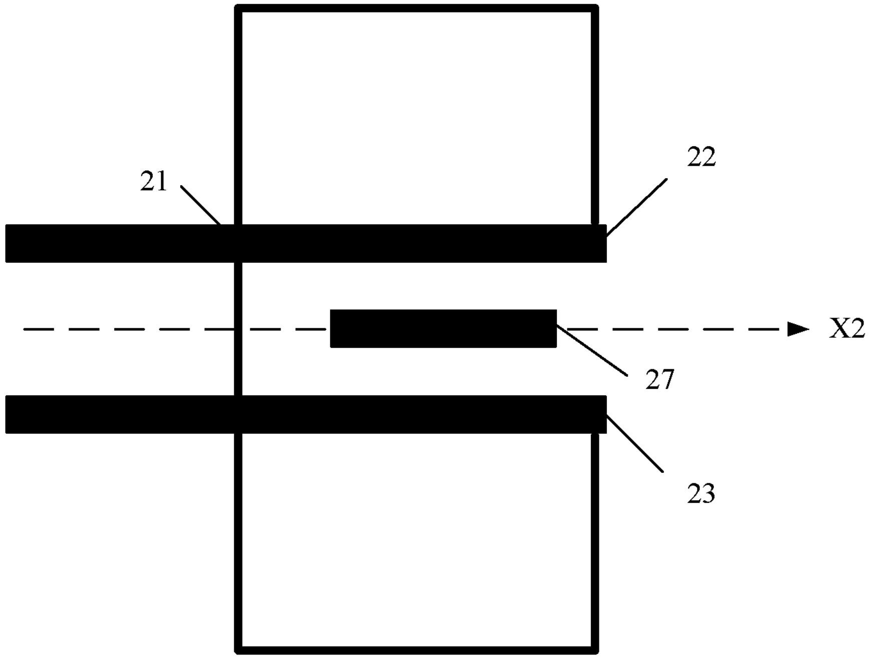
FIG. 12*f* is a schematic diagram of a feeding branch in an antenna unit according to an embodiment of this application.

As shown in FIG. 12*f*, the feeding branch 27 is in a long strip shape, is located between the fifth radiation section 22 and the sixth radiation section 23, and is located inside the fourth radiation section 21. For disposing of the fifth radiation section 22 in FIG. 12*f*, refer to the second radiation section shown in FIG. 4*f* in Embodiment 1. For disposing of the sixth radiation section 23 in FIG. 12*f*, refer to the third radiation section shown in FIG. 4*f* in Embodiment 1.

Optionally, the feeding branch 27 may be disposed outside the fourth radiation section 21 in the second direction X2, to provide a possibility for implementing the antenna unit, so that the antenna unit can meet a space requirement in an actual situation.

The feeding branch 27 described above is illustrated by using FIG. 13*a* to FIG. 13*f* as examples.

Figure 13A:
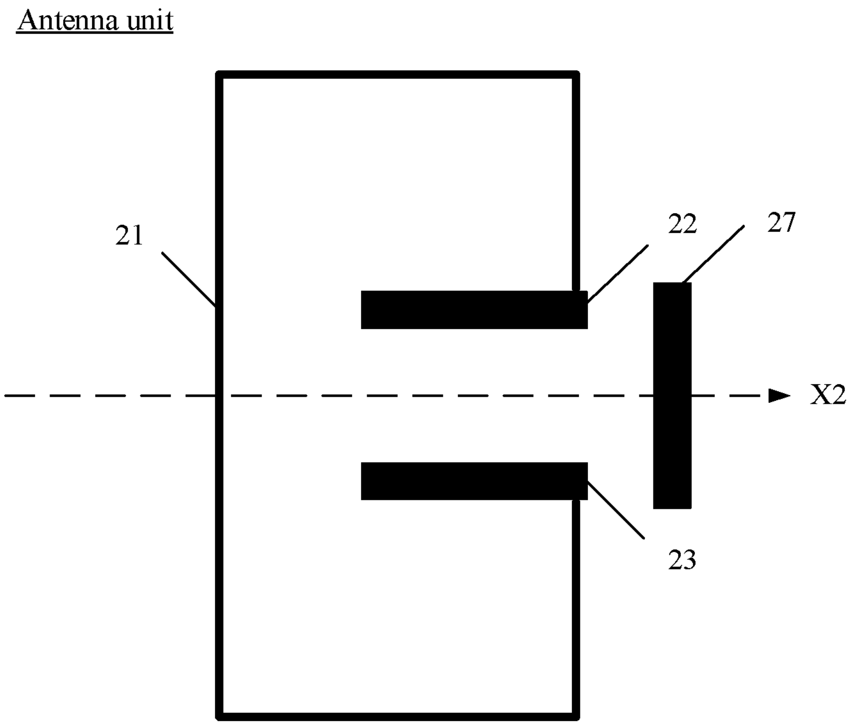
FIG. 13*a* is a schematic diagram of a feeding branch in an antenna unit according to an embodiment of this application.

As shown in FIG. 13*a*, the feeding branch 27 is in a long strip shape, and is located on a side that is of the fifth radiation section 22 and the sixth radiation section 23 and that is close to an outside of the fourth radiation section 21. For disposing of the fifth radiation section 22 in FIG. 13*a*, refer to the second radiation section shown in FIG. 4*a* in Embodiment 1. For disposing of the sixth radiation section 23 in FIG. 13*a*, refer to the third radiation section shown in FIG. 4*a* in Embodiment 1.

Figure 13B:
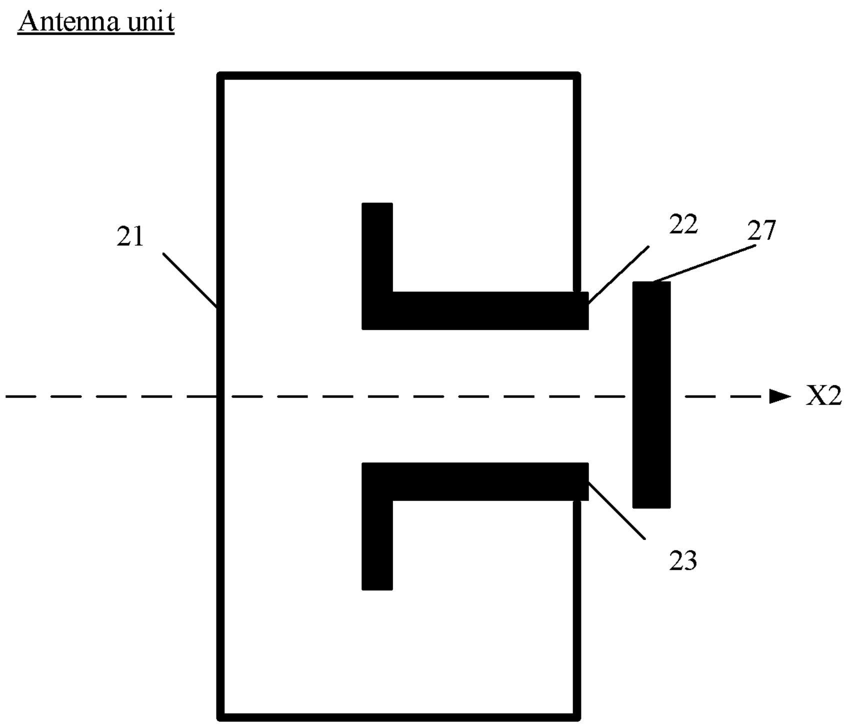
FIG. 13*b* is a schematic diagram of a feeding branch in an antenna unit according to an embodiment of this application.

As shown in FIG. 13*b*, the feeding branch 27 is in a long strip shape, and is located on a side that is of the fifth radiation section 22 and the sixth radiation section 23 and that is close to an outside of the fourth radiation section 21. For disposing of the fifth radiation section 22 in FIG. 13*b*, refer to the second radiation section shown in FIG. 4*b* in Embodiment 1. For disposing of the sixth radiation section 23 in FIG. 13*b*, refer to the third radiation section shown in FIG. 4*b* in Embodiment 1.

Figure 13C:
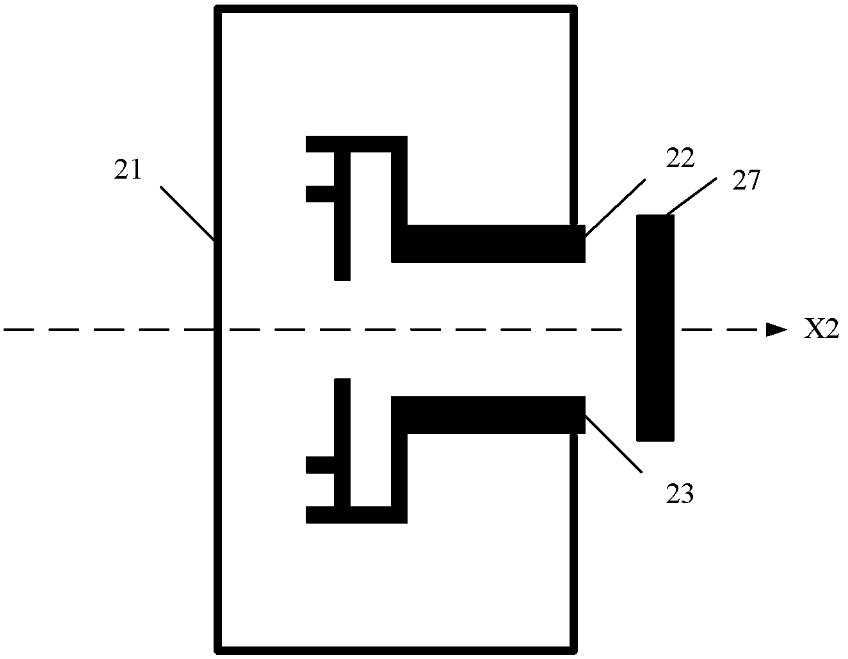
FIG. 13*c* is a schematic diagram of a feeding branch in an antenna unit according to an embodiment of this application.

As shown in FIG. 13*c*, the feeding branch 27 is in a long strip shape, and is located on a side that is of the fifth radiation section 22 and the sixth radiation section 23 and that is close to an outside of the fourth radiation section 21. For disposing of the fifth radiation section 22 in FIG. 13*c*, refer to the second radiation section shown in FIG. 4*c* in Embodiment 1. For disposing of the sixth radiation section 23 in FIG. 13*c*, refer to the third radiation section shown in FIG. 4*c* in Embodiment 1.

Figure 13D:
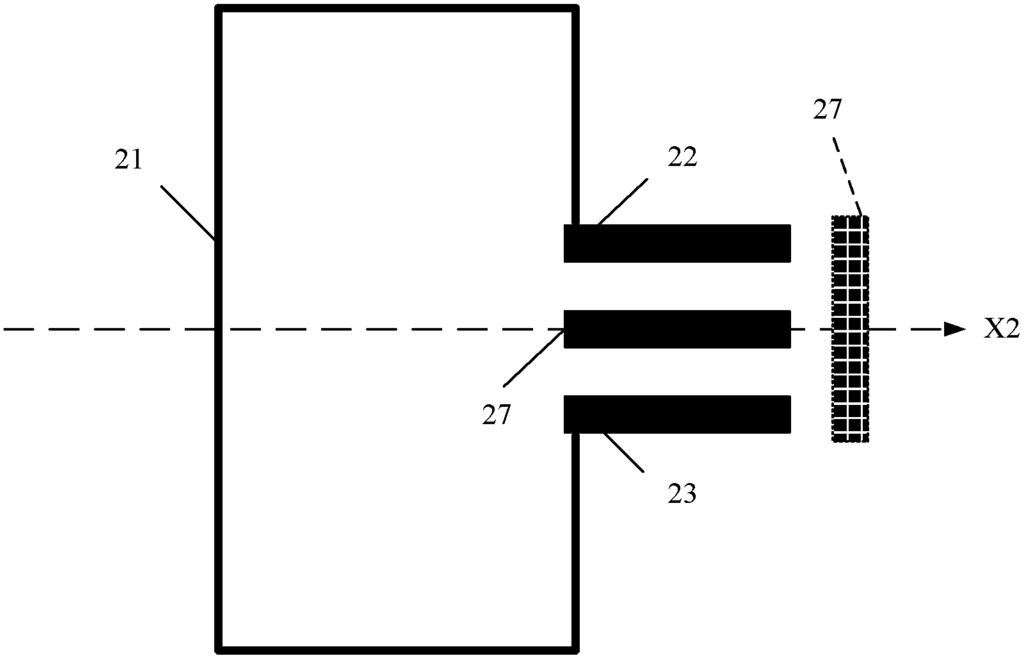
FIG. 13*d* is a schematic diagram of a feeding branch in an antenna unit according to an embodiment of this application.

As shown in FIG. 13*d*, the feeding branch 27 is in a long strip shape, is located between the fifth radiation section 22 and the sixth radiation section 23, and is located outside the fourth radiation section 21 (a solid line is used for illustration in FIG. 13*d*); or the feeding branch 27 is in a long strip shape, and is located on a side that is of the fifth radiation section 22 and the sixth radiation section 23 and that is close to an outside of the fourth radiation section 21 (a dashed line is used for illustration in FIG. 13*d*). For disposing of the fifth radiation section 22 in FIG. 13*d*, refer to the second radiation section shown in FIG. 4*d* in Embodiment 1. For disposing of the sixth radiation section 23 in FIG. 13*d*, refer to the third radiation section shown in FIG. 4*d* in Embodiment 1.

Figure 13E:
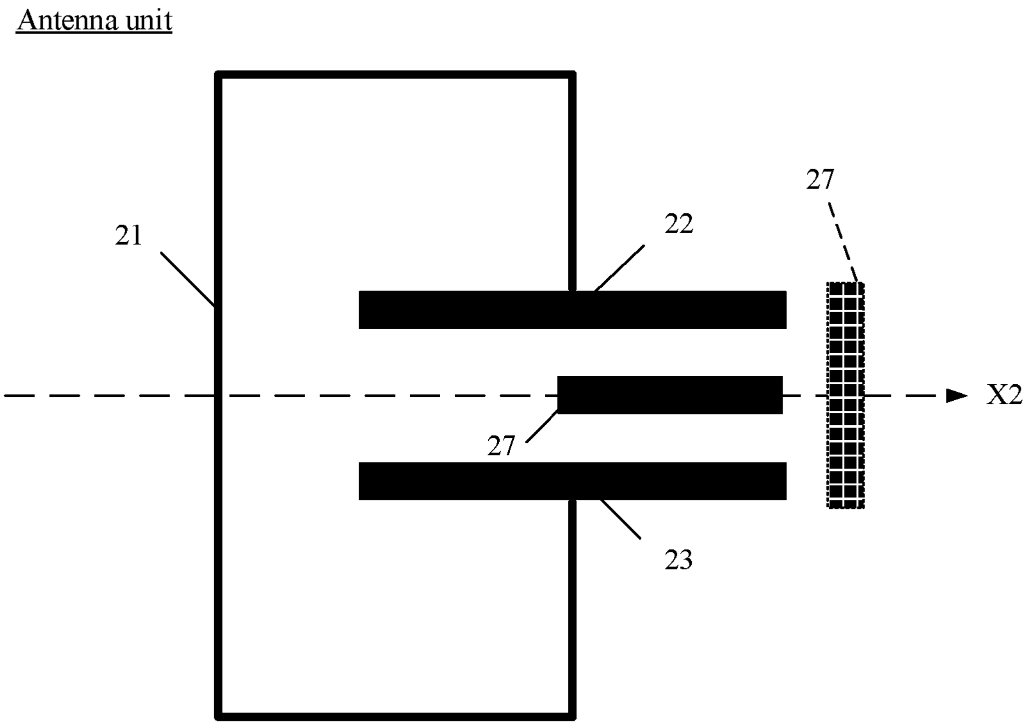
FIG. 13*e* is a schematic diagram of a feeding branch in an antenna unit according to an embodiment of this application.

As shown in FIG. 13*e*, the feeding branch 27 is in a long strip shape, is located between the fifth radiation section 22 and the sixth radiation section 23, and is located outside the fourth radiation section 21 (a solid line is used for illustration in FIG. 13*e*); or the feeding branch 27 is in a long strip shape, and is located on a side that is of the fifth radiation section 22 and the sixth radiation section 23 and that is close to an outside of the fourth radiation section 21 (a dashed line is used for illustration in FIG. 13*e*). For disposing of the fifth radiation section 22 in FIG. 13*e*, refer to the second radiation section shown in FIG. 4*e* in Embodiment 1. For disposing of the sixth radiation section 23 in FIG. 13*e*, refer to the third radiation section shown in FIG. 4*e* in Embodiment 1.

Figure 13F:
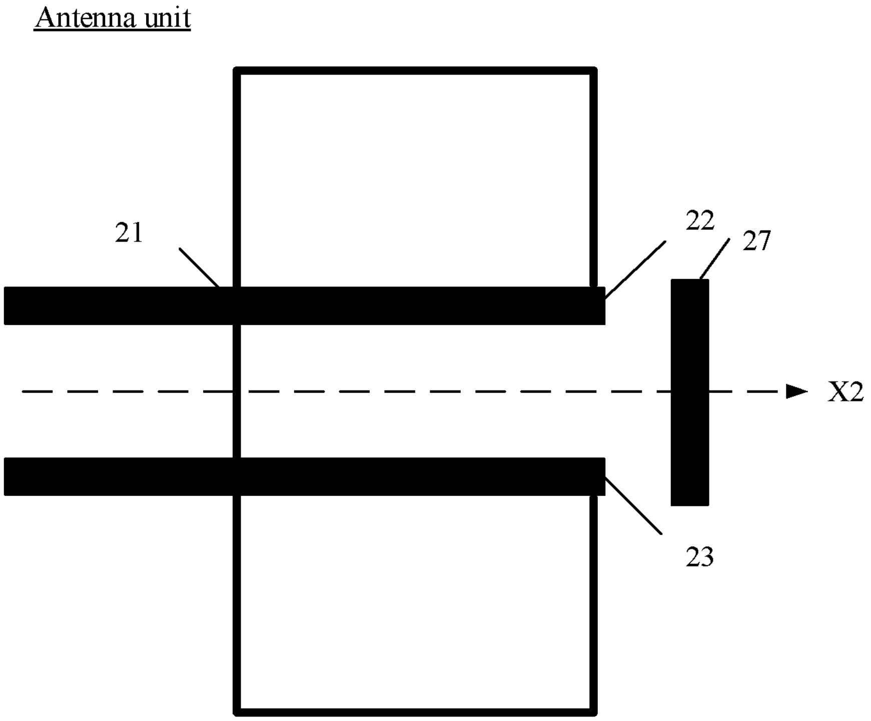
FIG. 13*f* is a schematic diagram of a feeding branch in an antenna unit according to an embodiment of this application.

As shown in FIG. 13*f*, the feeding branch 27 is in a long strip shape, and is located on a side that is of the fifth radiation section 22 and the sixth radiation section 23 and that is close to an outside of the fourth radiation section 21. For disposing of the fifth radiation section 22 in FIG. 13*f*, refer to the second radiation section shown in FIG. 4*f* in Embodiment 1. For disposing of the sixth radiation section 23 in FIG. 13*f*, refer to the third radiation section shown in FIG. 4*f* in Embodiment 1.

Optionally, the feeding branch 27 may be disposed to extend from an inside of the fourth radiation section 21 to an outside the fourth radiation section 21 in the second direction X2, to provide another possibility for implementing the antenna unit, so that the antenna unit can meet a space requirement in an actual situation.

The feeding branch 27 described above is illustrated by using FIG. 14*a* to FIG. 14*f* as examples.

Figure 14A:
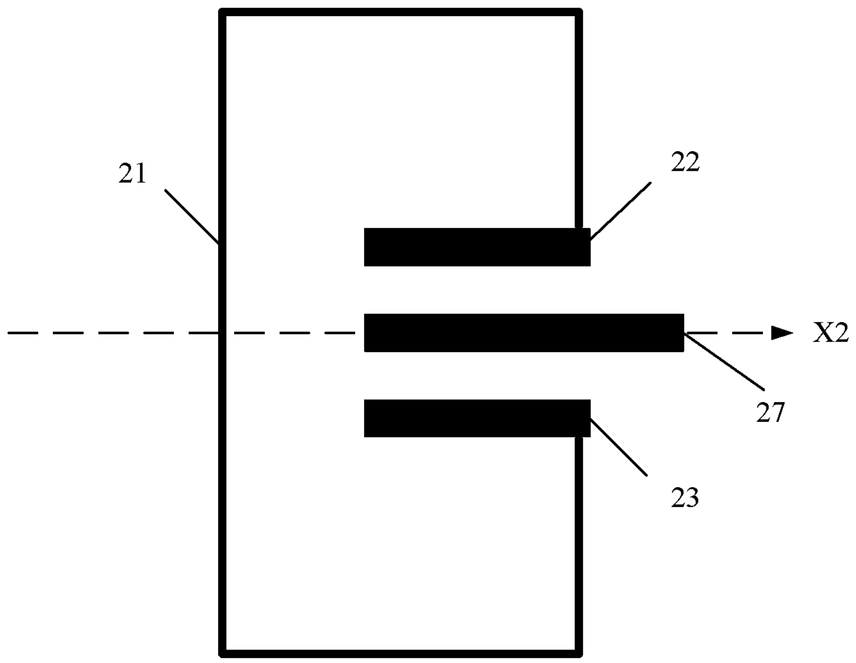
FIG. 14*a* is a schematic diagram of a feeding branch in an antenna unit according to an embodiment of this application.

As shown in FIG. 14*a*, the feeding branch 27 is in a long strip shape, and is located between the fifth radiation section 22 and the sixth radiation section 23, and the feeding branch 27 is disposed to extend from the inside of the fourth radiation section 21 to the outside of the fourth radiation section 21 in the second direction X2. For disposing of the fifth radiation section 22 in FIG. 14*a*, refer to the second radiation section shown in FIG. 4*a* in Embodiment 1. For disposing of the sixth radiation section 23 in FIG. 14*a*, refer to the third radiation section shown in FIG. 4*a* in Embodiment 1.

Figure 14B:
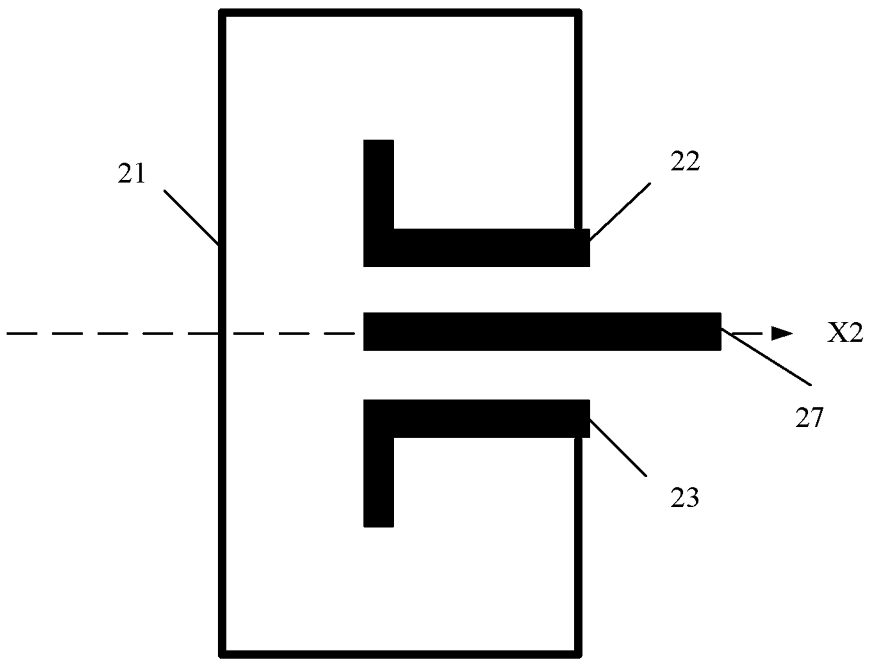
FIG. 14*b* is a schematic diagram of a feeding branch in an antenna unit according to an embodiment of this application.

As shown in FIG. 14*b*, the feeding branch 27 is in a long strip shape, and is located between the fifth radiation section 22 and the sixth radiation section 23, and the feeding branch 27 is disposed to extend from the inside of the fourth radiation section 21 to the outside of the fourth radiation section 21 in the second direction X2. For disposing of the fifth radiation section 22 in FIG. 14*b*, refer to the second radiation section shown in FIG. 4*b* in Embodiment 1. For disposing of the sixth radiation section 23 in FIG. 14*b*, refer to the third radiation section shown in FIG. 4*b* in Embodiment 1.

Figure 14C:
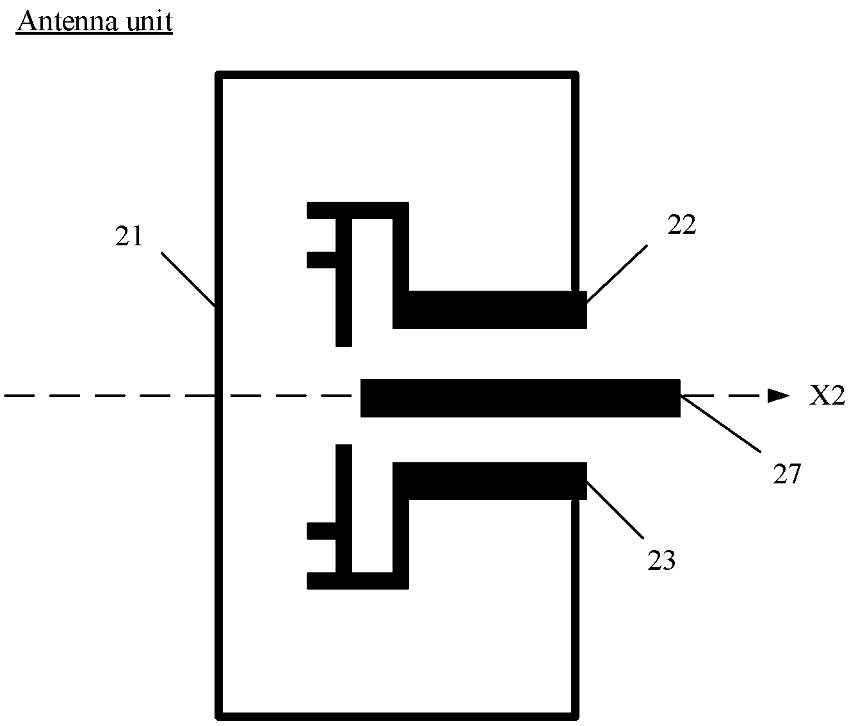
FIG. 14*c* is a schematic diagram of a feeding branch in an antenna unit according to an embodiment of this application.

As shown in FIG. 14*c*, the feeding branch 27 is in a long strip shape, and is located between the fifth radiation section 22 and the sixth radiation section 23, and the feeding branch 27 extends from the inside of the fourth radiation section 21 to the outside of the fourth radiation section 21 in the second direction X2. For disposing of the fifth radiation section 22 in FIG. 14*c*, refer to the second radiation section shown in FIG. 4*c* in Embodiment 1. For disposing of the sixth radiation section 23 in FIG. 14*c*, refer to the third radiation section shown in FIG. 4*c* in Embodiment 1.

Figure 14D:
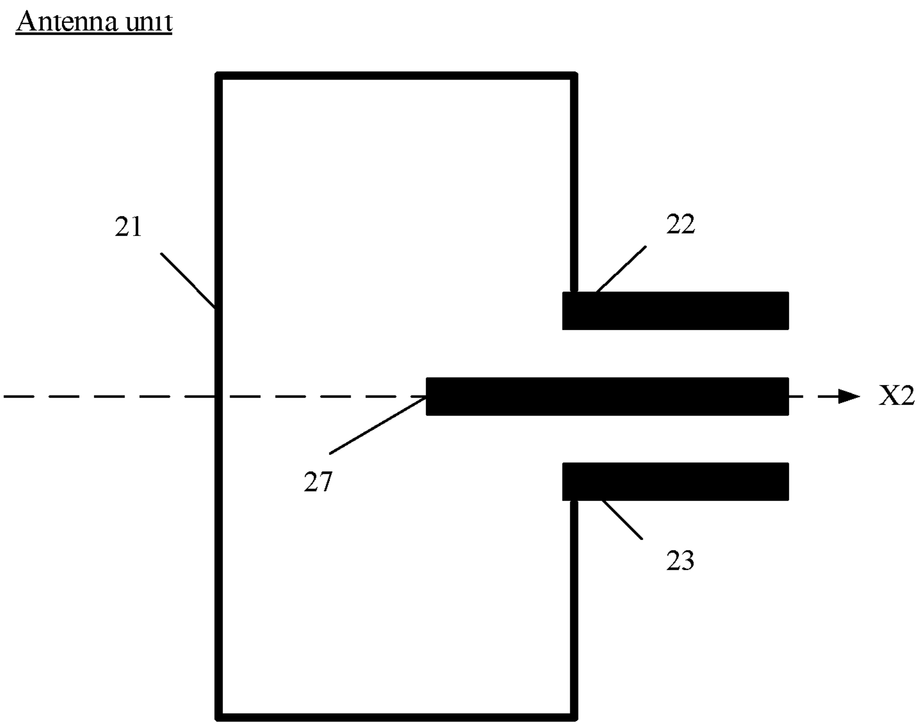
FIG. 14*d* is a schematic diagram of a feeding branch in an antenna unit according to an embodiment of this application.

As shown in FIG. 14*d*, the feeding branch 27 is in a long strip shape, and is located between the fifth radiation section 22 and the sixth radiation section 23, and the feeding branch 27 extends from the inside of the fourth radiation section 21 to the outside of the fourth radiation section 21 in the second direction X2. For disposing of the fifth radiation section 22 in FIG. 14*d*, refer to the second radiation section shown in FIG. 4*d* in Embodiment 1. For disposing of the sixth radiation section 23 in FIG. 14*d*, refer to the third radiation section shown in FIG. 4*d* in Embodiment 1.

Figure 14E:
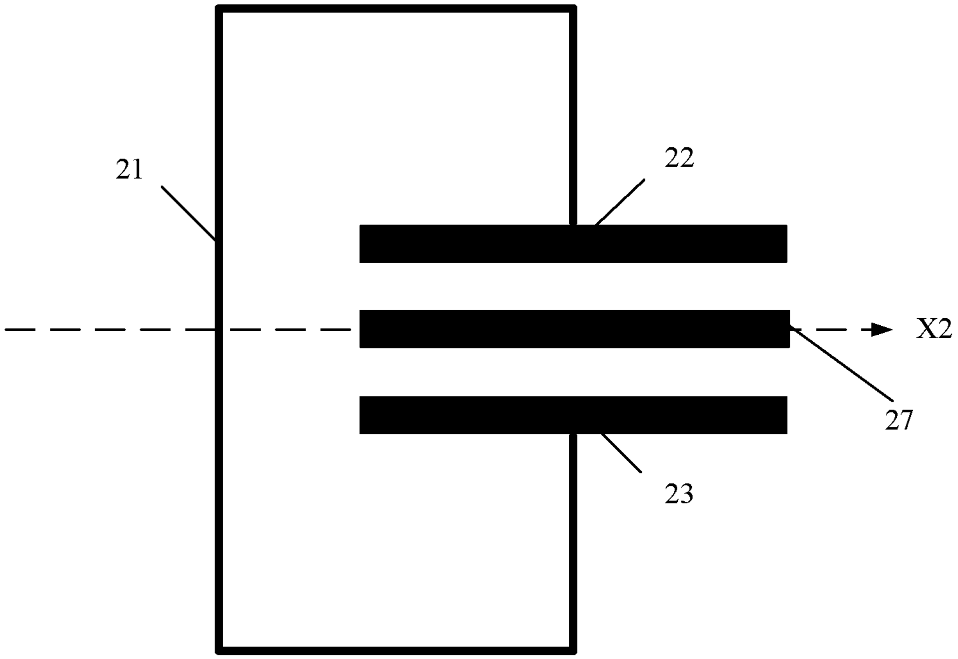
FIG. 14*e* is a schematic diagram of a feeding branch in an antenna unit according to an embodiment of this application.

As shown in FIG. 14*e*, the feeding branch 27 is in a long strip shape, and is located between the fifth radiation section 22 and the sixth radiation section 23, and the feeding branch 27 extends from the inside of the fourth radiation section 21 to the outside of the fourth radiation section 21 in the second direction X2. For disposing of the fifth radiation section 22 in FIG. 14*e*, refer to the second radiation section shown in FIG. 4*e* in Embodiment 1. For disposing of the sixth radiation section 23 in FIG. 14*e*, refer to the third radiation section shown in FIG. 4*e* in Embodiment 1.

Figure 14F:
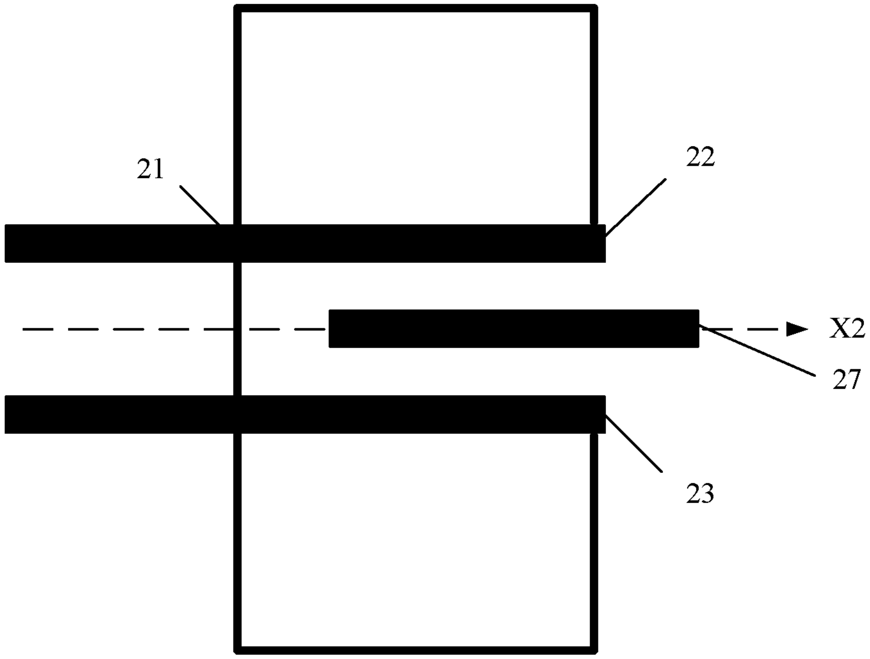
FIG. 14*f* is a schematic diagram of a feeding branch in an antenna unit according to an embodiment of this application.

As shown in FIG. 14*f*, the feeding branch 27 is in a long strip shape, and is located between the fifth radiation section 22 and the sixth radiation section 23, and the feeding branch 27 extends from the inside of the fourth radiation section 21 to the outside of the fourth radiation section 21 in the second direction X2. For disposing of the fifth radiation section 22 in FIG. 14*f*, refer to the second radiation section shown in FIG. 4*f* in Embodiment 1. For disposing of the sixth radiation section 23 in FIG. 14*f*, refer to the third radiation section shown in FIG. 4*f* in Embodiment 1.

In conclusion, an area of a part that is of the feeding branch 27 and that faces the fifth radiation section 22 in the second direction X2 is equal to an area of a part that is of the feeding branch 27 and that faces the sixth radiation section 23 in the second direction X2, or an area of a part that is of the feeding branch 27 and that faces the fifth radiation section 22 in a direction perpendicular to the second direction X2 is equal to an area of a part that is of the feeding branch 27 and that faces the sixth radiation section 23 in the direction perpendicular to the second direction X2, to ensure symmetry of the feeding branch 27.

In this application, the third feed F3 is symmetrically connected to the feeding branch 27 in the second direction X2, which is different from the manner in which the first feed is symmetrically connected to the first radiation section in the first direction X1 in Embodiment 1. In addition, in this application, there are one or more fourth contact points between the third feed F3 and the feeding branch 27. The fourth contact point is a symmetry point of the feeding branch 27 in the second direction X2. A quantity and a position of fourth contact points are not limited in this application provided that it is met that the fourth contact point is symmetrical in the second direction X2.

Figure 15A:
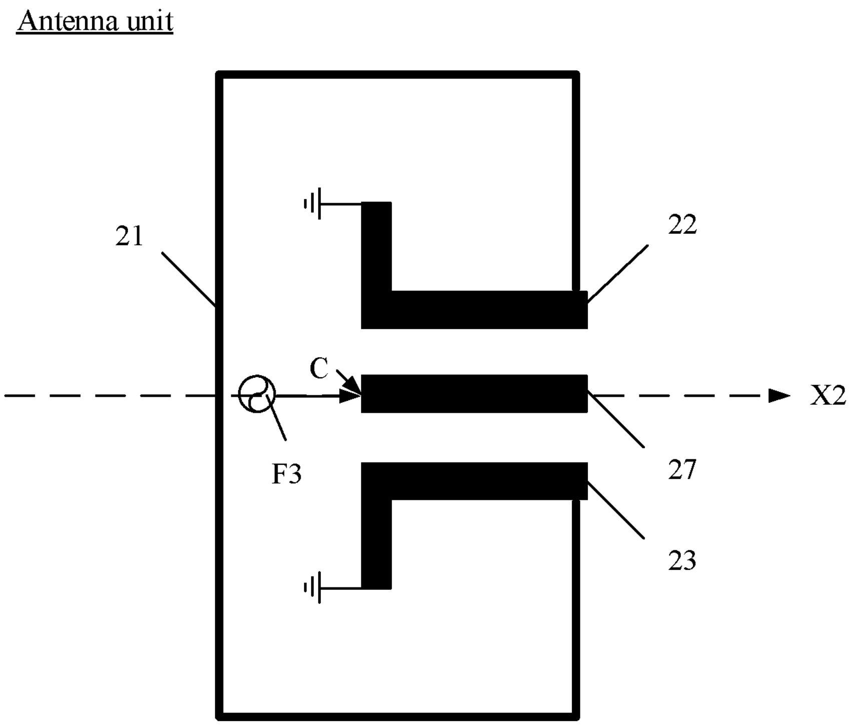
FIG. 15*a* is a schematic diagram in which a third feed is symmetrically connected to a feeding branch in a second direction in an antenna unit according to an embodiment of this application.
Figure 15B:
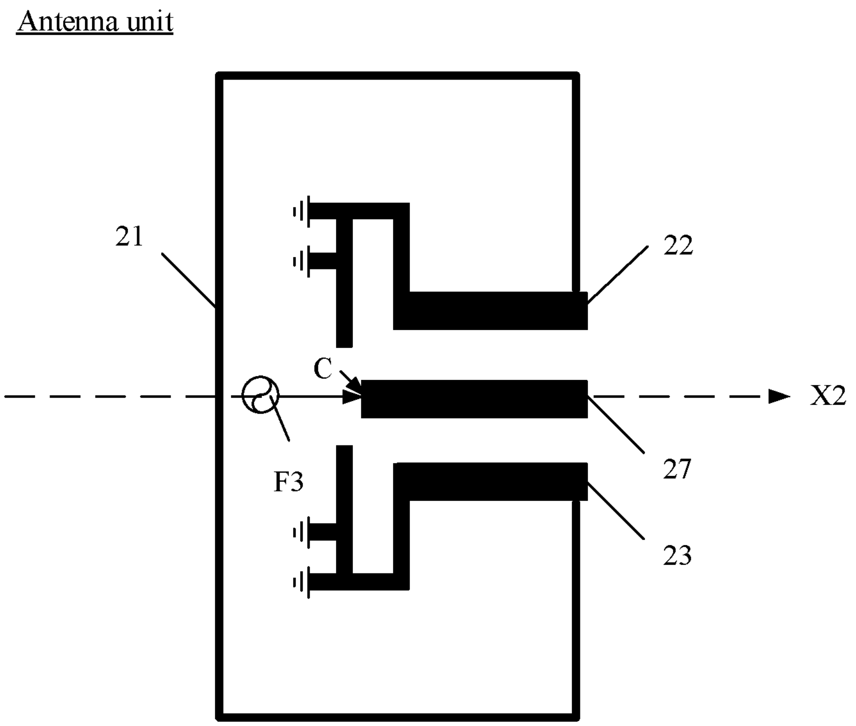
FIG. 15*b* is a schematic diagram in which a third feed is symmetrically connected to a feeding branch in a second direction in an antenna unit according to an embodiment of this application.

A case in which the third feed F3 is symmetrically connected to the feeding branch 27 in the second direction X2 is illustrated by using an example in which there is one fourth contact point and with reference to FIG. 15*a* and FIG. 15*b*.

Based on the second loop branch 20 shown in FIG. 12*b*, as shown in FIG. 15*a*, the third feed F3 is fed from the fourth contact point in the second direction X2, and the fourth contact point is located on one side of the feeding branch 27 inside the fourth radiation section 21. The fifth radiation section 22 is connected to one third ground point, and the sixth radiation section 23 is connected to one fourth ground point. In FIG. 15*a*, an example in which the third ground point and the fourth ground point are ground symbols is used for illustration.

Based on the second loop branch 20 shown in FIG. 12*c*, as shown in FIG. 15*b*, the third feed F3 is fed from the fourth contact point in the second direction X2, and the fourth contact point is located on one side of the feeding branch 27 inside the fourth radiation section 21. The fifth radiation section 22 is connected to two third ground points, and the sixth radiation section 23 is connected to two fourth ground points. In FIG. 15*b*, an example in which the third ground point and the fourth ground point are ground symbols is used for illustration.

In addition, a third matching component may be disposed between the third feed F3 and the fourth contact point, to adjust a frequency band of the antenna unit, so that the third feed F3 can obtain a better pattern and better cross polarization performance, to improve performance of the antenna unit. A specific implementation form of the third matching component is not limited in this application. For example, the third matching component may be a capacitor, an inductor, a capacitor and an inductor, a capacitor and a switch, an inductor and a switch, or a capacitor, an inductor, and a switch. In this application, no limitation is imposed on a capacitance value and a quantity of capacitors, an inductance value and a quantity of inductors, a type and a quantity of switches, or a connection relationship between any two of the capacitor, the inductor, and the switch.

In this application, the fourth feed F4 is separately connected to the fifth radiation section 22 and the sixth radiation section 23, which is the same as the manner in which the second feed is separately connected to the second radiation section and the third radiation section in Embodiment 1. In addition, in this application, a contact point between the fourth feed F4 and the fifth radiation section 22 is referred to as a fifth contact point, and a contact point between the fourth feed F4 and the sixth radiation section 23 is referred to as a sixth contact point. The fifth contact point and the sixth contact point are symmetrical in the second direction X2.

In addition, the fifth contact point is disposed at any position on a side that is of the fifth radiation section 22 and that is opposite to the sixth radiation section 23, the sixth contact point is disposed at any position on a side that is of the sixth radiation section 23 and that is opposite to the fifth radiation section 22, and a distance between the fifth contact point and the sixth contact point falls within a second preset range, to ensure the performance of the antenna unit.

A specific magnitude of the second preset range is not limited in this application provided that the distance between the fifth contact point and the sixth contact point can ensure that the antenna unit has good performance.

Figure 16A:
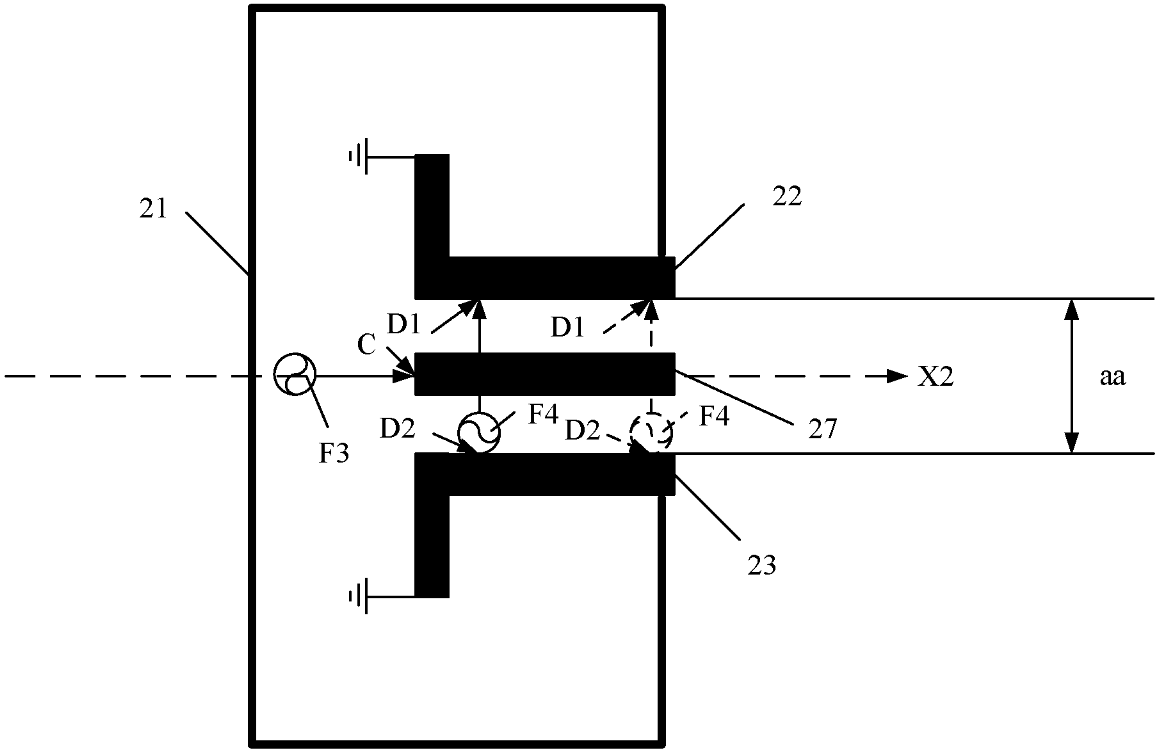
FIG. 16*a* is a schematic diagram in which a fourth feed is separately connected to a fifth radiation section and a sixth radiation section in an antenna unit according to an embodiment of this application.
Figure 16B:
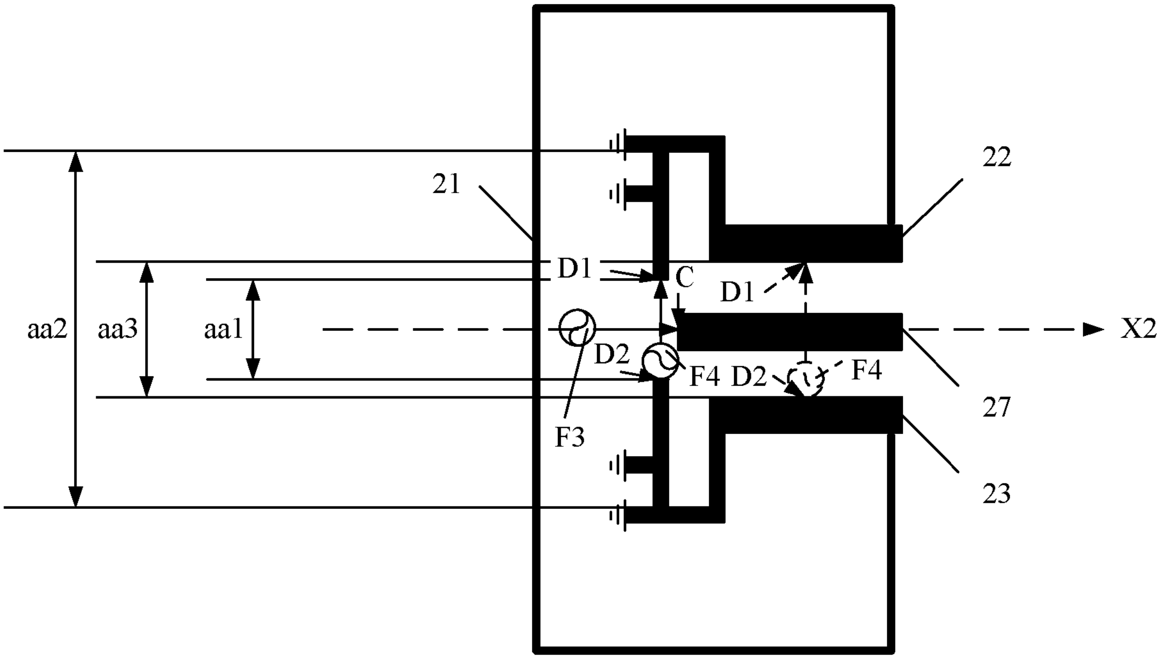
FIG. 16*b* is a schematic diagram in which a fourth feed is separately connected to a fifth radiation section and a sixth radiation section in an antenna unit according to an embodiment of this application.

With reference to FIG. 16*a* and FIG. 16*b*, a specific implementation in which the fourth feed F4 is separately connected to the fifth radiation section 22 and the sixth radiation section 23 is illustrated below.

Based on the second loop branch 20 shown in FIG. 15*a*, as shown in FIG. 16*a*, there is a same distance between the fifth radiation section 22 and the sixth radiation section 23, the distance is aa, and the distance aa falls within the second preset range. Therefore, the fourth feed F4 may be disposed at any position between the fifth radiation section 22 and the sixth radiation section 23. For ease of description, in FIG. 16*a*, an example in which the fourth feed F4 is disposed at each of a position corresponding to a solid line and a position corresponding to a dashed line is used for illustration.

Based on the second loop branch 20 shown in FIG. 15*b*, as shown in FIG. 16*b*, a minimum distance and a maximum distance between the fifth radiation section 22 and the sixth radiation section 23 are respectively a distance aa1 and a distance aa2, the second preset range is set to be less than or equal to a distance aa3, and the distance aa3 is less than the distance aa2 and greater than the distance aa1. Therefore, the fourth feed F4 may be disposed at any position corresponding to a distance that is greater than or equal to the distance aa1 and less than or equal to the distance aa3. For ease of description, in FIG. 16*b*, an example in which the fourth feed F4 is disposed at each of a position corresponding to the distance aa1 and a position corresponding to the distance aa3 is used for illustration.

In addition, a fourth matching component may be disposed between the fourth feed F4 and the fifth contact point and/or between the fourth feed F4 and the sixth contact point, to adjust the frequency band of the antenna unit, so that the fourth feed F4 can obtain a better pattern and better cross polarization performance, to improve the performance of the antenna unit. A specific implementation form of the fourth matching component is not limited in this application. For example, the fourth matching component may be a capacitor, an inductor, a capacitor and an inductor, a capacitor and a switch, an inductor and a switch, or a capacitor, an inductor, and a switch. In this application, no limitation is imposed on a capacitance value and a quantity of capacitors, an inductance value and a quantity of inductors, a type and a quantity of switches, or a connection relationship between any two of the capacitor, the inductor, and the switch.

Based on the foregoing embodiment, the antenna unit may further include a second non-conductive support member 24, a third conductive member 25, and a fourth conductive member 26. The third conductive member 25 and the fourth conductive member 26 are suspended by using the second non-conductive support member 24, and the third conductive member 25 and the fourth conductive member 26 are symmetrically disposed in the second direction X2. A length of the third conductive member 25 is a ½ wavelength, and a length of the fourth conductive member 26 is a ½ wavelength. The wavelength is a wavelength corresponding to any frequency in an operating frequency band of the antenna unit.

In this application, the third conductive member 25 and the fourth conductive member 26 are made of conductive materials, and may be suspended by using the second non-conductive support member 24 in a manner such as a manner of using a surface-mount technology or etching. Therefore, the third conductive member 25 and the fourth conductive member 26 can extend a bandwidth of the antenna unit, to improve the performance of the antenna unit. Usually, larger widths of the third conductive member 25 and the fourth conductive member 26 indicate better performance of the antenna unit.

The third conductive member 25 or the fourth conductive member 26 may be in a plurality of shapes. For a shape of the third conductive member 25 or the fourth conductive member 26, refer to the description content of the shape of the first conductive member or the second conductive member in Embodiment 1. Details are not described herein. For example, for the shape of the third conductive member 25 or the fourth conductive member 26, refer to the patch (patch) shape shown in FIG. 8*a* to FIG. 8*c* or the closed ring shape shown in FIG. 9*a* to FIG. 9*c* in Embodiment 1. A specific shape of the third conductive member 25 or the fourth conductive member 26 is not limited in this application provided that it is met that the third conductive member 25 and the fourth conductive member 26 are symmetrically disposed in the second direction X2.

In addition, parameters such as widths, quantities, and positions of third conductive members 25 and fourth conductive members 26 are also not limited in this application. Based on the antenna unit shown in FIG. 16*a* and with reference to FIG. 17*a* to FIG. 17*f*, the positions of the third conductive member 25 and the fourth conductive member 26 are described below by using examples. For ease of description, in FIG. 17*a* to FIG. 17*c*, an example in which the third conductive member 25 and the fourth second conductive member 26 are in rectangular cross-sectional shapes is used for illustration, and in FIG. 17*d* to FIG. 17*f*, an example in which the third conductive member 25 and the fourth conductive member 26 are rectangular closed rings is used for illustration.

Figure 17A:
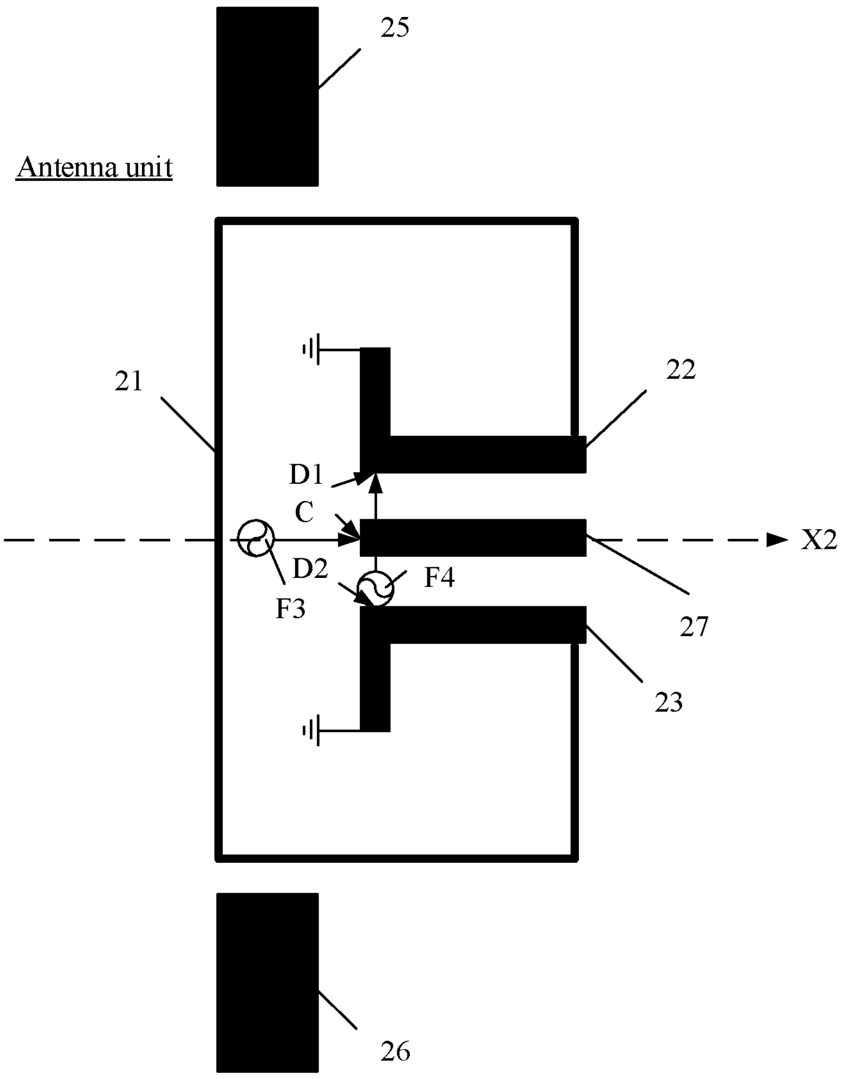
FIG. 17*a* is a schematic diagram of positions of a third conductive member and a fourth conductive member in an antenna unit according to an embodiment of this application.
Figure 17B:
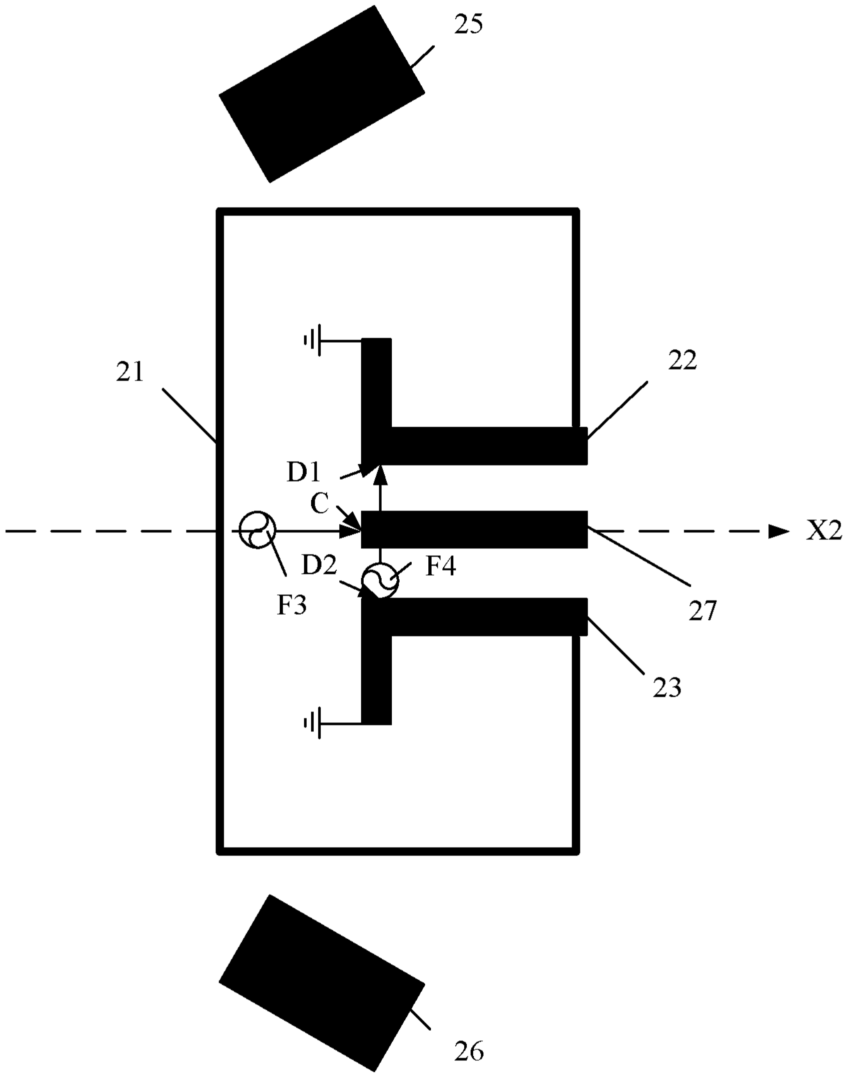
FIG. 17*b* is a schematic diagram of positions of a third conductive member and a fourth conductive member in an antenna unit according to an embodiment of this application.
Figure 17C:
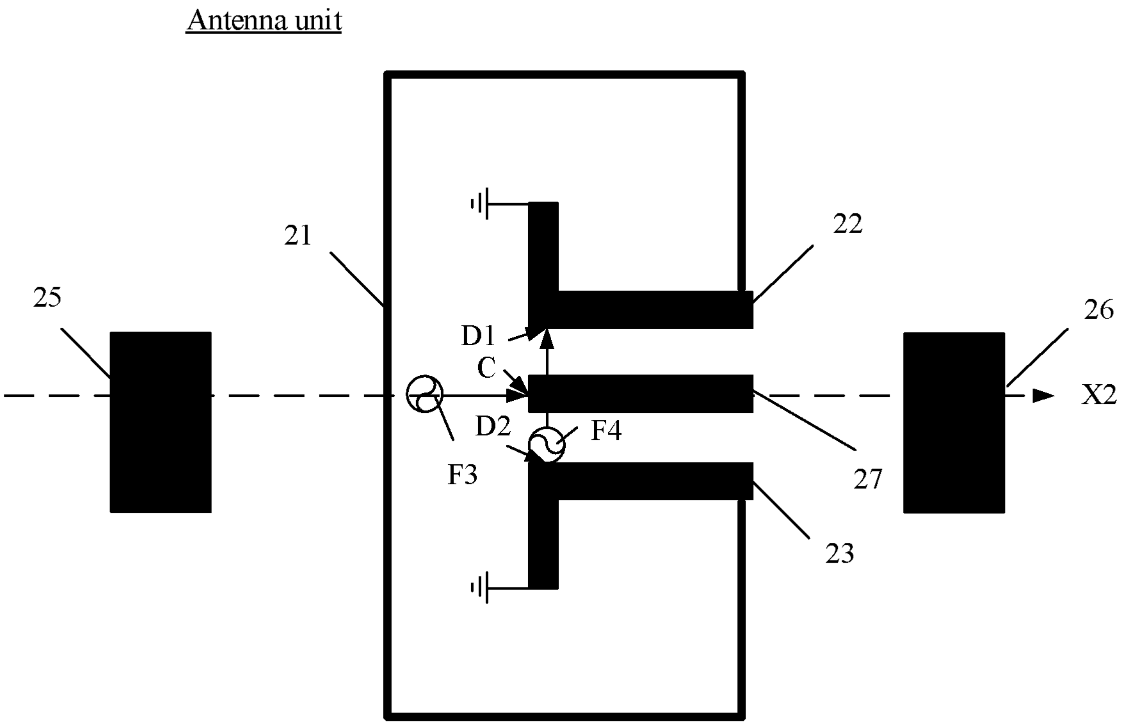
FIG. 17*c* is a schematic diagram of positions of a third conductive member and a fourth conductive member in an antenna unit according to an embodiment of this application.

Optionally, the third conductive member 25 and the fourth conductive member 26 may be disposed outside the fourth radiation section 21. For example, the third conductive member 25 and the fourth conductive member 26 may be horizontally symmetrically disposed outside the fourth radiation section 21 in the second direction X2, as shown in FIG. 17*a* and FIG. 17*b*. In FIG. 17*a*, a direction of placing the third conductive member 25 and the fourth conductive member 26 is perpendicular to the second direction X2, and in FIG. 17*b*, a direction of placing the first conductive member and the second conductive member is not perpendicular to the second direction X2. For another example, the third conductive member 25 and the fourth conductive member 26 may be vertically symmetrically disposed outside the fourth radiation section 21 in the second direction X2, as shown in FIG. 17*c*.

Figure 17D:
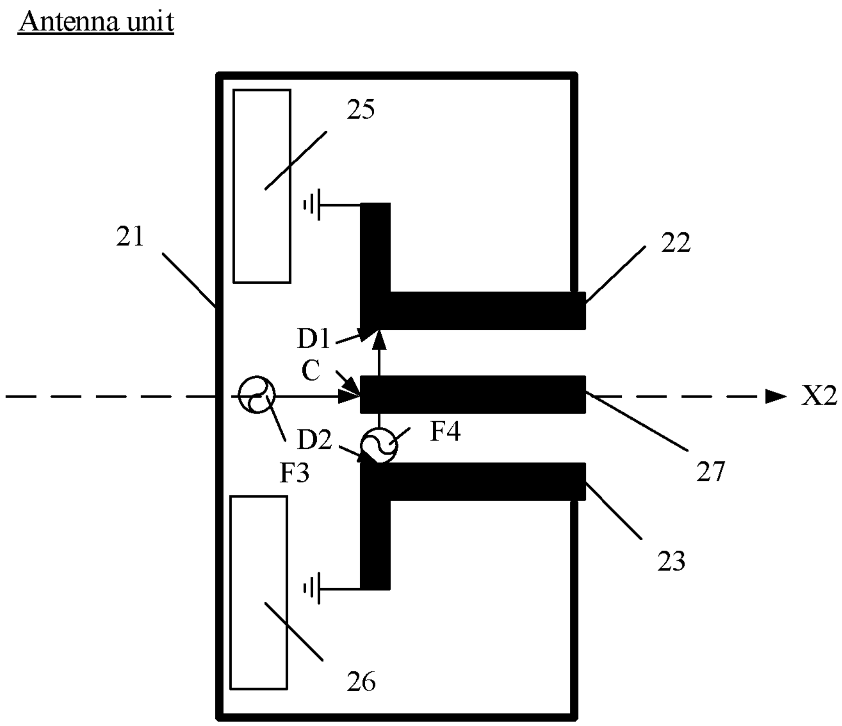
FIG. 17*d* is a schematic diagram of positions of a third conductive member and a fourth conductive member in an antenna unit according to an embodiment of this application.
Figure 17E:
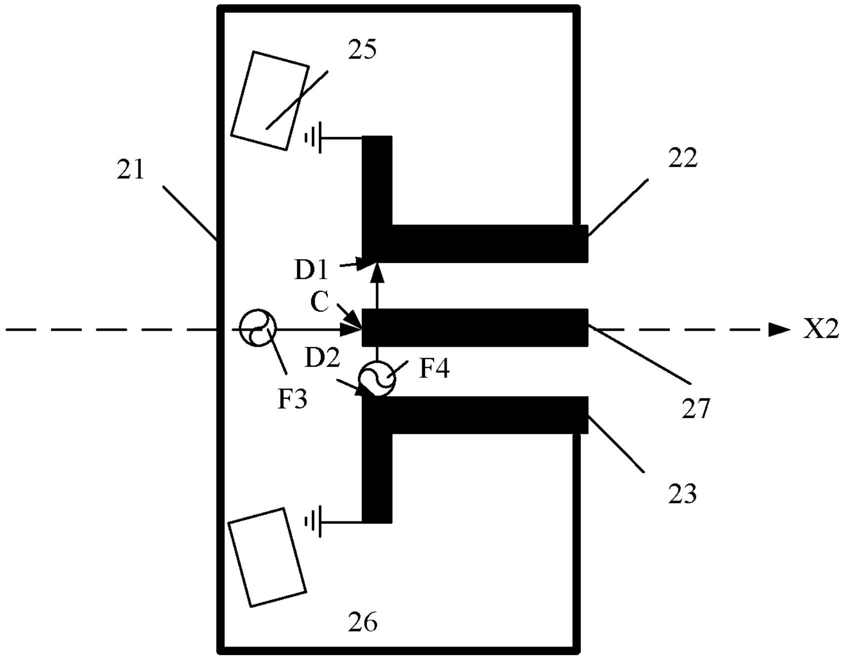
FIG. 17*e* is a schematic diagram of positions of a third conductive member and a fourth conductive member in an antenna unit according to an embodiment of this application.
Figure 17F:
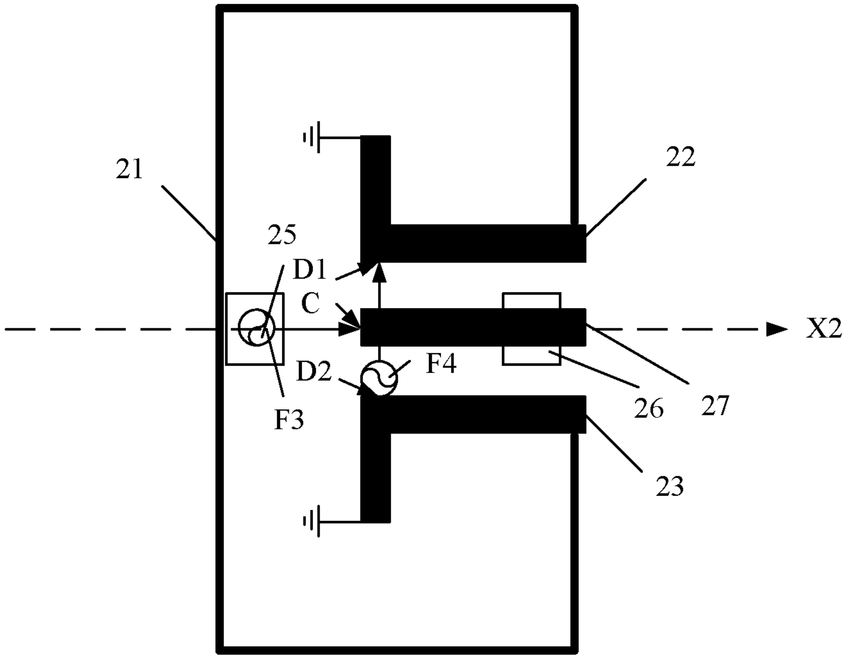
FIG. 17*f* is a schematic diagram of positions of a third conductive member and a fourth conductive member in an antenna unit according to an embodiment of this application.

Optionally, the third conductive member 25 and the fourth conductive member 26 may be disposed inside the fourth radiation section 21. For example, the third conductive member 25 and the fourth conductive member 26 may be horizontally symmetrically disposed inside the fourth radiation section 21 in the second direction X2, as shown in FIG. 17*d* and FIG. 17*e*. In FIG. 17*d*, a direction of placing the third conductive member 25 and the fourth conductive member 26 is perpendicular to the second direction X2, and in FIG. 17*e*, a direction of placing the third conductive member 25 and the fourth conductive member 26 is not perpendicular to the second direction X2. For another example, the third conductive member 25 and the fourth conductive member 26 may be vertically symmetrically disposed inside the fourth radiation section 21 in the second direction X2, as shown in FIG. 17*f.*

It should be noted that the positions of the third conductive member 25 and the fourth conductive member 26 are not limited to the foregoing implementations.

In addition, the second non-conductive support member 24 is made of a non-conductive material. Parameters such as a quantity, a material, and a position of second non-conductive support members 24 are not limited in this application. Optionally, the second non-conductive support member 24 may be a glass battery cover, a plastic battery cover, or an explosion-proof film. This is not limited in this application.

In a specific embodiment, based on the antenna unit shown in FIG. 16*a* and with reference to FIG. 18*a* to FIG. 18*i*, a structure, the performance, and current distribution of the antenna unit in this application are described in detail.

Figure 18A:
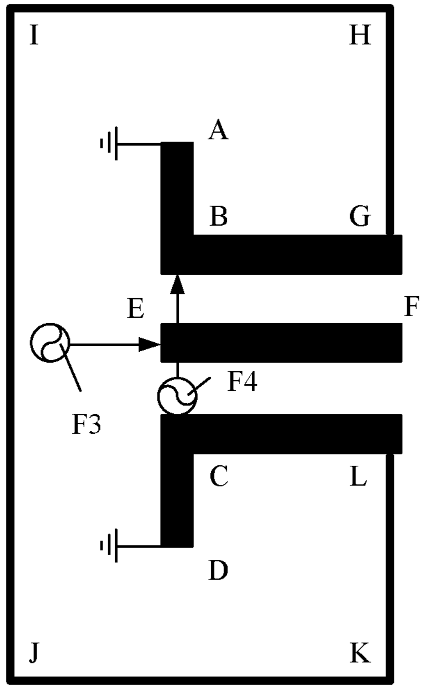
FIG. 18*a* is a schematic diagram of a topology of an antenna unit according to an embodiment of this application.

FIG. 18*a* is a schematic diagram of a topology of the antenna unit shown in FIG. 16*a*. As shown in FIG. 18*a*, the antenna unit may include a second loop antenna (ABGHIJKLCD), the feeding branch 27 (EF), the third feed F3, and the fourth feed F4. The third feed F3 is coupled and fed through a fourth contact point E, and the fourth feed F4 is fed through a fifth contact point B and a sixth contact point C. A point A and a point D are ground points, and are jointly used as a ground of a microstrip line of the fourth feed F4. The third matching component of the third feed F3 is a 0.6 pF capacitor connected in series, and the fourth matching component of the fourth feed F4 is a 1.5 nH inductor connected in series. The third feed F3 excites a signal at a C-mode port of the second loop antenna (ABGHIJKLCD), and a specific absorption rate (specific absorption rate, SAR) value is not greater than 0.75. The fourth feed F4 excites a signal at a D-mode port of the second loop antenna (ABGHIJKLCD). A maximum SAR value is 4.23, and a second resonant SAR is relatively low, and is 1.2.

In conclusion, the signal at the C-mode port of the second loop antenna (ABGHIJKLCD) enables the antenna unit to form an antenna 1, and the signal at the D-mode port of the second loop antenna (ABGHIJKLCD) enables the antenna unit to form an antenna 2. Therefore, the antenna unit can form two antennas.

Table 1 shows an SAR simulation value of the antenna 1, where backside (backside) is a posture in which an SAR probe is located at a back of the electronic device and that is in a region 5 mm away from the antenna. Table 2 shows an SAR simulation value of the antenna 2. An ECC between the antenna 1 and the antenna 2 varies with a frequency. For details, refer to Table 3. Isolation between the antenna 1 and the antenna 2 is greater than 19.5 dB, and the ECC is less than 0.007. The third feed F3 may cover frequency bands N77 and N79, and in-band efficiency is −3 dB. The fourth feed F4 may cover a frequency band N77, and in-band efficiency is −5 dB.

TABLE 1

| SAR simulation value of the antenna 1 | | | | | | | |
|---|---|---|---|---|---|---|---|
| Antenna 1 | | | | | | | |
| Input power | Resonant | 3 GHz | | 3.64 GHz | | 4.42 GHz | |
| 24 dBm | frequency | 1 g | 10 g | 1 g | 10 g | 1 g | 10 g |
| | Free space (free space, FS) simulation efficiency | −2.2 | −2.2 | −2.8 | −2.8 | −2.3 | −2.3 |
| Body specific absorption rate (body specific absorption rate, body SAR) | 5 mm backside | 2.99 | 1.43 | 1.78 | 0.80 | 2.62 | 1.07 |
| Normalized efficiency | | −5 | −5 | −5 | −5 | −5 | −5 |
| Normalized 5 mm body SAR | 5 mm backside | | 0.75 | | 0.48 | | 0.57 |

TABLE 2

| SAR simulation value of the antenna 2 | | | | | |
|---|---|---|---|---|---|
| Antenna 2 | | 3.13 GHz | | 4.22 GHz | |
| Input power 24 dBm | Resonant frequency | 1 g | 10 g | 1 g | 10 g |
| | FS simulation efficiency | −4.1 | −4.1 | −2.8 | −2.8 |
| Body SAR | 5 mm backside | 16.80 | 5.20 | 6.25 | 2.01 |
| Normalized efficiency | | −5 | −5 | −5 | −5 |
| Normalized 5 mm body SAR | 5 mm backside | | 4.23 | | 1.21 |

TABLE 3

| ECC between the antenna 1 and the antenna 2 | | | |
|---|---|---|---|
| Frequency | 3.3 | 3.6 | 4.2 |
| ECC | 0.002 | 0.0001 | 0.007 |

Figure 18B:
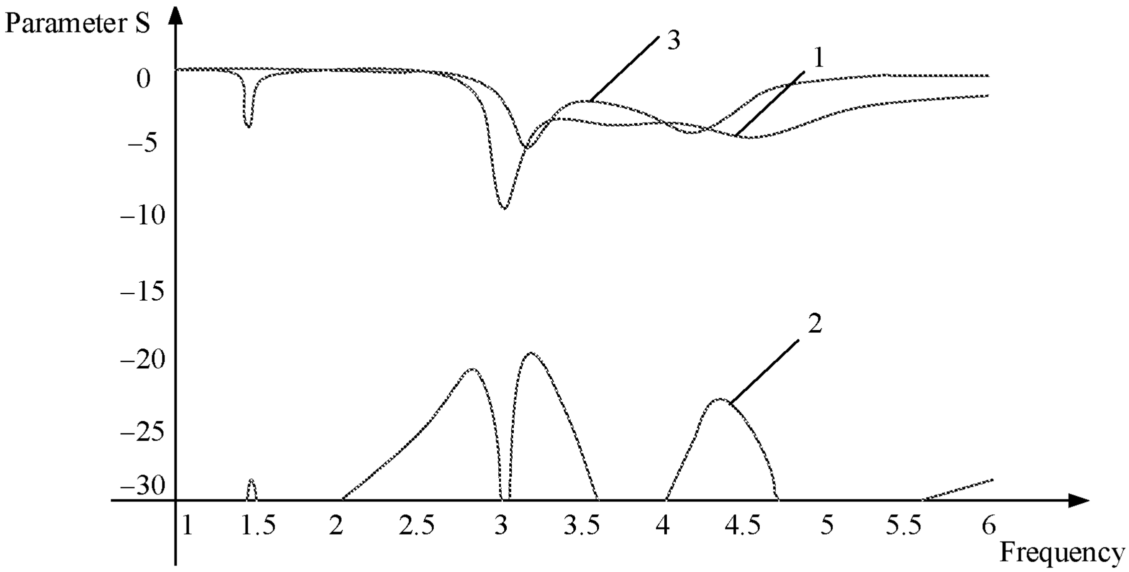
FIG. 18*b* is a schematic diagram of waveforms of S parameters of a third feed and a fourth feed in FIG. 18*a* on different operating frequency bands.

FIG. 18*b* is a schematic diagram of waveforms of S parameters of the third feed F3 and the fourth feed F4 in FIG. 18*a* on different operating frequency bands. In FIG. 18*b*, a horizontal coordinate is a frequency in a unit of GHz, and a vertical coordinate is an input reflection coefficient S11, a reverse transmission coefficient S12/a forward transmission coefficient S21, and an output reflection coefficient S22 in S parameters, and is in a unit of dB. As shown in FIG. 18*b*, a curve 1 represents an input reflection coefficient S11 of the third feed F3, there is a resonant point in the curve 1 (a signal at a D-mode port of a corresponding first feed), a curve 2 represents reverse transmission coefficients S12/ forward transmission coefficients S21 of the third feed F3 and the fourth feed F4, and a curve 3 represents an output reflection coefficient S22 of the fourth feed F4.

Figure 18C:
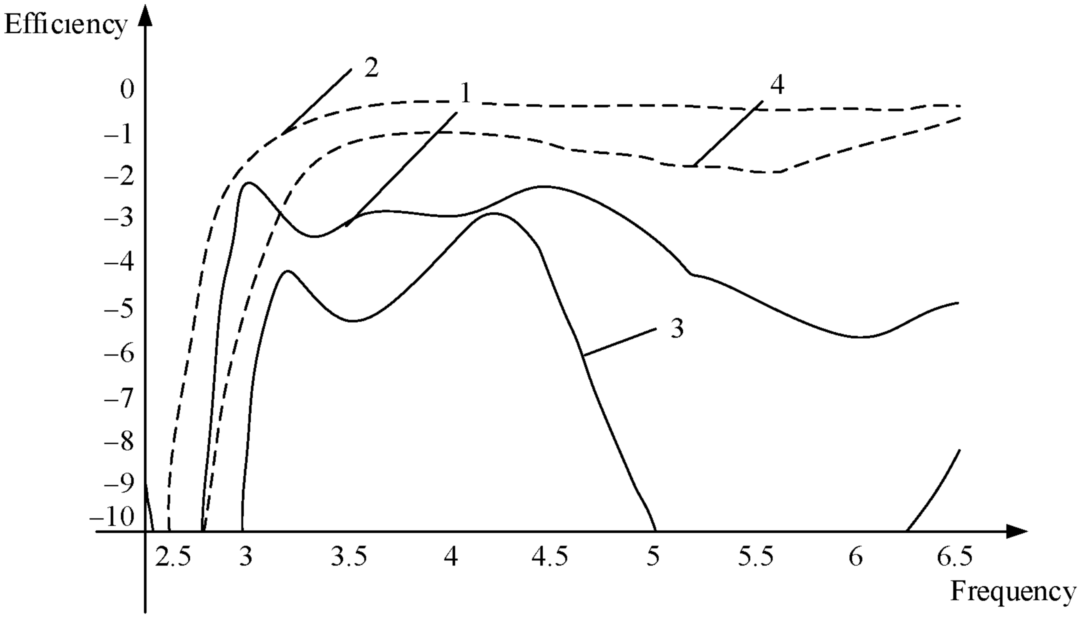
FIG. 18*c* is a schematic diagram of waveforms of system efficiency and radiation efficiency of each of a third feed and a fourth feed in FIG. 18*a;*

FIG. 18*c* is a diagram of waveforms of system efficiency and radiation efficiency of each of the third feed F3 and the fourth feed F4 in FIG. 18*a*. In FIG. 18*c*, a horizontal coordinate is a frequency in a unit of GHz, and a vertical coordinate is system efficiency in a unit of dB. As shown in FIG. 18*c*, a curve 1 represents system efficiency of the third feed F3, a curve 2 represents radiation efficiency of the third feed F3, a curve 3 represents system efficiency of the fourth feed F4, and a curve 4 represents radiation efficiency of the fourth feed F4.

Based on the foregoing description and with reference to FIG. 18*d* to FIG. 18*i*, circuit direction distribution of the antenna unit is described below by using an example.

Figure 18D:
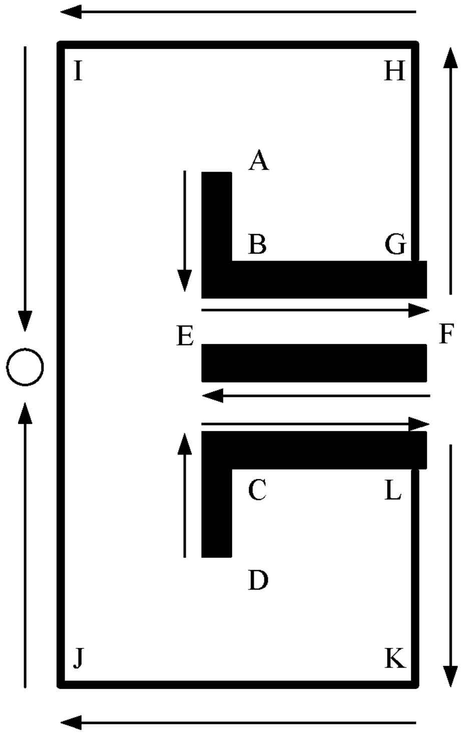
FIG. 18*d* is a diagram of current distribution of the antenna unit in FIG. 18*a;*
Figure 18E:
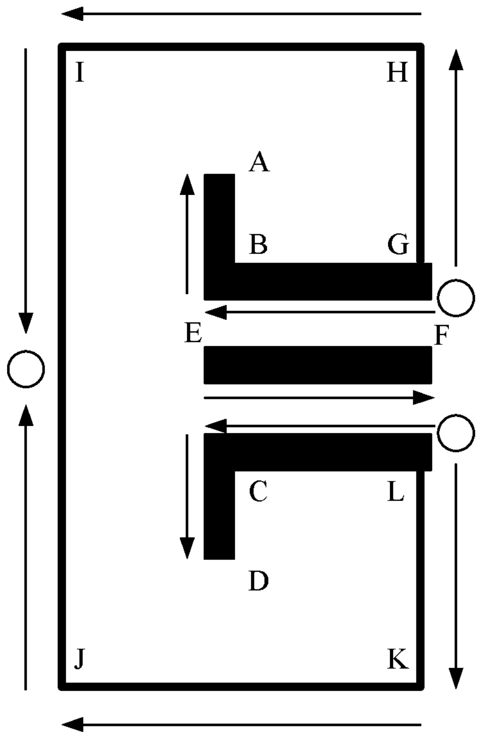
FIG. 18*e* is a diagram of current distribution of the antenna unit in FIG. 18*a;*
Figure 18F:
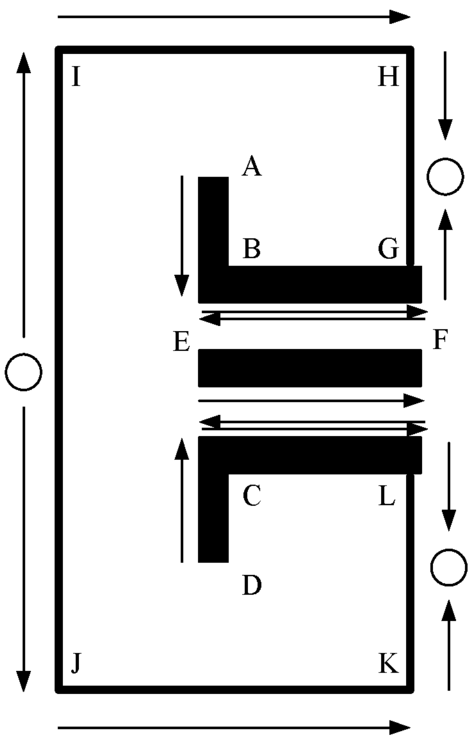
FIG. 18*f* is a diagram of current distribution of the antenna unit in FIG. 18*a;*
Figure 18G:
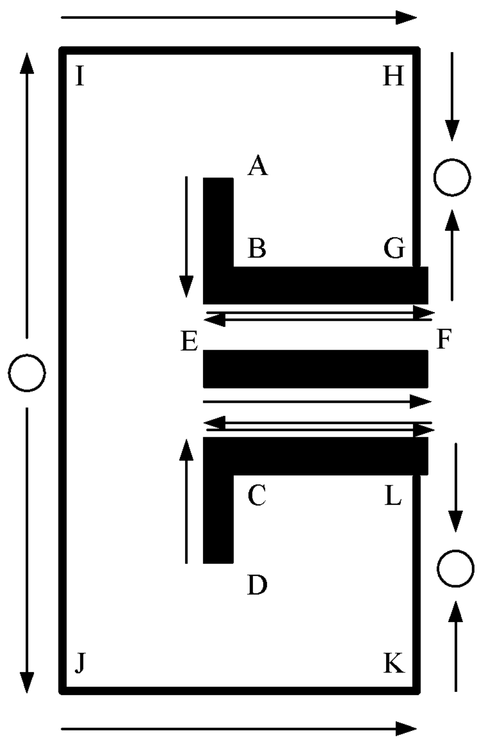
FIG. 18*g* is a diagram of current distribution of the antenna unit in FIG. 18*a;*

FIG. 18*d* is a diagram of current distribution of the antenna unit that exists when the third feed F3 excites a half wavelength mode of the second loop branch 20 at 1.4 GHz. FIG. 18*e* is a diagram of current distribution of the antenna unit that exists when the third feed F3 excites a two-thirds wavelength mode of the second loop branch 20 at 3 GHz. FIG. 18*f* is a diagram of current distribution of the antenna unit that exists when the third feed F3 excites a two-thirds wavelength mode of the second loop branch 20 at 3.6 GHz. FIG. 18*g* is a diagram of current distribution of the antenna unit that exists when the third feed F3 excites a two-thirds wavelength mode of the second loop branch 20 at 4 GHz and a quarter wavelength mode of the feeding branch 27 EF.

Figure 18H:
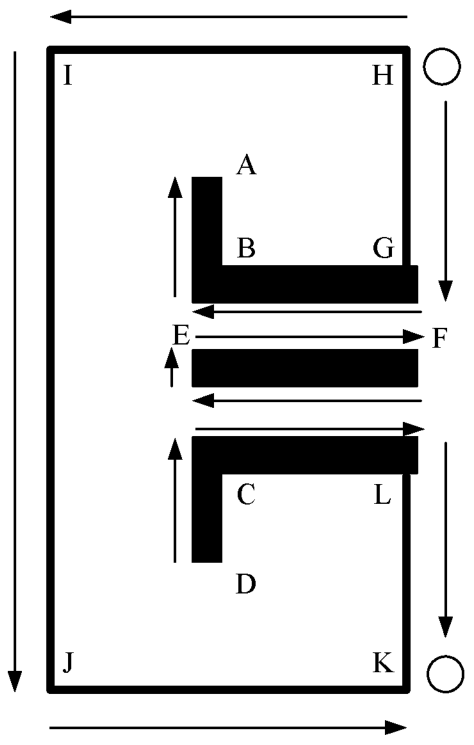
FIG. 18*h* is a diagram of current distribution of the antenna unit in FIG. 18*a;*
Figure 18I:
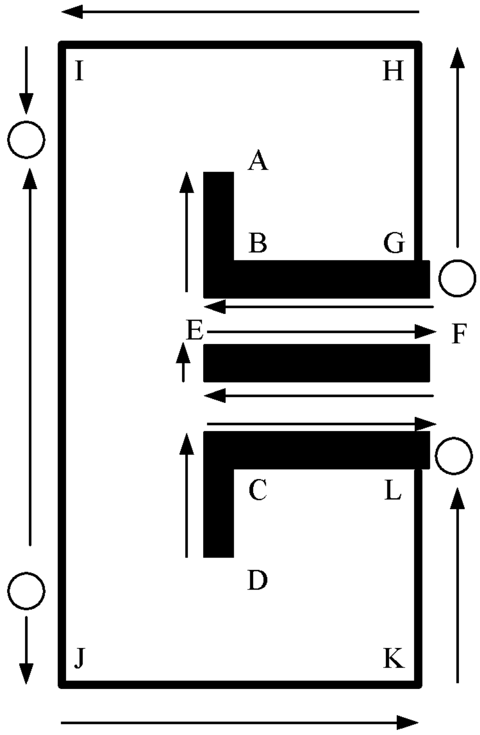
FIG. 18*i* is a diagram of current distribution of the antenna unit in FIG. 18*a;*

FIG. 18*h* is a diagram of current distribution of the antenna unit that exists when the fourth feed F4 excites a single wavelength mode of the second loop branch 20 at 3.2 GHz. FIG. 18*i* is a diagram of current distribution of the antenna unit that exists when the fourth feed F4 excites a double wavelength mode of the second loop branch 20 at 4.2 GHz (the fourth matching component, namely, a 1.5 nH inductor, is connected in series, and a radiation section AB and a radiation section CD function as parallel inductors).

In another specific embodiment, based on the antenna unit shown in FIG. 16*a* and with reference to FIG. 19*a* to FIG. 19*j*, a structure, the performance, and current distribution of the antenna unit in this application are described in detail. A difference from the foregoing embodiment is that the third feed F3 is connected to a different third matching component, and the fourth feed F4 is connected to a different fourth matching component.

Figure 19A:
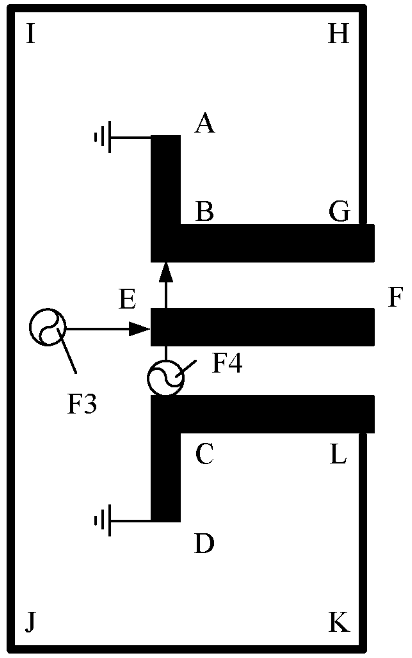
FIG. 19*a* is a schematic diagram of a topology of an antenna unit according to an embodiment of this application.

FIG. 19*a* is a schematic diagram of a topology of the antenna unit shown in FIG. 16*a*. As shown in FIG. 19*a*, the antenna unit includes a second loop antenna (ABGHIJKLCD), the feeding branch 27 (EF), the third feed F3, and the fourth feed F4. The third feed F3 is coupled and fed through a fourth contact point E, and the fourth feed F4 is fed through a fifth contact point B and a sixth contact point C. A point A and a point D are ground points, and are jointly used as a ground of a microstrip line of the fourth feed F4. The third matching component of the third feed F3 is a 1 pF capacitor connected in series, and the fourth matching component of the fourth feed F4 is a 0.3 pF capacitor and a 4 nH inductor connected in series. The third feed F3 excites a signal at a C-mode port of the second loop antenna (ABGHIJKLCD). The fourth feed F4 excites a signal at a D-mode port of the second loop antenna ABGHIJKLCD. The third feed F3 may cover frequency bands Wi-Fi 2.4G, N77, N79, and Wi-Fi 5G. In-band efficiency at Wi-Fi 2.4G is −3.2 dB, in-band efficiency at N77 is −5.7 dB, in-band efficiency at N79 is −4.2 dB, and in-band efficiency at Wi-Fi 5G is −3.4 dB. The fourth feed F4 may cover frequency bands Wi-Fi 2.4G and Wi-Fi 5G. In-band efficiency at Wi-Fi 2.4G is −3.2 dB, and in-band efficiency at Wi-Fi 5G is −3.7 dB. Maximum directivity of two antennas at Wi-Fi 2.4G is 3.7 dBi.

In conclusion, the signal at the C-mode port of the second loop antenna (ABGHIJKLCD) enables the antenna unit to form an antenna 1, and the signal at the D-mode port of the second loop antenna (ABGHIJKLCD) enables the antenna unit to form an antenna 2. Therefore, the antenna unit can form two antennas. Table 4 shows an SAR simulation value of the antenna 1, and Table 5 shows an SAR simulation value of the antenna 2. An ECC between the antenna 1 and the antenna 2 varies with a frequency. For details, refer to Table 6. Isolation between the antenna 1 and the antenna 2 is greater than 12.1 dB, and the ECC is less than 0.04. At Wi-Fi 2.4G, an SAR value of the signal at the C-mode port is 0.6, and an SAR value of the signal at the D-mode port is 2.86. At Wi-Fi 5G, an SAR value of the signal at the C-mode port is 1.7, and an SAR value of the signal at the D-mode port is 0.5. At N77 or N79, an SAR value of the signal at the C-mode port is 0.7.

TABLE 4

SAR simulation value of the antenna 1

| Antenna 1 | | 2.4 GHz | | 3.7 GHZ | | 4.7 GHZ | | 5.8 GHZ | |
|---|---|---|---|---|---|---|---|---|---|
| Input power 24 dBm | Resonant frequency | 1 g | 10 g | 1 g | 10 g | 1 g | 10 g | 1 g | 10 g |
| | FS simulation efficiency | −2.3 | −2.3 | −5 | −5 | −1.5 | −1.5 | −2.3 | −2.3 |
| Body SAR | 5 mm backside | 2.48 | 1.12 | 1.49 | 0.57 | 6.02 | 1.60 | 9.48 | 3.22 |
| Normalized efficiency | | −5 | −5 | −5 | −5 | −5 | −5 | −5 | −5 |
| Normalized 5 mm body SAR | 5 mm backside | | 0.60 | | 0.57 | | 0.71 | | 1.73 |

TABLE 5

SAR simulation value of the antenna 2

| Antenna 2 | | | | | |
|---|---|---|---|---|---|
| Input power | Resonant | 2.4 GHz | | 5.5 GHz | |
| 24 dBm | frequency | 1 g | 10 g | 1 g | 10 g |
| | FS simulation efficiency | −2.4 | −2.4 | −1.5 | −1.5 |
| Body SAR | 5 mm backside | 13.40 | 5.21 | 4.39 | 1.32 |
| Normalized efficiency | | −5 | −5 | −5 | −5 |
| Normalized 5 mm body SAR | 5 mm backside | | 2.86 | | 0.59 |

TABLE 6

| ECC between the antenna 1 and the antenna 2 | | | | |
|---|---|---|---|---|
| Frequency | 2.4 | 3.6 | 4.7 | 5.5 |
| ECC | 0.0007 | 0.004 | 0.04 | 0.007 |

Figure 19B:
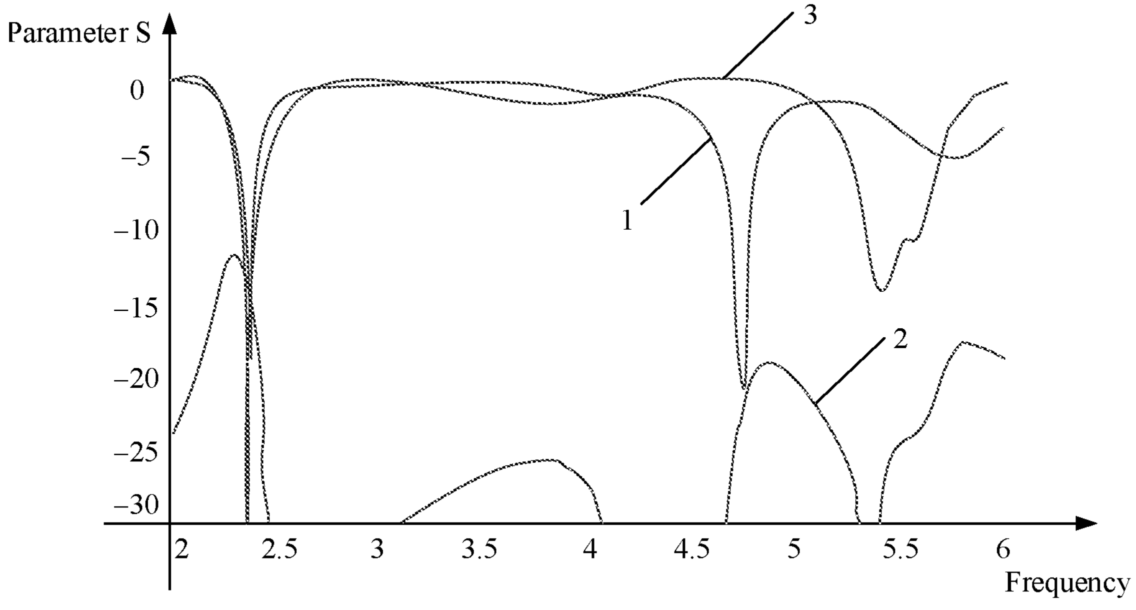
FIG. 19*b* is a schematic diagram of waveforms of S parameters of a third feed and a fourth feed in FIG. 19*a* on different operating frequency bands.

FIG. 19*b* is a schematic diagram of waveforms of S parameters of the third feed F3 and the fourth feed F4 in FIG. 19*a* on different operating frequency bands. In FIG. 19*b*, a horizontal coordinate is a frequency in a unit of GHz, and a vertical coordinate is an input reflection coefficient S11, a reverse transmission coefficient S12/a forward transmission coefficient 521, and an output reflection coefficient S22 in S parameters, and is in a unit of dB. As shown in FIG. 19*b*, a curve 1 represents an input reflection coefficient S11 of the third feed F3, a curve 2 represents reverse transmission coefficients S12/forward transmission coefficients S21 of the third feed F3 and the fourth feed F4, and a curve 3 represents an output reflection coefficient S22 of the fourth feed F4.

Figure 19C:
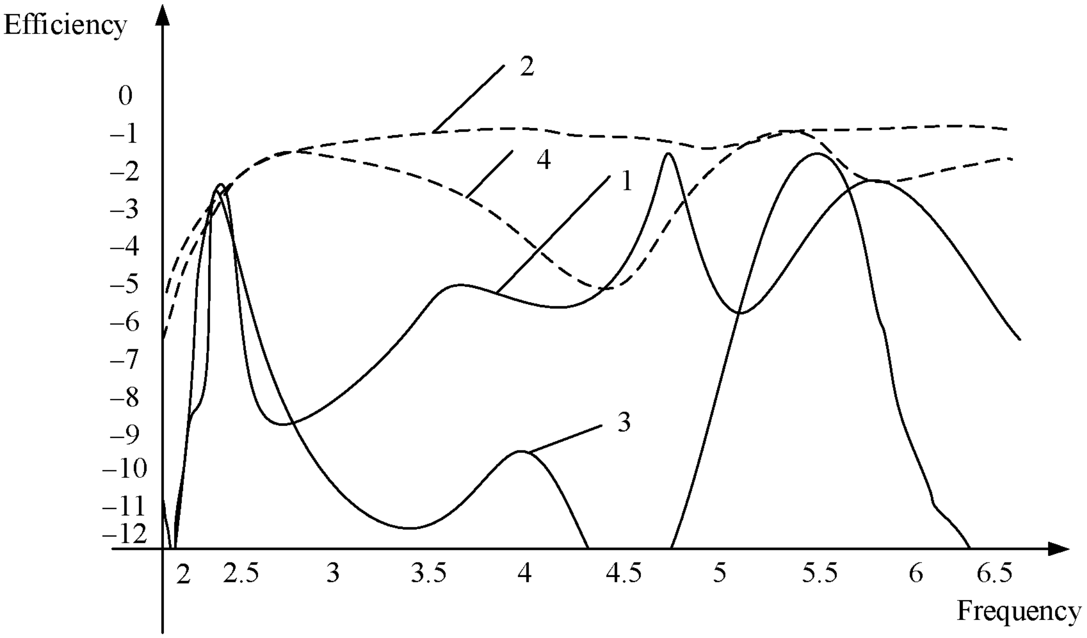
FIG. 19*c* is a schematic diagram of waveforms of system efficiency and radiation efficiency of each of a third feed and a fourth feed in FIG. 19*a;*

FIG. 19*c* is a diagram of waveforms of system efficiency and radiation efficiency of each of the third feed F3 and the fourth feed F4 in FIG. 19*a*. In FIG. 19*c*, a horizontal coordinate is a frequency in a unit of GHz, and a vertical coordinate is system efficiency in a unit of dB. As shown in FIG. 19*c*, a curve 1 represents system efficiency of the third feed F3, a curve 2 represents radiation efficiency of the third feed F3, a curve 3 represents system efficiency of the fourth feed F4, and a curve 4 represents radiation efficiency of the fourth feed F4.

Based on the foregoing description and with reference to FIG. 19*d* to FIG. 19*j*, circuit direction distribution of the antenna unit is described below by using an example.

Figure 19D:
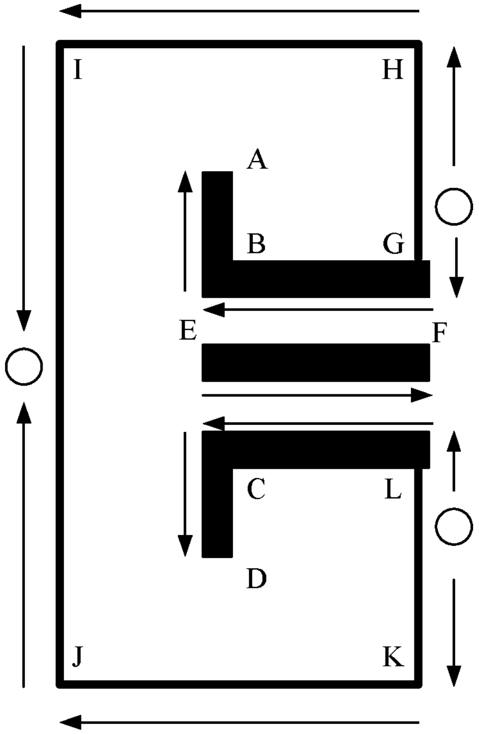
FIG. 19*d* is a diagram of current distribution of the antenna unit in FIG. 19*a;*
Figure 19E:
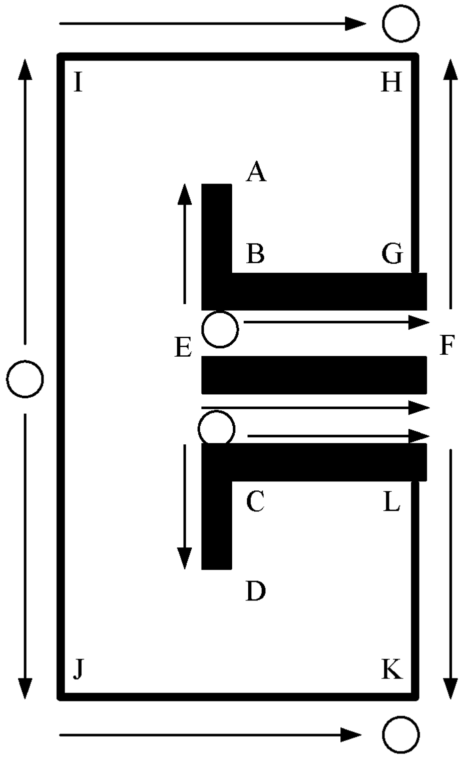
FIG. 19*e* is a diagram of current distribution of the antenna unit in FIG. 19*a;*
Figure 19F:
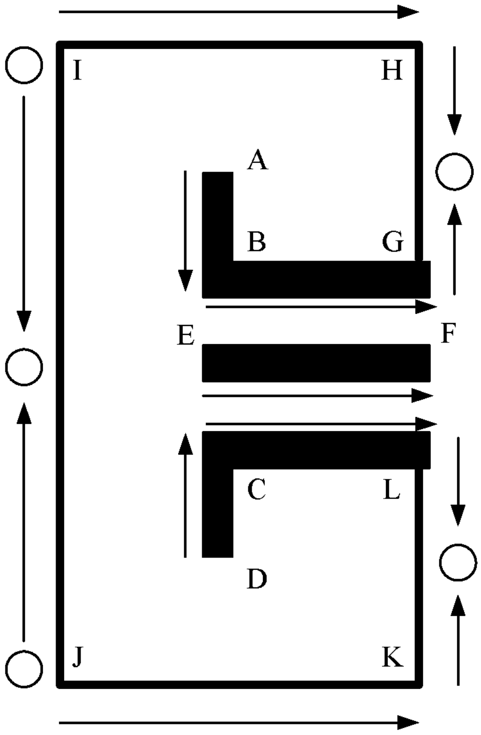
FIG. 19*f* is a diagram of current distribution of the antenna unit in FIG. 19*a;*
Figure 19G:
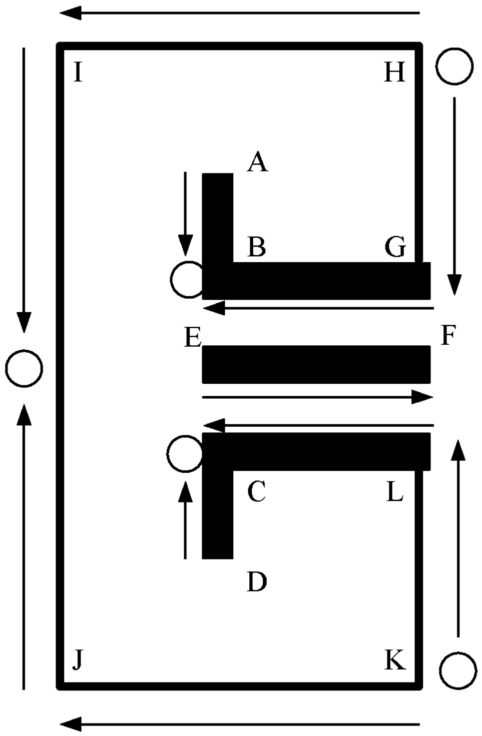
FIG. 19*g* is a diagram of current distribution of the antenna unit in FIG. 19*a;*

FIG. 19*d* is a diagram of current distribution of the antenna unit that exists when the third feed F3 excites a two-thirds wavelength mode of the second loop branch 20 at 2.4 GHz. FIG. 19*e* is a diagram of current distribution of the antenna unit that exists when the third feed F3 excites a two-thirds wavelength mode of the second loop branch 20 at 3.6 GHz (a radiation section AB and a radiation section CD function as parallel inductors). FIG. 19*f* is a diagram of current distribution of the antenna unit that exists when the third feed F3 excites a two-fifths wavelength mode of the second loop branch 20 at 4.7 GHz. FIG. 19*g* is a diagram of current distribution of the antenna unit that exists when the third feed F3 excites a two-thirds wavelength mode of the second loop branch 20 at 5.8 GHz.

Figure 19H:
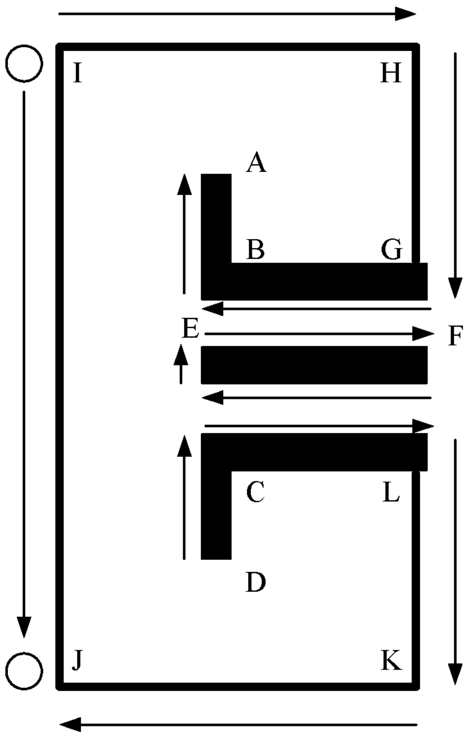
FIG. 19*h* is a diagram of current distribution of the antenna unit in FIG. 19*a;*
Figure 19I:
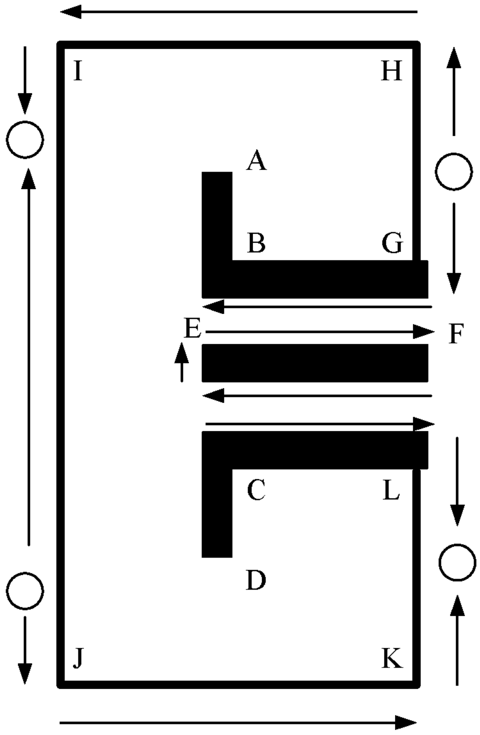
FIG. 19*i* is a diagram of current distribution of the antenna unit in FIG. 19*a;*
Figure 19J:
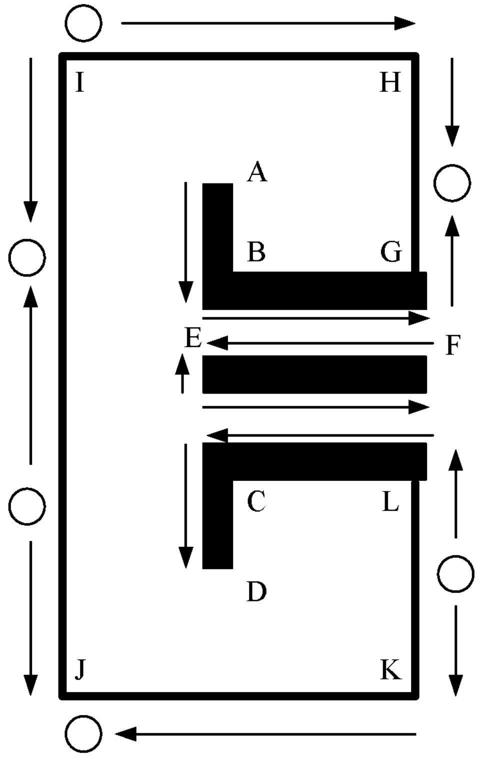
FIG. 19*j* is a diagram of current distribution of the antenna unit in FIG. 19*a;*

FIG. 19*h* is a diagram of current distribution of the antenna unit that exists when the fourth feed F4 excites a single wavelength mode of the second loop branch 20 at 2.4 GHz. FIG. 19*i* is a diagram of current distribution of the antenna unit that exists when the fourth feed F4 excites a double wavelength mode of the second loop branch 20 at 4 GHz. FIG. 19*j* is a diagram of current distribution of the antenna unit that exists when the fourth feed F4 excites a triple wavelength mode of the second loop branch 20 at 5.6 GHz.

In another specific embodiment, based on the antenna unit shown in FIG. 17*a* and with reference to FIG. 20*a* to FIG. 20*i*, a structure, the performance, and current distribution of the antenna unit in this application are described in detail. A difference from the first specific embodiment is that the second non-conductive support member 24, the third conductive member 25 MN, and the fourth conductive member 26 OP are added.

Figure 20A:
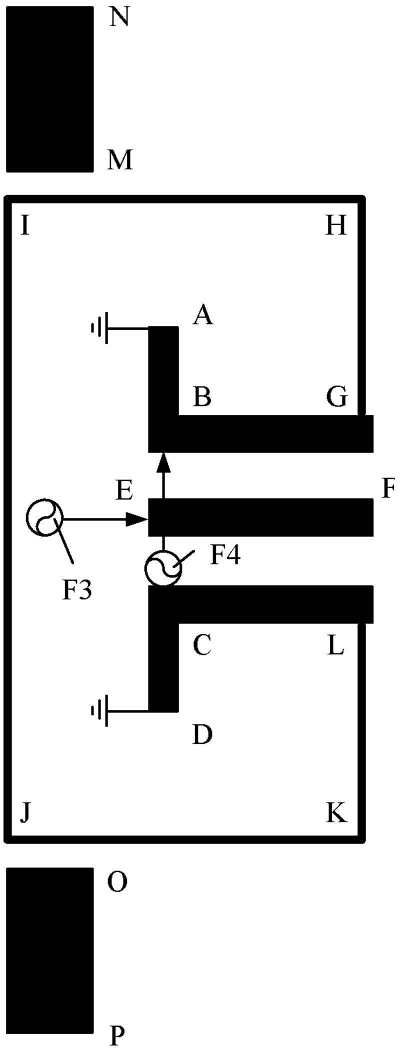
FIG. 20*a* is a schematic diagram of a topology of an antenna unit according to an embodiment of this application.

FIG. 20*a* is a schematic diagram of a topology of the antenna unit shown in FIG. 17*a*. As shown in FIG. 20*a*, the antenna unit includes a second loop antenna (ABGHIJKLCD), the feeding branch 27 (EF), the third feed F3, the fourth feed F4, the second non-conductive support member 24 (not shown in FIG. 20*a*), the third conductive member 25 MN, and the fourth conductive member 26 OP. The third feed F3 is coupled and fed through a fourth contact point E, and the fourth feed F4 is fed through a fifth contact point B and a sixth contact point C. A point A and a point D are ground points, and are jointly used as a ground of a microstrip line of the fourth feed F4. The third conductive member 25 (MN) and the fourth conductive member 26 (OP) are used to extend the bandwidth of the antenna unit. The third matching component of the third feed F3 is a 0.6 pF capacitor connected in series, and the fourth matching component of the fourth feed F4 is a 1.5 nH inductor connected in series. The third feed F3 excites a signal at a C-mode port of the second loop antenna (ABGHIJKLCD). The fourth feed F4 excites a signal at a D-mode port of the second loop antenna (ABGHIJKLCD).

In conclusion, the signal at the C-mode port of the second loop antenna (ABGHIJKLCD) enables the antenna unit to form an antenna 1, and the signal at the D-mode port of the second loop antenna (ABGHIJKLCD) enables the antenna unit to form an antenna 2. Therefore, the antenna unit can form two antennas. Table 7 shows SAR simulation values of the antenna 1, the third conductive member 25 (MN), and the fourth conductive member 26 (OP), and Table 8 shows SAR simulation values of the antenna 2, the third conductive member 25 MN, and the fourth conductive member 26 OP. An ECC between the antenna 1 and the antenna 2 varies with a frequency. For details, refer to Table 9. Isolation between the antenna 1 and the antenna 2 is greater than 12 dB, and the ECC is less than 0.09. The third conductive member 25 (MN) and the fourth conductive member 26 (OP) are used, and therefore both the third feed F3 and the fourth feed F4 may cover frequency bands N77 and N79. In-band efficiency of the third feed F3 is −3 dB, and in-band efficiency of the fourth feed F4 is −4 dB. In addition, the third conductive member 25 MN and the fourth conductive member 26 OP are used, and therefore a maximum SAR value of the antenna 2 is 1.89 and a maximum SAR value of the antenna 1 is 1.18.

TABLE 7

SAR simulation values of the antenna 1, the third conductive member 25 (MN), and the fourth conductive member 26 (OP)

| Antenna 1, third conductive member 25 (MN), and fourth conductive member 26 (OP) | | 2.98 GHz | | 3.3 GHZ | | 3.73 GHz | | 4.52 GHz | | 5 GHz | |
|---|---|---|---|---|---|---|---|---|---|---|---|
| Input power 24 dBm | Resonant frequency | 1 g | 10 g | 1 g | 10 g | 1 g | 10 g | 1 g | 10 g | 1 g | 10 g |

TABLE 7-continued

SAR simulation values of the antenna 1, the third conductive member 25 (MN), and the fourth conductive member 26 (OP)

| | | | | | | | | | | | |
|---|---|---|---|---|---|---|---|---|---|---|---|
| | FS simulation efficiency | −1.9 | −1.9 | −2 | −2 | −1 | −1 | −1 | −1 | −4 | −4 |
| Body SAR | 5 mm backside | 3.25 | 1.50 | 3.14 | 1.41 | 3.42 | 1.32 | 9.41 | 2.35 | 6.60 | 1.49 |
| Normalized efficiency | | −5 | −5 | −5 | −5 | −5 | −5 | −5 | −5 | −5 | −5 |
| Normalized 5 mm body SAR | 5 mm backside | | 0.73 | | 0.71 | | 0.53 | | 0.94 | | 1.18 |

TABLE 8

SAR simulation values of the antenna 2, the third conductive member 25 (MN), and the fourth conductive member 26 (OP)

| Antenna 2, third conductive member 25 (MN), and fourth conductive member 26 (OP) | | 2.85 GHZ | | 3.32 GHz | | 4 GHZ | | 4.52 GHz | | 5 GHZ | |
|---|---|---|---|---|---|---|---|---|---|---|---|
| Input power 24 dBm | Resonant frequency | 1 g | 10 g | 1 g | 10 g | 1 g | 10 g | 1 g | 10 g | 1 g | 10 g |
| | FS simulation efficiency | −1.9 | −1.9 | −4.74 | −4.74 | −3.4 | −3.4 | −4.7 | −4.7 | −2 | −2 |
| Body SAR | 5 mm backside | 21.07 | 7.31 | 5.80 | 2.01 | 6.40 | 2.18 | 4.43 | 1.30 | 10.57 | 2.52 |
| Normalized efficiency | | −5 | −5 | −5 | −5 | −5 | −5 | −5 | −5 | −5 | −5 |
| Normalized 5 mm body SAR | 5 mm backside | | 3.58 | | 1.89 | | 1.51 | | 1.21 | | 1.26 |

TABLE 9

ECC between the antenna 1 and the antenna 2

| | | | | |
|---|---|---|---|---|
| Frequency | 3.3 | 3.6 | 4.2 | 5 |
| ECC | 0.005 | 0.004 | 0.01 | 0.09 |

Figure 20B:
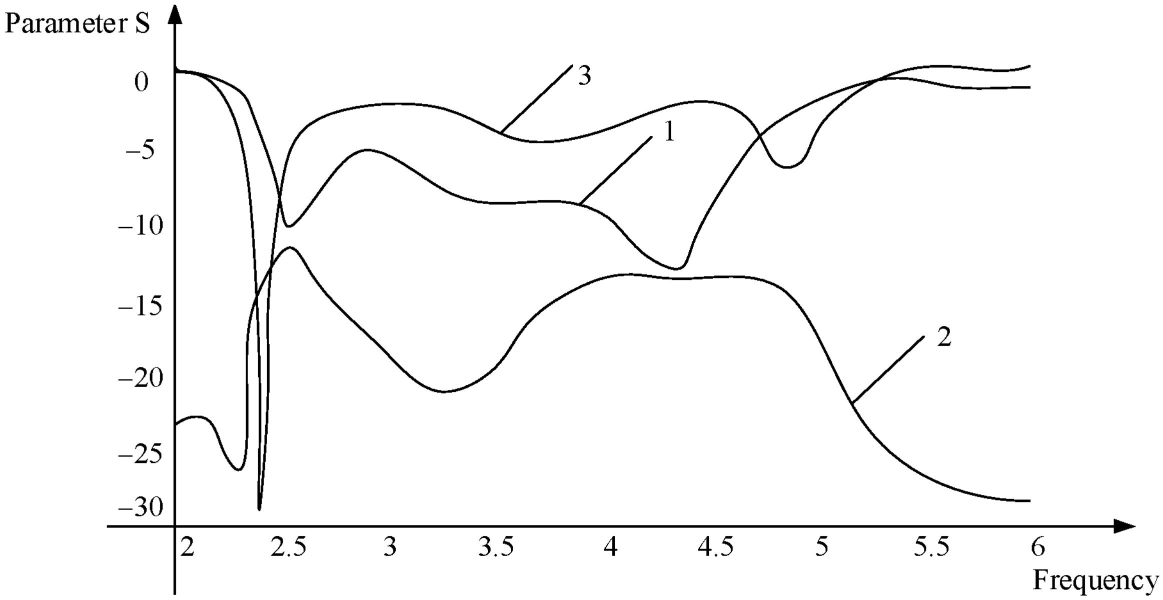
FIG. 20*b* is a schematic diagram of waveforms of S parameters of a third feed and a fourth feed in FIG. 20*a* on different operating frequency bands.

FIG. 20*b* is a schematic diagram of waveforms of S parameters of the third feed F3 and the fourth feed F4 in FIG. 20*a* on different operating frequency bands. In FIG. 20*b*, a horizontal coordinate is a frequency in a unit of GHz, and a vertical coordinate is an input reflection coefficient S11, a reverse transmission coefficient S12/a forward transmission coefficient S21, and an output reflection coefficient S22 in S parameters, and is in a unit of dB. As shown in FIG. 20*b*, a curve 1 represents an input reflection coefficient S11 of the third feed F3, a curve 2 represents reverse transmission coefficients S12/forward transmission coefficients S21 of the third feed F3 and the fourth feed F4, and a curve 3 represents an output reflection coefficient S22 of the fourth feed F4.

Figure 20C:
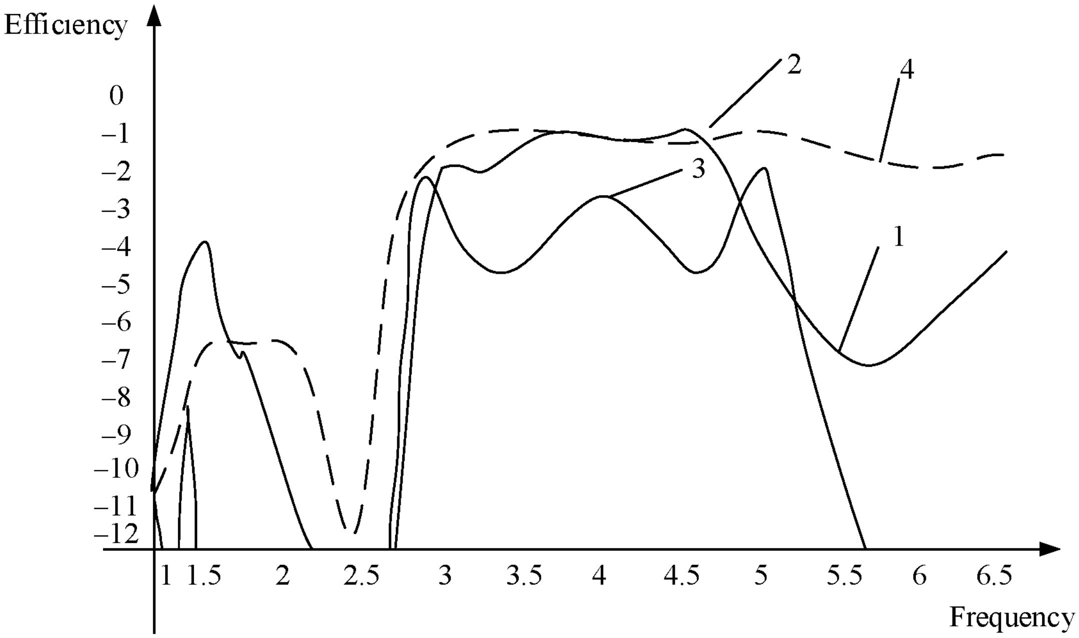
FIG. 20*c* is a schematic diagram of waveforms of system efficiency and radiation efficiency of each of a third feed and a fourth feed in FIG. 20*a;*

FIG. 20*c* is a diagram of waveforms of system efficiency and radiation efficiency of each of the third feed F3 and the fourth feed F4 in FIG. 20*a*. In FIG. 20*c*, a horizontal coordinate is a frequency in a unit of GHz, and a vertical coordinate is system efficiency in a unit of dB. As shown in FIG. 20*c*, a curve 1 represents system efficiency of the third feed F3, a curve 2 represents radiation efficiency of the third feed F3, a curve 3 represents system efficiency of the fourth feed F4, and a curve 4 represents radiation efficiency of the fourth feed F4.

Based on the foregoing description and with reference to FIG. 20*d* to FIG. 20*i*, circuit direction distribution of the antenna unit is described below by using an example.

Figure 20D:
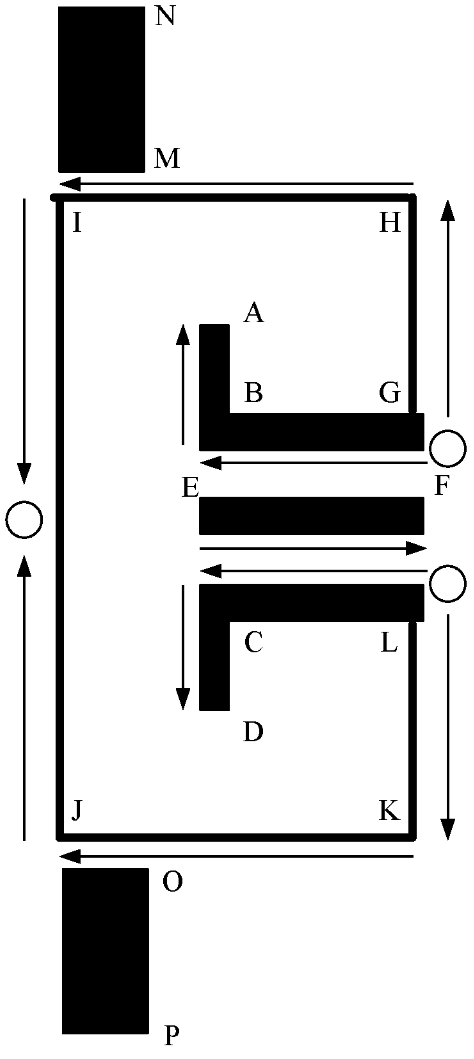
FIG. 20*d* is a diagram of current distribution of the antenna unit in FIG. 20*a;*
Figure 20E:
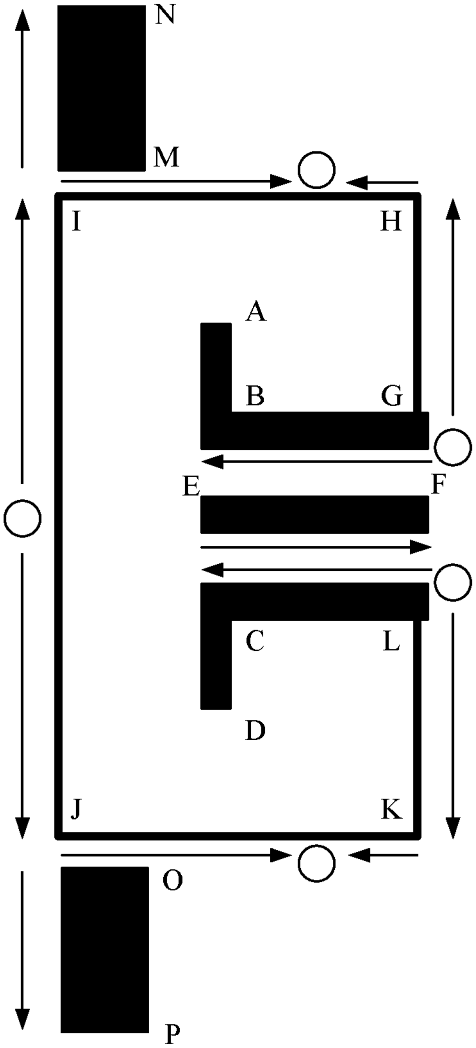
FIG. 20*e* is a diagram of current distribution of the antenna unit in FIG. 20*a;*
Figure 20F:
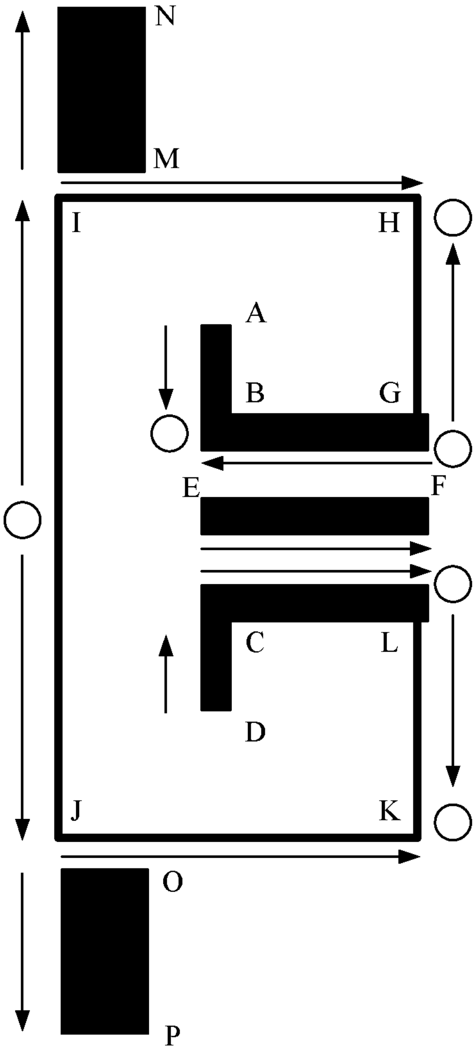
FIG. 20*f* is a diagram of current distribution of the antenna unit in FIG. 20*a;*
Figure 20G:
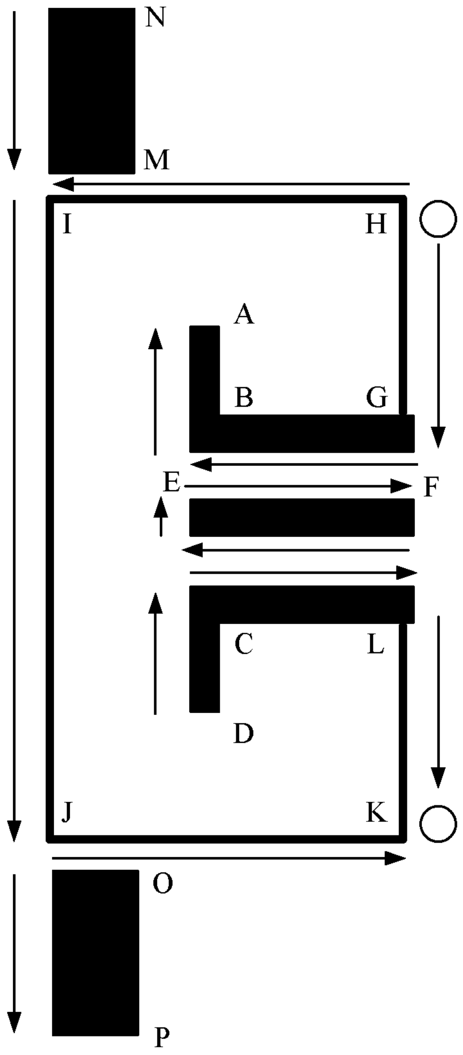
FIG. 20*g* is a diagram of current distribution of the antenna unit in FIG. 20*a;*

FIG. 20*d* is a diagram of current distribution of the antenna unit that exists when the third feed F3 excites a two-thirds wavelength mode of the second loop branch 20 at 3 GHz. FIG. 20*e* is a diagram of current distribution of the antenna unit that exists when the third feed F3 excites a two-thirds wavelength mode of the second loop branch 20 at 3.7 GHz. FIG. 20*f* is a diagram of current distribution of the antenna unit that exists when the third feed F3 excites a two-fifths wavelength mode of the second loop branch 20 at 4.5 GHz. FIG. 20*g* is a diagram of current distribution of the antenna unit that exists when the third feed F3 excites a two-thirds wavelength mode of the second loop branch 20 at 2.9 GHz.

Figure 20H:
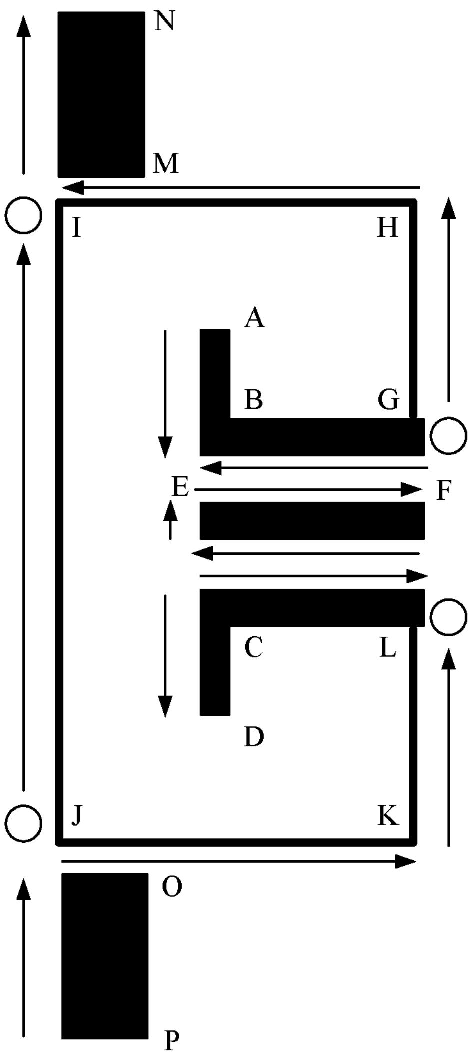
FIG. 20*h* is a diagram of current distribution of the antenna unit in FIG. 20*a;*
Figure 20I:
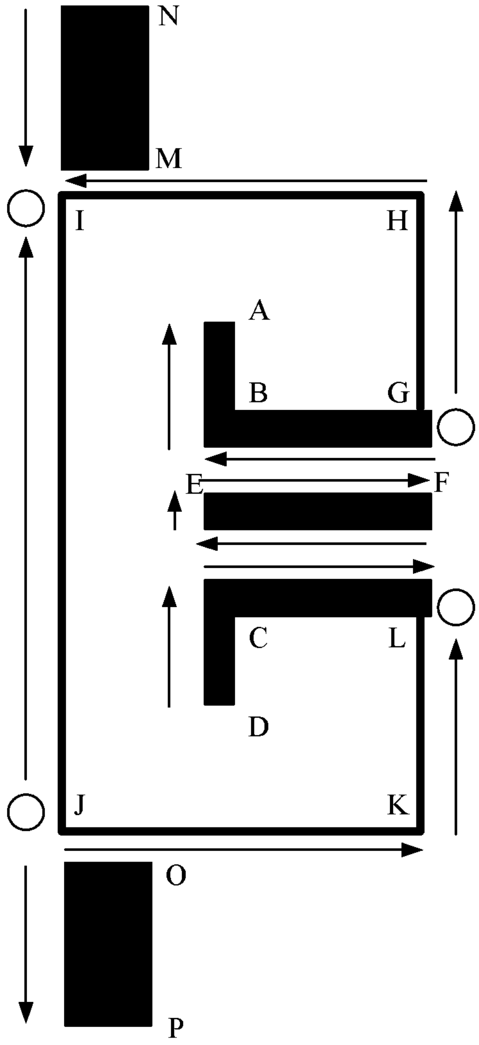
FIG. 20*i* is a diagram of current distribution of the antenna unit in FIG. 20*a;*

FIG. 20*h* is a diagram of current distribution of the antenna unit that exists when the fourth feed F4 excites a single wavelength mode of the second loop branch 20 at 4 GHz. FIG. 20*i* is a diagram of current distribution of the antenna unit that exists when the fourth feed F4 excites a double wavelength mode of the second loop branch 20 at 2.5 GHz.

Figure 21A:
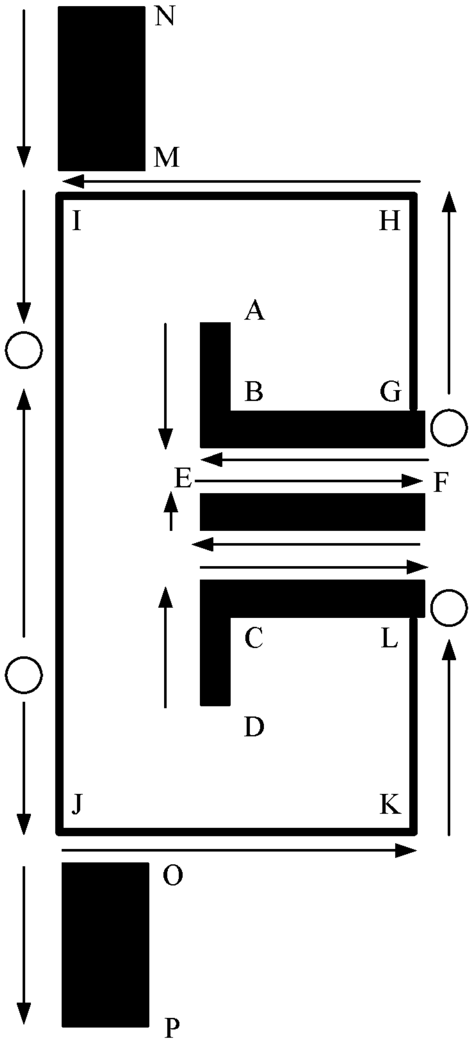
FIG. 21*a* is a schematic diagram of a topology of an antenna unit according to an embodiment of this application.
Figure 21B:
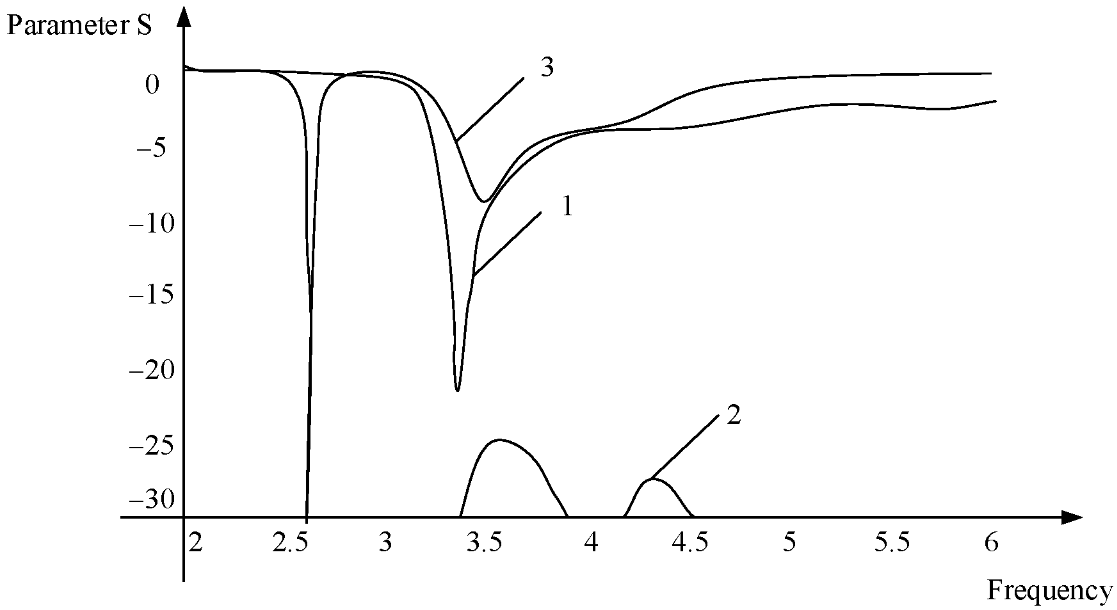
FIG. 21*b* is a schematic diagram of waveforms of S parameters of a third feed and a fourth feed in FIG. 21*a* on different operating frequency bands.
Figure 21C:
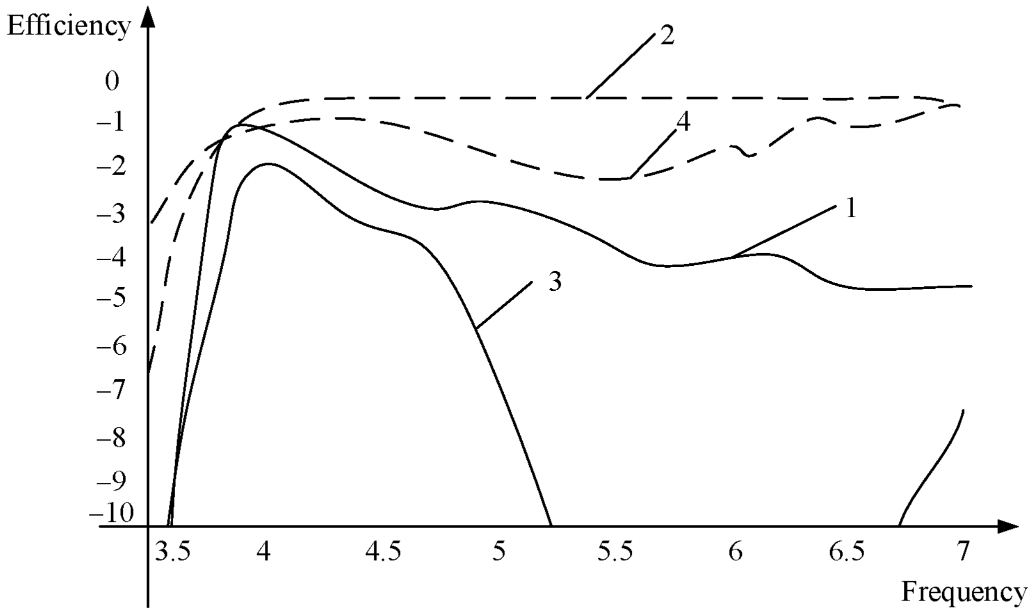
FIG. 21*c* is a schematic diagram of waveforms of system efficiency and radiation efficiency of each of a third feed and a fourth feed in FIG. 21*a*.

In another specific embodiment, based on the antenna unit shown in FIG. 16*b* and with reference to FIG. 21*a* to FIG. 21*c*, a structure, the performance, and current distribution of the antenna unit in this application are described in detail. A difference from the first specific embodiment is that there is a different specific implementation form of the antenna unit.

FIG. 21*a* is a schematic diagram of a topology of the antenna unit shown in FIG. 16*b*. As shown in FIG. 21*a*, the antenna unit includes a second loop antenna (ABGHIJKLCD+MNO+PQR), the feeding branch 27 (EF), the third feed F3, and the fourth feed F4. The third feed F3 is coupled and fed through a fourth contact point E, and the fourth feed F4 is fed through a fifth contact point O and a sixth contact point P. A point M, a point N, a point Q, and a point R are ground points. The third matching component of the third feed F3 is a 0.7 pF capacitor connected in series, and the fourth matching component of the fourth feed F4 is a 0.3 pF capacitor connected in series. The third feed F3 excites a signal at a C-mode port of the second loop antenna (ABGHIJKLCD+MNO+PQR). The fourth feed F4 excites a signal at a D-mode port of the second loop antenna (ABGHIJKLCD+MNO+PQR).

In conclusion, the signal at the C-mode port of the second loop antenna (ABGHIJKLCD+MNO+PQR) enables the antenna unit to form an antenna 1, and the signal at the D-mode port of the second loop antenna (ABGHIJKLCD+MNO+PQR) enables the antenna unit to form an antenna 2. Therefore, the antenna unit can form two antennas. An ECC between the antenna 1 and the antenna 2 varies with a frequency. For details, refer to Table 10. Isolation between the antenna 1 and the antenna 2 is greater than 24.5 dB, and the ECC is less than 0.0077. The third feed F3 may cover frequency bands N77 and N79, and in-band efficiency is −3 dB. The fourth feed F4 may cover a frequency band N77, and in-band efficiency is −3.5 dB.

TABLE 10

ECC between the antenna 1 and the antenna 2

| Frequency | 4.4 | 4.7 | 5 |
|---|---|---|---|
| ECC | 0.0002 | 0.0035 | 0.0077 |

FIG. 21*b* is a schematic diagram of waveforms of S parameters of the third feed F3 and the fourth feed F4 in FIG. 21*a* on different operating frequency bands. In FIG. 21*b*, a horizontal coordinate is a frequency in a unit of GHz, and a vertical coordinate is an input reflection coefficient S11, a reverse transmission coefficient S12/a forward transmission coefficient S21, and an output reflection coefficient S22 in S parameters, and is in a unit of dB. As shown in FIG. 21*b*, a curve 1 represents an input reflection coefficient S11 of the third feed F3, a curve 2 represents reverse transmission coefficients S12/forward transmission coefficients S21 of the third feed F3 and the fourth feed F4, and a curve 3 represents an output reflection coefficient S22 of the fourth feed F4.

FIG. 21*c* is a diagram of waveforms of system efficiency and radiation efficiency of each of the third feed F3 and the fourth feed F4 in FIG. 21*a*. In FIG. 21*c*, a horizontal coordinate is a frequency in a unit of GHz, and a vertical coordinate is system efficiency in a unit of dB. As shown in FIG. 21*c*, a curve 1 represents system efficiency of the third feed F3, a curve 2 represents radiation efficiency of the third feed F3, a curve 3 represents system efficiency of the fourth feed F4, and a curve 4 represents radiation efficiency of the fourth feed F4.

In conclusion, it may be learned from the foregoing four embodiments that based on the same second loop branch 20, the antenna unit in this application can implement two antennas with high isolation and a low envelope correlation coefficient ECC under excitation of the third feed F3 and the fourth feed F4.

In Embodiment 2, based on a symmetrical arrangement of a same loop antenna (namely, the second loop branch and the feeding branch), the antenna unit respectively excites the signal at the C-mode port and the signal at the D-mode port of the loop antenna by using two feeds, so that the signal at the C-mode port is self-canceled at the D-mode port, and the signal at the D-mode port is self-canceled at the C-mode port, to implement signal isolation between the two ports, and the signal at the C-mode port and the signal at the D-mode port are complementary to each other in different radiation directions, to implement two antennas with high isolation and a low ECC. In this way, good antenna performance can be ensured, so that the electronic device can fully use the antenna unit in limited space to implement various scenarios. In addition, the electronic device can include a larger quantity of antennas in the limited space, to improve utilization of antenna space.

For example, this application further provides an electronic device. The electronic device in this application may include a printed circuit board and at least one antenna unit. The electronic device includes but is not limited to a device such as a mobile phone, a headset, a tablet computer, a portable computer, a wearable device, or a data card.

In this application, any antenna unit and the printed circuit board share a ground. The specific implementation in any one of the embodiments in FIG. 1 to FIG. 21*c* may be used for the antenna unit. For example, the electronic device may include an antenna unit implemented based on the description content in Embodiment 1, may include an antenna unit implemented based on the description content in Embodiment 2, or may include an antenna unit implemented based on the description content in Embodiment 1 and an antenna unit implemented based on the description content in Embodiment 2. This is not limited in this application. In addition, the any antenna unit may be disposed on a frame of the electronic device, may be disposed on the printed circuit board, or may be disposed by using a bracket. This is not limited in this application.

The electronic device in this application includes at least one antenna unit. A signal at a C-mode port and a signal at a D-mode port of a same loop antenna in any antenna unit are respectively excited by using two feeds, and the antenna unit is electrically symmetrically disposed, so that the signal at the C-mode port is self-cancelled at the D-mode port, and the signal at the D-mode port is self-cancelled at the C-mode port, to implement signal isolation between the two ports, and the signal at the C-mode port and the signal at the D-mode port can be complementary to each other in different radiation directions, to implement two antennas with high isolation and a low envelope correlation coefficient ECC based on the same loop antenna. In this way, good antenna performance is ensured, so that the electronic device can fully use the antenna unit in limited space to implement various scenarios, for example, implement application to a multi-antenna scenario such as a diversity antenna or a multiple-input multiple-output (multiple-input multiple-output, MIMO) antenna, a scenario of obtaining a pattern through combination, and a pattern switching scenario such as switching between a horizontal direction and a vertical direction. In addition, the electronic device can include a larger quantity of antennas in the limited space, to improve utilization of antenna space.

What is claimed is:

1. An antenna unit, comprising:

a first loop branch, a first feed, and a second feed, wherein the first loop branch comprises a first radiation section, a second radiation section, and a third radiation section, wherein the first radiation section is in a ring shape, and the first radiation section is not closed, a first end of the first radiation section is connected to the second radiation section, and a second end of the first radiation section is connected to the third radiation section, wherein the second radiation section and the third radiation section are symmetrically disposed in a first direction, there is an opening between the second radiation section and the third radiation section, and both the second radiation section and the third radiation section are grounded, wherein the first feed is symmetrically connected to the first radiation section in the first direction, and wherein a second contact point and a third contact point are symmetrical in the first direction, a distance between the second contact point and the third contact point falls within a first preset range, the second contact point is between the second feed and the second radiation section, and the third contact point is between the second feed and the third radiation section.

2. The antenna unit according to claim 1, wherein the second radiation section and the third radiation section are disposed inside the first radiation section in the first direction, wherein the second radiation section and the third radiation section are disposed outside the first radiation section in the first direction, wherein the second radiation section and the third radiation section are disposed to extend from an inside of the first radiation section to an outside of the first radiation section in the first direction, or wherein the second radiation section and the third radiation section are disposed to extend from the inside of the first radiation section to the outside of the first radiation section in a direction opposite to the first direction.

3. The antenna unit according to claim 1, wherein the second radiation section is connected to N first ground points of an electronic device, wherein the third radiation section is connected to N second ground points of the electronic device, and wherein N is a positive integer.

4. The antenna unit according to claim 1, wherein the second radiation section and the third radiation section are disposed on a bracket, and a first ground point and a second ground point are disposed on the bracket or a printed circuit board in an electronic device.

5. The antenna unit according to claim 1, wherein both the second radiation section and the third radiation section are connected to a ground region of an electronic device, and wherein the ground region is symmetrically disposed in the first direction.

6. The antenna unit according to claim 1, wherein there is a first contact point between the first feed and the first radiation section, and wherein the first contact point is a symmetry point of the first radiation section and located on the first radiation section.

7. The antenna unit according to claim 1, wherein there are P first contact points between the first feed and the first radiation section, wherein the P first contact points are symmetrically disposed in the first direction, wherein the P first contact points are located on a radiation segment, in the first radiation section, on which a symmetry point of the first radiation section is located, and wherein P is an even number.

8. The antenna unit according to claim 1, wherein there are Q first contact points between the first feed and the first radiation section, wherein Q is greater than or equal to 3, wherein the Q first contact points comprise a first contact point and P first contact points, wherein the first contact point is a symmetry point of the first radiation section and located on the first radiation section, wherein the P first contact points are symmetrically disposed in the first direction, and the P first contact points are located on a radiation segment, in the first radiation section, on which the symmetry point of the first radiation section is located, wherein Q is an odd number, and wherein P is an even number.

9. The antenna unit according to claim 1, wherein a first matching component is disposed between the first feed and a first contact point.

10. The antenna unit according to claim 1, wherein a second matching component is disposed between the second feed and the second contact point, or wherein the second matching component is disposed between the second feed and the third contact point.

11. The antenna unit according to claim 1, wherein the antenna unit further comprises a first non-conductive support member, a first conductive member, and a second conductive member, and wherein the first conductive member and the second conductive member are suspended by using the first non-conductive support member, the first conductive member and the second conductive member are symmetrically disposed in the first direction, a first length of the first conductive member is ½ of a wavelength, a second length of the second conductive member is ½ of the wavelength, and the wavelength corresponds to a frequency in an operating frequency band of the antenna unit.

12. The antenna unit according to claim 11, wherein the first conductive member and the second conductive member are disposed outside or inside the first radiation section.

13. An antenna unit, comprising:

a second loop branch, a feeding branch, a third feed, and a fourth feed, wherein the second loop branch comprises a fourth radiation section, a fifth radiation section, and a sixth radiation section, wherein the fourth radiation section is in a ring shape, and the fourth radiation section is not closed, wherein a first end of the fourth radiation section is connected to the fifth radiation section, and a second end of the fourth radiation section is connected to the sixth radiation section, wherein the fifth radiation section and the sixth radiation section are symmetrically disposed in a second direction, there is an opening between the fifth radiation section and the sixth radiation section, and both the fifth radiation section and the sixth radiation section are grounded, wherein the feeding branch is symmetrically disposed in the second direction, and a first area of a first part of the feeding branch that faces the fifth radiation section is equal to a second area of a second part of the feeding branch that faces the sixth radiation section, wherein the third feed is symmetrically connected to the feeding branch in the second direction, and wherein a fifth contact point and a sixth contact point are symmetrical in the second direction, a distance between the fifth contact point and the sixth contact point falls within a second preset range, the fifth contact point is between the fourth feed and the fifth radiation section, and the sixth contact point is between the fourth feed and the sixth radiation section.

14. The antenna unit according to claim 13, wherein the fifth radiation section and the sixth radiation section are disposed inside the fourth radiation section in the second direction, wherein the fifth radiation section and the sixth radiation section are disposed outside the fourth radiation section in the second direction, wherein the fifth radiation section and the sixth radiation section are disposed to extend from an inside of the fourth radiation section to an outside of the fourth radiation section in the second direction, or wherein the fifth radiation section and the sixth radiation section are disposed to extend from the inside of the fourth radiation section to the outside of the fourth radiation section in a direction opposite to the second direction.

15. The antenna unit according to claim 13, wherein the fifth radiation section is connected to M third ground points of an electronic device, wherein the sixth radiation section is connected to M fourth ground points of the electronic device, and wherein M is a positive integer.

16. The antenna unit according to claim 15, wherein the fifth radiation section and the sixth radiation section are disposed on a bracket, and a third ground point and a fourth ground point are disposed on the bracket or a printed circuit board in the electronic device.

17. The antenna unit according to claim 13, wherein both the fifth radiation section and the sixth radiation section are connected to a ground region of an electronic device, and the ground region is symmetrically disposed in the second direction.

18. The antenna unit according to claim 13, wherein the feeding branch is disposed inside the fourth radiation section in the second direction, wherein the feeding branch is disposed outside the fourth radiation section in the second direction, or wherein the feeding branch is disposed to extend from an inside of the fourth radiation section to an outside of the fourth radiation section in the second direction.

19. The antenna unit according to claim 13, wherein the first area of the first part of the feeding branch that faces the fifth radiation section in the second direction is equal to the second area of the second part of the feeding branch that faces the sixth radiation section in the second direction, or wherein the first area of the first part of the feeding branch that faces the fifth radiation section in a direction perpendicular to the second direction is equal to the second area of the second part of the feeding branch that faces the sixth radiation section in the direction perpendicular to the second direction.

20. The antenna unit according to claim 13, wherein there is at least one fourth contact point between the third feed and the feeding branch, and wherein a third matching component is disposed between the third feed and the fourth contact point.

* * * * *